(12) United States Patent
Graziano et al.

(10) Patent No.: US 12,468,281 B1
(45) Date of Patent: Nov. 11, 2025

(54) AFFORDANCE CONTROL SYSTEM AND METHOD

(71) Applicant: STEELCASE INC., Grand Rapids, MI (US)

(72) Inventors: Francis Gerard Graziano, Grand Rapids, MI (US); Mark Baloga, East Grand Rapids, MI (US); Paul Noll, Grand Rapids, MI (US); Terry West, Caledonia, MI (US); Nicolas De Benoist, Paris (FR)

(73) Assignee: STEELCASE INC., Grand Rapids, MI (US)

( * ) Notice: Subject to any disclaimer, the term of this patent is extended or adjusted under 35 U.S.C. 154(b) by 947 days.

(21) Appl. No.: 17/066,139

(22) Filed: Oct. 8, 2020

Related U.S. Application Data

(63) Continuation of application No. 15/384,643, filed on Dec. 20, 2016, now abandoned, which is a continuation-in-part of application No. 15/167,354, filed on May 27, 2016, now Pat. No. 11,238,382.

(60) Provisional application No. 62/304,445, filed on Mar. 7, 2016, provisional application No. 62/270,912, filed
(Continued)

(51) Int. Cl.
*G05B 19/406* (2006.01)
*G06Q 10/0631* (2023.01)

(52) U.S. Cl.
CPC ..... *G05B 19/406* (2013.01); *G06Q 10/06313* (2013.01); *G05B 2219/25011* (2013.01)

(58) Field of Classification Search
None
See application file for complete search history.

(56) References Cited

U.S. PATENT DOCUMENTS

| 7,886,980 B2 | 2/2011 | Nishimura et al. |
| 8,407,944 B2 | 4/2013 | Baloga et al. |
| 8,531,396 B2 | 9/2013 | Underkoffler et al. |

(Continued)

FOREIGN PATENT DOCUMENTS

| EP | 2427857 B1 | 9/2016 |
| WO | 2007059060 A2 | 5/2007 |

OTHER PUBLICATIONS

Lai, et al., BlueSpace: Personalizing Workspace Through Awareness and Adaptability, Int. J. Human-Computer Studies, 2002, 57:415-428.
(Continued)

*Primary Examiner* — Jerry O'Connor
*Assistant Examiner* — Matthew H Divelbiss
(74) *Attorney, Agent, or Firm* — Quarles & Brady LLP

(57) ABSTRACT

A system for use with at least one affordance in space, the affordance including at least one controllable operating characteristic, the system for controlling the operating characteristic and comprising a gadget including a housing, an output device, at least a first sensor for sensing the gadget in space and generating sensed information, a processor programmed to perform the steps of receiving sensed information from the at least a first sensor, using the sensed information to determine the location and orientation of the gadget in space, using the location and orientation of the gadget in space to identify at least one target object in a targeted juxtaposition with respect to the gadget and controlling the output device to indicate that at least one target object has been targeted.

33 Claims, 65 Drawing Sheets

Related U.S. Application Data on Dec. 22, 2015, provisional application No. 62/171,340, filed on Jun. 5, 2015.

(56) References Cited

U.S. PATENT DOCUMENTS

| | | | |
|---|---|---|---|
| 8,669,939 B2 | 3/2014 | Underkoffler et al. |
| 8,681,098 B2 | 3/2014 | Underkoffler et al. |
| 8,708,824 B2 | 4/2014 | Ohta et al. |
| 8,723,795 B2 | 5/2014 | Underkoffler et al. |
| 8,941,588 B2 | 1/2015 | Minnen |
| 8,941,590 B2 | 1/2015 | Csaszar et al. |
| 9,063,801 B2 | 6/2015 | Kramer et al. |
| 9,067,139 B2 | 6/2015 | Mao et al. |
| 9,171,454 B2 | 10/2015 | Wilson et al. |
| 9,179,182 B2 | 11/2015 | Huebner |
| 9,218,058 B2 | 12/2015 | Bress et al. |
| 9,227,137 B2 | 1/2016 | Grant et al. |
| 9,229,540 B2 | 1/2016 | Mandella et al. |
| 9,261,262 B1 | 2/2016 | Baloga |
| 9,261,968 B2 | 2/2016 | Yen et al. |
| 9,317,108 B2 | 4/2016 | Touma et al. |
| 9,329,703 B2 | 5/2016 | Falkenburg et al. |
| 9,380,682 B2 | 6/2016 | Mead et al. |
| 9,405,372 B2 | 8/2016 | Yen et al. |
| 9,442,570 B2 | 9/2016 | Slonneger |
| 9,479,730 B1 | 10/2016 | Noll |
| 9,489,040 B2 | 11/2016 | Antonyuk et al. |
| 9,495,013 B2 | 11/2016 | Underkoffler et al. |
| 9,495,228 B2 | 11/2016 | Kramer et al. |
| 9,504,917 B2 | 11/2016 | Rabin et al. |
| 9,545,572 B2 | 1/2017 | Mao et al. |
| 9,573,056 B2 | 2/2017 | Marks et al. |
| 2009/0244309 A1 | 10/2009 | Maison et al. |
| 2010/0128062 A1 | 5/2010 | Kramer et al. |
| 2011/0025598 A1* | 2/2011 | Underkoffler ......... G06F 3/0325 345/156 |
| 2011/0105910 A1* | 5/2011 | Lawson ............... A61B 5/6817 600/474 |
| 2011/0267259 A1* | 11/2011 | Tidemand ............... A63F 13/98 345/156 |
| 2013/0091440 A1 | 4/2013 | Kotler et al. |
| 2013/0267783 A1* | 10/2013 | Davis .................... A61B 1/227 600/199 |
| 2014/0028781 A1 | 1/2014 | MacDonald |
| 2014/0092009 A1 | 4/2014 | Yen et al. |
| 2014/0104156 A1* | 4/2014 | Touma ................... G06F 3/014 345/156 |
| 2014/0168100 A1 | 6/2014 | Argiro |
| 2014/0325373 A1 | 10/2014 | Kramer et al. |
| 2015/0085060 A1 | 3/2015 | Fish et al. |
| 2015/0089394 A1 | 3/2015 | Chen et al. |
| 2015/0242179 A1 | 8/2015 | Benson et al. |
| 2016/0059120 A1 | 3/2016 | Komorous-King et al. |
| 2017/0024014 A1 | 1/2017 | Chizeck et al. |

OTHER PUBLICATIONS

Steelcase, RoomWizard II Scheduling System, Product Brochure, Copyright 2011 Steelcase, 4 pages.

\* cited by examiner

AFFORDANCE CONTROL SYSTEM AND METHOD

CROSS-REFERENCE TO RELATED APPLICATIONS

This application is a continuation of U.S. patent application Ser. No. 15/384,643 filed Dec. 20, 2016, titled "Affordance Control System And Method," which claims priority to U.S. provisional application No. 62/270,912 filed on Dec. 22, 2015, which is titled "Affordance Control System And Method." U.S. patent application Ser. No. 15/384,643 is also a continuation-in-part of U.S. patent application Ser. No. 15/167,354 which is titled "Threshold Configuration And System For Space" which was filed on May 27, 2016, which claims priority to U.S. provisional application Ser. No. 62/171,340 which is titled "Threshold Configuration And System For Space" which was filed on Jun. 5, 2015 and also to U.S. provisional application Ser. No. 62/304,445 which is titled "Threshold Configuration And System For Space" which was filed on Mar. 7, 2016. The contents of each of these applications are hereby incorporated herein by reference in their entirety for all purposes.

STATEMENT REGARDING FEDERALLY SPONSORED RESEARCH OR DEVELOPMENT

Not applicable.

BACKGROUND OF THE DISCLOSURE

Unless indicated otherwise, hereafter the term "enterprise" will be used to refer to a company or other entity that owns or occupies space within a building or other facility and the phrase "enterprise space" will be used to refer to a space that is owned or occupied by an enterprise such as, for instance, an office space, a conference space, a common area, etc. In addition, the term "affordance" will be used generally to refer to controllable devices and systems provided within an enterprise space including content sharing devices like display screens and projector/screen assemblies, light devices, HVAC components, sound systems and components, controllable window treatments, etc. The term "employee" will be used generally to refer to any person located within an enterprise space including persons employed by an enterprise, enterprise customers, clients, contractors, etc.

Enterprises are always seeking ways to help employees optimize performance in enterprise spaces. Typically, a space is optimized by thoughtfully selecting subsets of space affordances to be provided in enterprise spaces that are either designed to support specific activities or that can be controlled in different ways to support different activity types. Modern enterprise spaces are often equipped with many different types of controllable affordances and, in general, those affordances can be grouped into two different subsets.

A first affordance subset includes affordances that are provided primarily for the purpose of providing environments optimized to provide comfort or enhance the mood of employees in space. For instance, lighting is required for most employee activities in an enterprise space and lighting can be optimized in many different ways to support many different employee activities at different times. Other affordances that can be controlled to affect employee comfort and/or mood include but are not limited to HVAC systems, sound systems, window blind control systems, glass wall opacity control systems, etc.

A second affordance subset includes affordances that are provided to help employees access, develop and share digital work product or content. For instance, electronic emissive display screens (e.g., flat panel or curved displays) are often provided within enterprise space to facilitate personal and group content access, development and sharing of content including documents, presentations, notes, memos, videos, images, etc. Hereinafter, unless indicated otherwise, the phrase "content affordance" will be used to refer to controllable enterprise affordances that help employees access, develop and share digital content and other controllable enterprise affordances (e.g., lighting, sound, HVAC, opacity controllable walls, window blinds or shades, etc.) will be referred to collectively as "ambient affordances".

While content and ambient affordances are described separately hereafter in the interest of simplifying this explanation, in many cases it should recognized that one or more affordances will be included in both content and ambient affordance sets. For instance, a controllable sound affordance (e.g., speakers and a driver) may be included in either or both of the content and ambient affordance sets or may be included in each of the sets at different times. For example, sound may comprise content when presenting an audio clip alone or in conjunction with a video or movie at one time and may be provided to set or affect employee mood when cancelling noise in a space, providing a relaxing background sound track, etc., at some other time. As another example, a large display screen within a space may be used to present content at one time and to set mood via imagery at another time. Other affordances may also be included in both the content and comfort sets at different times.

Over time, the number of affordances and the number of controllable features on affordances in enterprise spaces have proliferated. For instance, new LED and other light technology has allowed companies to develop light devices where color, intensity and light cycling pattern (e.g., on and off cycling, fading from one effect to another, etc.) can all be controlled. As another instance, new digital sound systems have been developed where every aspect of sound quality, sound mixing and sound cancellation can be controlled.

Perhaps the greatest level of increased affordance control has been in the area of content affordances such as electronic whiteboards and other display devices where content can be presented, developed, analyzed and shared among two or more employees in an enterprise space. In many systems, content can be called up digitally into different virtual windows on one or more large common display screens within a space from any of a myriad of different content sources and once displayed, can be manipulated by changing size (e.g., zoom in and out), moving content windows, moving content from one window to another, highlighting different features in presented content, annotating content, selecting and grouping different content, drilling down into content that is related to presented content, controlling applications that are presented in virtual windows (e.g., word processor applications, drawing applications, video presentations, teleconference applications, etc.

Whenever a controllable affordance is provided within an enterprise space, some type of interface is required to control the affordance. Historically affordance interfaces were relatively simple and included separate and dedicated interfaces for each controllable affordance. For instance, a light switch (e.g., a simple interface) was provided for turning space lights on and off. As another instance, projector controls (e.g., on/off, focus, etc.) were provided on a projector unit itself. As still one other instance, televisions included a set of control buttons on the television device itself for controlling basic functions like turning the TV on and off, controlling channel selection, controlling volume, etc. These dedicated and spatially associated control interfaces were extremely intuitive and therefore easy to use.

As the number of controllable affordance features has proliferated, the number of interface tools required to control affordance characteristics has increased appreciably. For example, in the case of a large flat panel display screen mounted in a conference space, it is not unusual to have four or five different source devices (e.g., linked cable connection, a DVD connection, a computer connection, a teleconference connection, etc.) linked to the screen via different HDMI or other types of input ports or wirelessly. In these cases, typically a separate remote control is provided for each of the system devices so that there may be five, six or even seven separate remote devices for controlling a content affordance and associated source devices. As another example, a separate wireless device may be provided for lights in an enterprise space, another separate device may be provided for controlling air circulation in the space, another interface may be provided for controlling window blinds or opacity controllable windows or glass wall or door members, etc.

In addition to increasing clutter in an enterprise space, multiple affordance interfaces can be confusing to employees that are not highly trained in using the remote interfaces. Moreover, in many cases inadvertent selection of a wrong interface setting can disrupt affordance use while trying to figure out how to backtrack to a prior affordance or source device state and select a different option. In addition, remotes can be lost or at least misplaced periodically (e.g., removed from an associated enterprise space) resulting in disruption of affordance use. Moreover, remote control devices by their very nature spatially separated interfaces from associated controlled affordances rendering the interfaces less intuitive to use than the simple affordance mounted mechanical switches and buttons that preceded remote control devices.

Recent advances in wireless technology, communication networks, and communication device technology have enabled many other types of more sophisticated affordances and associated affordance control interfacing to be implemented. To this end, communication networks have evolved where enterprise space affordances are linked to the communication networks and each affordance is assigned its own unique network address so that each affordance can be controlled independently by sending control signals to an associated network address. Thus, for instance, light intensity is controllable by sending a control signal to a light device via a network address associated with the light device. As another instance, content on a common display screen may be controllable by sending content to a network address associated with a video driver linked to the common display screen.

Wireless systems are now almost ubiquitous in enterprise spaces that include wireless access points linked to the communication networks so that wireless control signals for affordances linked to the network can be received. Wireless transmitters have been included in laptops, smart phones, tablet type computing devices and other portable devices for years that are used to transmit control signals wirelessly to access points in space to control networked affordances.

While communication networks and wireless systems have been important technological developments required for advances in affordance control and interfacing, perhaps the greatest leap in control capabilities is associated with the interface devices directly used by employees for affordance control. Smart phones, tablet type devices, laptop computers and even watches and other wearable electronic devices (hereinafter generally referred to as "portable touch computing devices") now routinely include at least one flat panel or slightly curved touch screen where sensors can detect precise locations on the screen at which an employee touches the screen. Software run on one of these devices presents virtual control buttons and other component input representations on the display screen that are correlated with specific locations on the screen so that an employee's intent to select a virtual button can be determined by sensing a touch at an associated location. Two or more touch locations on a screen can be selected and detected at once and specific swiping, swirling or other two dimensional gestures on the screen can be detected so that many different input activities or gestures can be distinguished and used to issue different types of affordance control commands.

While there are many advantages associated with portable touch computing device control of networked affordances, perhaps the most important advantage is that a portable touch computing device can run different applications at different times so that the device can, in effect, morph from one interface type to another and then to any of an essentially unlimited number of other interface devices for controlling any networked affordance. For example, a portable touch interface device may run a light control application at a first time, an HVAC control application at a second time, a teleconferencing control application at a third time, a content sharing application at a fourth time, a whiteboard application at a fifth time, etc. Where a new affordance is added to an enterprise space, a new control application associated with the new affordance can be loaded onto a portable touch computing device for controlling the new application.

While portable touch computing devices combined with network and wireless communication developments have enabled new and useful wireless affordance interfaces, solutions that require personal portable touch computing devices also have shortcomings. First, in most cases, not all employees will have portable touch computing devices and therefore, even where an enterprise includes networked affordances and a wireless communication system, other affordance control interfaces that persist in an enterprise space need to be provided to support employees that do not have personal flat screen interface devices.

Second, many employees that have portable touch computing devices may not even be aware that an affordance control application exists for an enterprise space or if they know an application exists, they may be unaware of which application is required for a specific enterprise space or where to access that application.

Third, many employees that have portable touch computing devices useable to download an affordance control application may choose not to download that application for any of several different reasons. For instance, an employee may simply not want to clutter up her portable touch computing device application set by adding another application to her set. This may be particularly true in a case where each affordance in a space requires an employee to download a different application to control the affordance. Thus, for instance, in some cases there may be five different affordance control applications for a single enterprise space including a lighting control application, a sound control application, an HVAC control application, a natural light control application (e.g., an application for controlling blinds in a space) and a content control application (e.g., for controlling content on one or more common display screens within a space). Here, the task of downloading five applications may simply be too burdensome for an employee, especially in cases where other control options (e.g., a mechanical light switch) are provided to support employees that do not have a personal portable touch computing device or that prefer legacy type control options. As another instance, in many cases an employee that uses an enterprise space may only periodically use that space and therefore may not want a control application associated with that space downloaded to her personal flat screen interface device or represented as an icon on her device screen.

Fourth, even where an employee has loaded an affordance control application onto a personal portable touch computing device, the task of accessing the application in many cases requires several steps (e.g., wake up the device, select a specific application for a specific affordance and then select a control option) that, while simple, nevertheless present a barrier to use and therefore many employees will simply forego using the application interface even when it is available. Here, in many cases, employees simply forego setting optimized preferences or using affordance capabilities instead of following the multi-step application accessing process.

Fifth, because flat screen devices are now ubiquitous and are used to perform a huge number of different functions, presence of one or more of these devices in an enterprise space typically indicates nothing about capabilities of that space or the affordances located therein. For instance, is a flat touch screen interface device associated with a phone system in a space, one or more common display screens, an HVAC system, a lighting or other ambient control system, or a combination thereof or is it not associated with any enterprise affordances and instead provided in the space for some other reason? Device presence indicates nothing about capabilities.

Sixth, and perhaps most importantly, the success of flat touch screen computing devices has had a stifling effect on other types of interface development for at least two reasons. First, touch screen technology became available so quickly in well engineered and robust flat screen devices that the flat portable touch computing device hardware and capabilities were well ahead of software applications developed for those devices. In effect, the hardware advances opened up a gaping application hole that needed to be filled and filling that hole has taken several years.

Second, availability of reliable and robust flat portable touch computing devices and related technology has resulted in interface designers forcing interface applications into forms consistent with flat screen capabilities. In effect, in many cases, interface designers start with a set of constraints associated with the flat screen form and choose affordance control interface tools that work within those constraints instead of using the affordance control function itself to drive the interface form. By using flat screen constraints to limit interface design, the interface is further decoupled from the affordance and the affordance functions that it controls. This decoupling of interfaces from affordance control weakens employee understanding of the capabilities of the interface device.

One other affordance interface solution that is currently being explored and in some cases implemented includes a deviceless gesture based interface. Here, for instance, in at least some cases, cameras are mounted in a conference space to obtain images of employees in that space that can be examined to identify control commands associated with employee gestures made within the space. For example, an employee may be able to point her finger at content on a large common display screen within an enterprise space to select content on the screen. Then, the employee may be able to wave her hand to the right to cause that content to be moved as a content block to the right on the common display screen or to another common display screen juxtaposed to the right of the screen that originally presented the content. Here, camera images may be examined to discern that that the selection and movement gestures have occurred and the content may be repositioned accordingly. Many other three dimensional gestures are being considered and implemented in some systems.

Advantages associated with gesture affordance control include the ability to control content without requiring any type of mechanical interface device, ability to control content from any location within the field of view of sensor cameras and ability for more than one employee to control content at the same time. One other important advantage to gesture based control is that these types of systems can be designed to spatially reconnect employee activities with affordance control so that interfacing with affordances can again be more intuitive. For instance, pointing at content to select the content reconnects an employee to the affordance and specifically to the content presented on the affordance in an extremely intuitive manner. As other instance, swiping ones hand to the right after content has been selected to move selected content to the right on a screen is extremely intuitive. Hereinafter, unless indicated otherwise, gesture based interfaces that allow an employee to issue commands without touching some type of interface device will be referred to as "deviceless gesture interfaces".

Deviceless gesture interfaces, unfortunately, also have several shortcomings. First, current known systems have difficulty robustly distinguishing more than a small number (e.g., four to six) of deviceless gestures, especially in cases where different employees are to interact with a system and each employee makes the same types of gestures differently.

Second, many gestures resemble normal human movement and therefore the chances of a system inadvertently sensing an unintended gesture and controlling an affordance in an unintended way exists. Likelihood of an unintended control activity is exacerbated where the number of control gestures is large as a gesture sensing system will sense more typical human movements as control gestures. In addition to resulting in inadvertent control activities, uncertainty about movements being sensed in a space understandably makes some employees nervous.

Third, where two or more employees are in a space at a time, determining which of two employee's gestures should control affordances is a complicated task. For instance, if first and second employees are pointing at different content on a large common display screen at the same time, should the system respond to the first employee, the second employee or both?

Thus, there is a need for better and intuitive affordance control interface devices and systems for use within enterprise spaces. In addition, it would be advantageous if interface device forms were better and more intuitively coupled to functions so that employee's could intuitively comprehend interface, affordance and enterprise space capabilities simply by observing the interface forms.

BRIEF SUMMARY OF THE DISCLOSURE

It has been recognized that one or more interface "gadgets" (e.g., digitally enhanced physical objects or work tools) can be situated in an enterprise space that can operate as interface devices for controllable affordances located in or associated with the space. In some cases, each gadget of a specific type may have a unique shape that is immediately recognizable to distinguish the gadget type from all other gadget types and different sets of specific control functions or capabilities may be associated with each gadget type. In this way, when an employee enters an enterprise space and sees a gadget within the space, the employee can know space/space affordance capabilities that are supported within the space.

For instance, where a cone shaped gadget can be used to target a specific set of content on a large common display screen or emissive surface within a space for selection, simple presence of a cone gadget within a space enables an employee to quickly discern that the content targeting and selecting function is supported in the space. As another instance, where puck/disc shaped gadget is useable to control intensity of ceiling lights in a space, simple presence of the puck shaped gadget within a space enables an employee to quickly discern that light intensity can be controlled in the space. Many other gadget/control combinations are contemplated. In the above examples, if first and second cone shaped gadgets and one puck shaped gadget is located in a space, an employee viewing the three gadgets in the space could quickly surmise that lighting intensity can be adjusted in the space and that two employees could work simultaneously to manipulate content on common display screens in the space using the first and second cone shaped gadgets.

In at least some embodiments one gadget may be useable to control many different types of affordances and/or to perform many different control tasks. Here, in many cases, a gadget may be able to be associated with different affordances by tracking gadget location and orientation relative to the affordances. For instance, a cone shaped gadget may be aimed at a light to associate the gadget with the light and until the gadget is disassociated with the light, gadget actions (e.g., movements) may be tracked to identify control commands. Here, the gadget may be aimed at a specific set of content on a large common display screen to associate the gadget with the targeted content and until the gadget is disassociated with the content, gadget actions may be tracked to identify control commands for the targeted content. The cone shaped gadget may similarly be aimed at other affordances or target objects (e.g., an ambient affordance or a content set) to associate therewith for control purposes.

Gadget location/orientation may be tracked in any of several different ways including via an accelerometer and/or a gyroscope mounted in the gadget itself, via wireless access points (e.g., via triangulation) in an enterprise space, via cameras mounted in the enterprise space, via images generated by a gadget mounted camera, via other types of position sensors in a space, via sensing some signal (e.g., a laser light pattern) transmitted from the gadget in a space that is sensed by a space mounted (e.g., a camera) sensor device, or via any combination of the above types of sensors or systems. For instance, one combination may include cameras to sense the 3D location of a gadget in a space and an accelerometer and a gyroscope mounted to the gadget to sense orientation in the space.

In at least some cases affordances may be controllable to provide some control feedback to a gadget using employee. For instance, when a gadget is initially associated with a light device, the intensity of light generated by the device may be blinked up and down to confirm initial association after which gadget actions will control light operating characteristics. As another instance, when a gadget is initially associated with a specific set of content on a common display screen in a space, the associated content may be highlighted or otherwise visually distinguished to confirm initial association.

In some embodiments where at least one large common display screen is presented in a space, gadget association may be indicated via a field on the display screen. For instance, when a light is targeted to associate a gadget therewith, the phrase "light control" may be presented in the field on the display screen to indicate association.

In some cases a large common display screen may present virtual tools for controlling affordances after initial gadget-affordance association. For instance, after a gadget is associated with a light device, a light intensity scale may be presented in a field on a display screen where rotation of the gadget causes a selection point on the intensity scale to move up and down until a desired intensity is achieved. As another instance, after a gadget is associated with content on a display screen, various tools for annotating the content may be presented on the display screen for selection using the gadget.

In at least some cases a gadget may include some type of output device to indicate various operating states. For instance, in some cases a simple LED may be mounted to a gadget that is viewable an employee using the gadget where the LED lights up to indicate a state change (e.g., a state in which no affordance is associated with the gadget and a second state in which an affordance is associated with a gadget). In other cases a set of LEDs may be controlled to indicate other states (e.g., content zoom, content capture and storage in a system database associated with the gadget, etc.). As another instance in some cases a gadget may include a vibration mechanism that vibrates or otherwise provides a haptic feedback signal to indicate different state changes or that a state change is currently occurring. As still another instance, a gadget may include one or more thin panel (e.g., flat or curved) display screens that can provide gadget state or affordance state feedback to a using employee. As yet another instance, a gadget may include a laser light device that can generate a signal on a surface within an enterprise space to indicate gadget or affordance state (e.g., drawing a box around a light device that is associated with the gadget for control).

In some cases a gadget that includes a screen may control screen content to provide additional information related to a target object (e.g., an affordance or content targeted with the gadget). For instance, where a gadget is used to target an area on a map that is presented on a display screen, additional content associated with the targeted map area may be presented on the gadget display for consideration. As another instance, where a map area is targeted, text representations of cities, countries, etc., of interest in the targeted area may be presented for further consideration.

In at least some embodiments a gadget may include one or more mechanical buttons or, in a case where the gadget includes a thin display screen, may be programmed to present one or more touch selectable virtual control tools to a gadget using employee that can be used to control associated affordances. For instance, a "select" button may be presented on a gadget display screen that can be selected to associate a gadget with a content set on a display screen that is currently aimed at using eh gadget. The same select button may be presented on a gadget display screen when the gadget is aimed at a light device where the button can be pressed to select the light device for control.

In at least some embodiments more than one gadget may be located in a space. In some cases two or more of the same type of gadget may be located in a space and each of the gadgets may be used in similar ways to control affordances. In other cases two or more similarly shaped gadgets in a space may be distinguished in some other fashion (e.g., one may be yellow and the other red) and each may be provided to control different affordances in a space. Here, in at least some cases, any yellow gadget in any enterprise space would be useable in the same fashion to control one affordance set and any red gadget in any space would be useable in the same fashion to control a second affordance set so that the differently colored affordances could be recognized immediately upon entry into the space as indicators of at least some capabilities associated with the space.

In some cases two or more differently shaped gadgets may be provided in a space where each of the different gadgets is useable to control different aspects of one type of affordance. For instance, both a cone shaped gadget and a square shaped gadget may be provided in an enterprise space and the cone shaped gadget may be useful for selecting a content subset on a display screen while the square shaped gadget is useful for dragging selected content about on a display screen.

In at least some embodiments gadget kits are contemplated where each kit includes a set of differently shaped gadgets that are useful for different control purposes. Here, in at least some embodiments, each differently shaped gadget may only be useful to facilitate a small set of control functions and those functions, after only minimal use, would become directly associated by employees with their limited function set. For example, one gadget may be useful for moving forward and rearward in time through content presented during a session on common display screens in a specific enterprise space while another gadget is useful for manipulating content currently presented on a display and still one other gadget is associated with and useable to control a telepresence system and one other is useable to control ambient conditions (e.g., lighting, temperature, air flow, window blinds, etc.).

In at least some embodiments specific gadget storage locations (e.g., specific places on a shelf) may be provided within each enterprise space where gadgets are to be placed within those spaces at the end of a space use session. Where gadgets are expected to be returned to a specific storage locations and they are returned to those locations after a meeting ends, an employee entering the space can quickly view the storage location and get a sense of which gadgets are present and space control capabilities in the space. In addition, by having a specific storage location for each gadget, when an employee cleans up after a session and places gadgets in their storage locations, the employee should be able to discern if a gadget is missing and take action to locate the gadget and place the gadget back in its storage location for subsequent use. If an employee enters a space and sees that some gadget is missing from a storage location, the employee can take some action to obtain another gadget of the missing type to be used in the space thereafter (e.g., obtain another gadget from some enterprise resource location where multiple instances of the gadgets may be stored for replacing missing gadgets).

In some cases where a kit of gadgets is used by each employee in a space, the kit may assemble into a storage configuration where, when one of the gadgets is missing, the incomplete configuration may be easily identified. Again, here, an employee would be encouraged to complete her kit prior to leaving an enterprise space.

In some cases a kit may include gadget charging components for charging gadgets when assembled into a storage configuration. In some cases a system server may be able to determine when a gadget is missing from a kit and present some notice to one or more employees in a space to encourage the employee to locate the missing gadget and assemble the gadget with the other kit components. Here, the notice may only be generated near the end of a meeting, when sensors sense that the meeting is ending (e.g., employees are getting up at the end of a meeting and heading for the door, several employees start assembling their kits for storage near the end of a meeting, etc.). Here, notice may be given via a gadget mounted device (e.g., light up an LED, make a sound), via a common display screen in a space, via a signal to a personal computing device, etc.

In at least some cases it is contemplated that when a gadget is initially picked up in a space, simple instructions associated with that gadget may be presented on a common display screen in that space. For instance, where a gadget is solely provided for controlling content affordances, a brief description of the gadget and at least a subset of most used or interesting gadget actions and associated functions may be presented via an ambient display screen adjacent the gadget. Here, the instructions may only persist for a short period and in at least some cases the gadget would be useable to immediately remove the instructions if the employee does not want or need them. In some cases the instructions may only be provided the first time the gadget is grasped and moved during a meeting or a session or the first time the gadget is removed from a storage location (e.g., a gadget charging bin or shelf). In some cases the system may track which employees have used a gadget in the past and may stop automatically presenting instructions to the employee once the system recognizes that the employee is sufficiently trained using the gadget. In some cases the system may be programmed to recognize when an employee is struggling to use a gadget to perform some task (e.g, sense when an employee is routinely undoing some action that has been repeated several times) and may present instructions designed to address the problem the employee is experiencing.

In addition to content and ambient gadgets, in at least some embodiments it is contemplated that other gadget types or classes may be provided for performing other useful functions. For instance, one other relatively broad gadget type may include "session type" gadgets for setting or controlling how affordances support different types of sessions. For instance, in at least some cases it is contemplated that a meeting or session may be enhanced by affordances applying some type of structure or limitations to presentation of session content and gadget control activities designed to facilitate at least one end goal associated with the session type. For instance, it has been recognized that optimal content arrangement in space and/or ability to control content in the space may be a function of the type of activity being performed in that space. For example, where a single employee is presenting content as a session leader is a space, content may be arranged in a first way with the same content presented on different common emissive surfaces within the space so that all employees in the space have a clear view of the shared content and the system may only allow the single employee to use gadgets to control the presented content.

In contrast, where a group of employees are brainstorming ideas in a space, the system may enable many different gadgets for use by many different employees to simultaneously control many different aspects of content on common emissive surfaces in the space. Here, it is contemplated that one or more gadgets may be associated with different session activity types. For instance, one gadget may be associated with a leader based session, a second gadget may be associated with a brainstorming session, a third gadget may be associated with a dyadic activity where two employees work together to generate content and so on. Here, to select one or the other session activity types, an employee may move one of these session type gadgets to a specific "in play" area (e.g., a central portion of a conference table) to make an activity type selection. In response to moving a session type gadget to the in play area, the system may automatically set up the affordances in accordance with a template associated with the gadget and related activity type.

In other cases a single session type gadget may be positionable in different positions where each position is associated with a different session or meeting type. For example, where space affordances can be used to facilitate 14 different types of meetings, a single session type gadget may be provided that includes 14 different flat surfaces where at least one top surface is substantially horizontal when the gadget is resting on an opposite bottom surface that is substantially horizontal. Here, each surface may have some indicia for indicating a specific one of the 14 session types and the system may configure affordances automatically to support whatever session type is shown on the top surface of the gadget at any time.

As another instance, another broad gadget type may include one or more "facilitator" gadgets for controlling guidance functions associated with session affordances. For instance, it has been recognized that a system can be designed that senses how a session is progressing which can provide encouragement or guidance to session employees toward an ultimate goal. Here, a facilitator gadget may be used within a conference space to dial the amount of facilitation up and down during an ongoing session.

One other instance of a gadget type may be a "persona" gadget that can be manipulated to adjust a perspective associated with supplemental content provided by a system server during an ongoing session. To this end, it has been known for a long time that different people have different strengths and weaknesses when it comes to collaborating with others. For instance, some innovation experts classify conferees in groups into different categories based on strengths and perceived weaknesses. Ten exemplary categories include an anthropologist, an experimenter, a cross-pollinator, a hurdler, a collaborator, a director, an experience architect, a set designer, a storyteller and a caregiver. In some cases, it is contemplated that a server may be programmed to operate as any one or more of the different persona categories to supplement content presented by employees in a space. For instance, the server may operate to perform searches of internet and other network content to locate supplemental content based on the content being presented by employees in a space during a session and may present a set of the search results from the perspective of an anthropologist or an experimenter, or any one of the other conferee categories. Here, one or more persona gadgets may be associated with one or more of the conferee categories and movement of the persona gadget may result in the system presenting a different perspective to employees during a session. For instance, if an anthropologist gadget and a set designer gadget are moved into an "in play" area in a space, a system server may recognize the move as a command to supplement a session with an anthropologist's perspective and a set designer's perspective.

Yet one other general type of gadget contemplated here is an "employee target" gadget. Here, it has been recognized that employees are another type of space affordance in many respects and that a gadget can be used as an intuitive tool to interact with employees in space. For instance, a first employee that wants to access basic information about a second employee like name, title, period of employment, age, experiences, recent projects, related content, etc., may, in some cases, simply aim an employee target gadget at an employee is space and obtain access to the sought information. Here, for instance, cameras in a space may track which employee is located where and may be able to discern, along with other sensor information (e.g., information developed by sensors in a gadget) when an employee target gadget is aimed at a specific employee. As another example, aiming a gadget at an employee may cause a system to instantaneously determine the identity of the employee using any of several different types of sensors and then information associated with the employee may be accessed and provided to the employee that aims the gadget. Thus, even if an employee is not carrying a personal computing device when a gadget is aimed at the employee, employee information may nevertheless be accessible. Other employee specific gadget controlling functions are contemplated. For example, a gadget may be aimed at an employee to access all public or at least enterprise accessible publications associated with the employee, to select the employee and cause a server to automatically highlight content on common emissive surfaces that was posted by the targeted employee, to initiate a communication link between the gadget and a personal portable computing device associated with the targeted employee for retrieving content therefrom or providing content thereto, etc.

DETAILED DESCRIPTION OF THE DISCLOSURE

Figure 1:
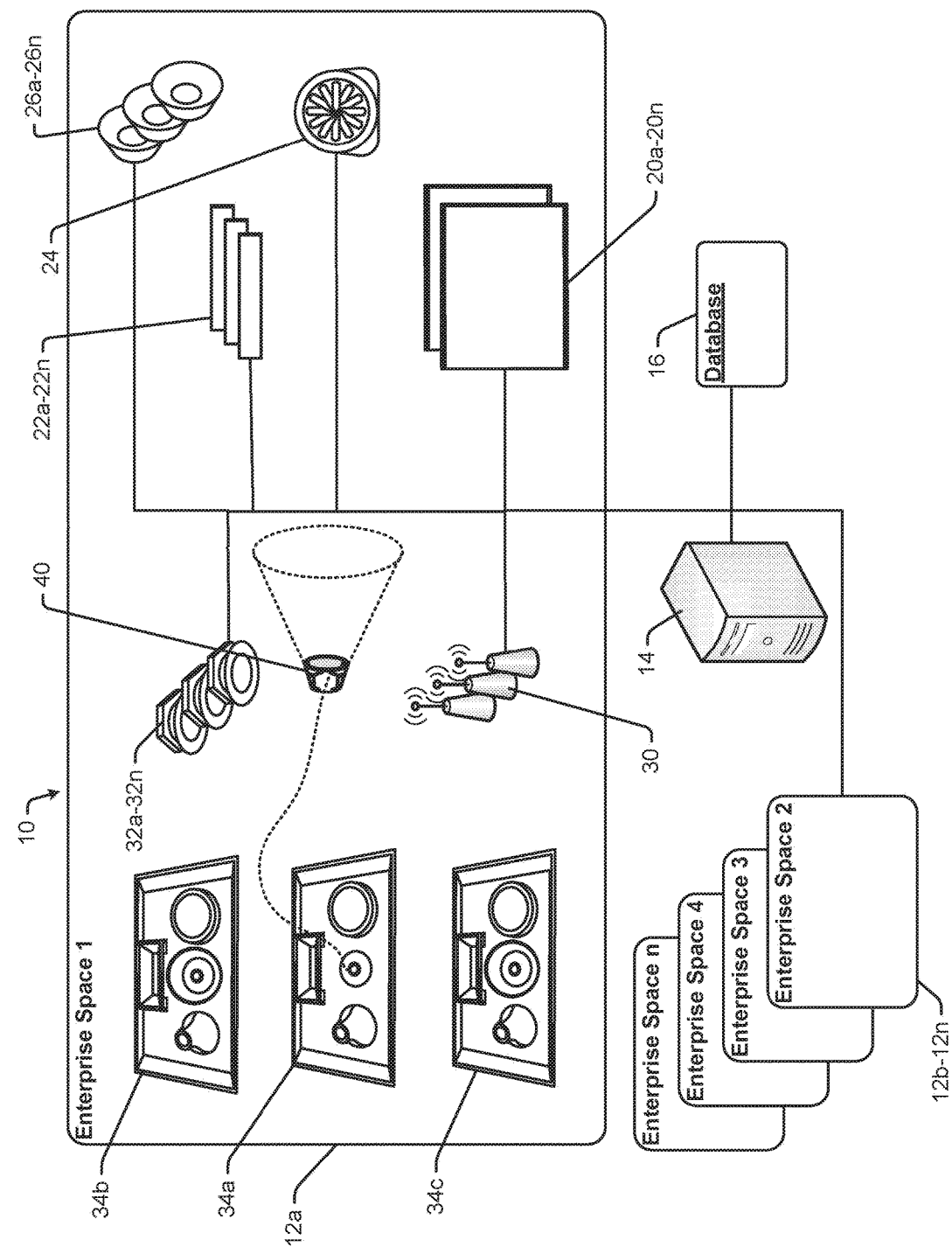
FIG. 1 is a schematic view of a conferencing system including, among other components, several conferencing spaces of different types where each space has a defined set of affordances that can be controlled via gadgets of various types described in this disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary enterprise 10 that includes a plurality of independent enterprise spaces 12a through 12n, a system server 14 and a system database 16. Each space 12a through 12n may include a conference room or area, an office space, a common area, a small group space, a team meeting space, etc, where each space includes a set of controllable affordances. For instance, exemplary space 12a includes a plurality of flat panel emissive surfaces or displays 20a through 20n, controllable light devices 22a through 22n, an audio or sound system represented by speakers 26a through 26n and an HVAC system 24, among other controllable affordances. Here, the term "controllable" means an affordance that has at least one variable operating characteristic. For instance, in the case of a light device 22a, controllable characteristics may include light intensity, color or temperature, intensity cycling pattern, etc. As another instance, in the case of speaker 26a, controllable characteristics include sound track, volume, tone, base, etc. As yet one other instance, in the case of display 20a, controllable characteristics may include content displayed, a subset of selected content, content magnification, content movement on the display or among various displays, content copying, content highlighting, etc.

Referring still to FIG. 1, space 12a also includes a plurality of sensing devices mounted within the space. Exemplary sensing devices in space 12a include wireless access points collectively identified by numeral 30 and cameras 32a through 32n. Access points 30 are arranged in space 12a so that a strong wireless signal can be received from any wireless transmitting device (e.g., a transceiver that is included in one of the gadgets 40 described below) located in space 12a regardless of location, assuming the transmitted signal is above some threshold level. Cameras 32a through 32n are arranged about space 12a so that they can obtain images of different areas in space 12a. In some cases the cameras may only obtain images of a portion of space 12a such as, for instance, spaces proximate (e.g., within 5 feet) of any one of the controllable affordances. In other embodiments that are particularly advantageous, cameras 32a through 32n will be positioned and oriented such that at least one camera generates images of each location within space 12a at any time. In still other cases the cameras are arranged so that several cameras obtain images of each location in space 12a from different vantage points at the same time.

Referring still to FIG. 1, server 14 can be any type of processing device of combination of processing devices that are capable of performing the methods, processes and functions described in this disclosure. For instance, server 14 may include a single server computing device that is dedicated to the control systems described herein. In the alternative, server 14 may include a plurality of computing devices that are linked together to perform the functions described herein, where one server performs one subset of functions and another server performs a second function subset. In some cases server 14 may be remote from an enterprise and may be operated by a third party service provider where server processes are accessed via application programs downloaded to interface gadgets to be described hereafter.

In at least some embodiments it is contemplated that one or more interface gadgets will be provided that can optionally be used by employees in space 12a or in any other spaces 12b through 12n to interact with controllable affordances in those spaces in simple and intuitive ways to control controllable features of the affordances. Here, optimally, each gadget will have a form or shape that is easily recognizable and that can, in short order (e.g., through a single use or through observing a single use) acquire an identity that can be used by employees in an associated space 28 to discern control capabilities of resources within the space. For instance, in the case of a light device, one or more interface gadgets may be used to control light intensity and/or light temperature. In the case of content on display screens, one or more gadgets may be used to control content placement, magnification, searching functions, etc. An employee seeing a gadget in a space 28 can immediately convey to the employee at least some space and space affordance capabilities.

In particularly advantageous embodiments gadget form or shape will be at least somewhat tied to its function(s) which should increase the level of intuitiveness of the gadgets for accomplishing control tasks and which, in at least some cases, will enhance control capabilities.

In addition, gadget motions or machinations sensed for generating control signals will, in many cases, mirror actions or motions already familiar to employees. For instance, a gadget may form a see through passage through which an employee can view an affordance to spatially target the affordance for control. Here, the gadget shape will intuitively invite an employee to visually target affordances. As another instance, rotation of a gadget while targeting a specific affordance may adjust an operating characteristic such as audio volume, light intensity, etc., mirroring rotation of a control knob. As another instance, in some cases movement of a gadget up or down while targeting a lighting device may adjust light intensity or some other operating characteristic up or down accordingly.

In many cases, a single gadget may be used to control many different affordances within a space. For instance one gadget may be programmed to control each of lighting devices, HVAC devices, audio devices and content display devices or other device types within a space 28. In at least some cases a gadget may operate in any enterprise space that has controllable affordances. For instance, a single gadget used to control content on a first display screen in first conference space may be moved to a second conference space and used to control content on a second display screen mounted in the second space. In many cases gadget location in different enterprise spaces as the gadget is moved from space to space may be automatically tracked via wireless access points, blue tooth or other wireless beacons in spaces or egresses between spaces, etc., and control signals generated by a gadget may automatically be associated with affordances in a space currently occupied by the gadget. Thus, for instance, referring again to FIG. 1, an employee may use a first gadget 40 to control light intensity generated by light devices 22a-22n in first space 12a and may then move to second enterprise space 12b and us the same first gadget to control content presented on a large flat panel display screen without having to do anything to select a different control function on the gadget.

Figure 2:
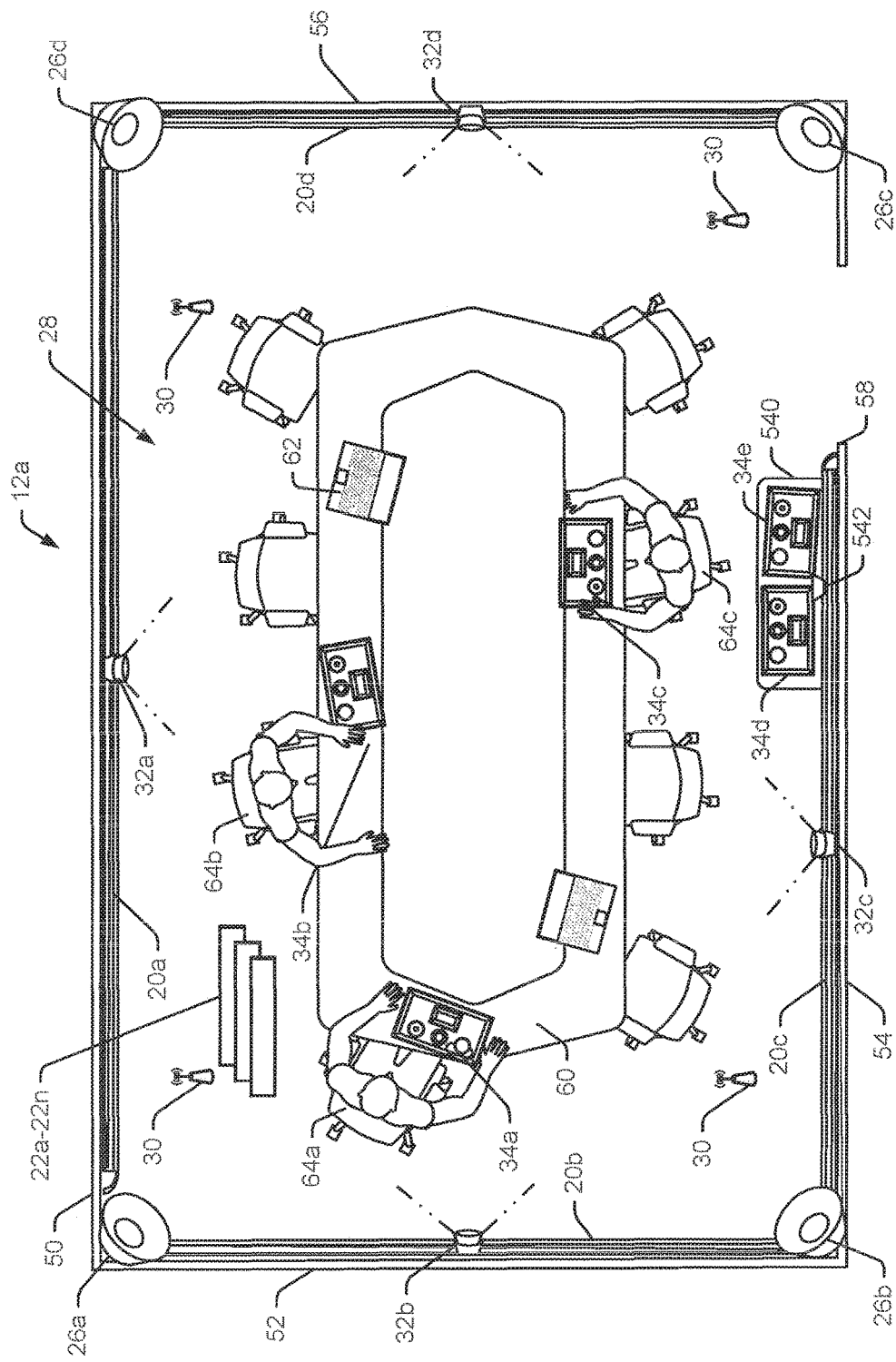
FIG. 2 is a top plan view of one of the spaces of FIG. 1 showing varous exemplary affordances.

Referring to FIG. 1 and also to FIG. 2, exemplary space 12a includes four wall structures 50, 52, 54 and 56 that form a rectangular space 28 that includes a single egress 58 for entering and leaving the space 28. While not shown, a hinged or sliding door may be provided at egress 58 for closing space 28 off from a surrounding external space. Large flat panel display screens 20a through 20d are mounted to the internal surfaces of wall structures 50, 52, 54 and 56, respectively, where each of the screens extends laterally along substantially the entire width dimension of an associated wall structure. Cameras 32a through 32d are mounted above each of the screens 20a through 20d, respectively, and each camera is directed so that its field of view is along a direction into space 28. Light devices 22a through 22n are mounted to a ceiling (not illustrated) surface or other supporting structure in space 28. The light devices may be arranged throughout the space 28 and may be controllable as a group or independently so that different light devices have different instantaneous operating characteristics. When controlled as a group, all devices may be controlled to have identical operating characteristics or, alternatively, to have different operating characteristics at different times. For instance, light devices above a conference table in space 28 may be bright while devices around the perimeter of space 28 are dimly lit to create one lighting effect. Referring still to FIGS. 1 and 2, speakers 26a through 26d are mounted at the corners of space 28 for generating sound in the space. Like the light devices, the speakers may be controlled as a subset or independently to create different audio effects. In addition to the above components, other affordances in space 28 include a large conference table 60 and a plurality of task chairs 64a, 64b, 64c, etc., arranged about the table 60 to support employees in space 28. Laptops or other personal computing devices 62 may be located in space 28 for use by employees.

Figure 3:
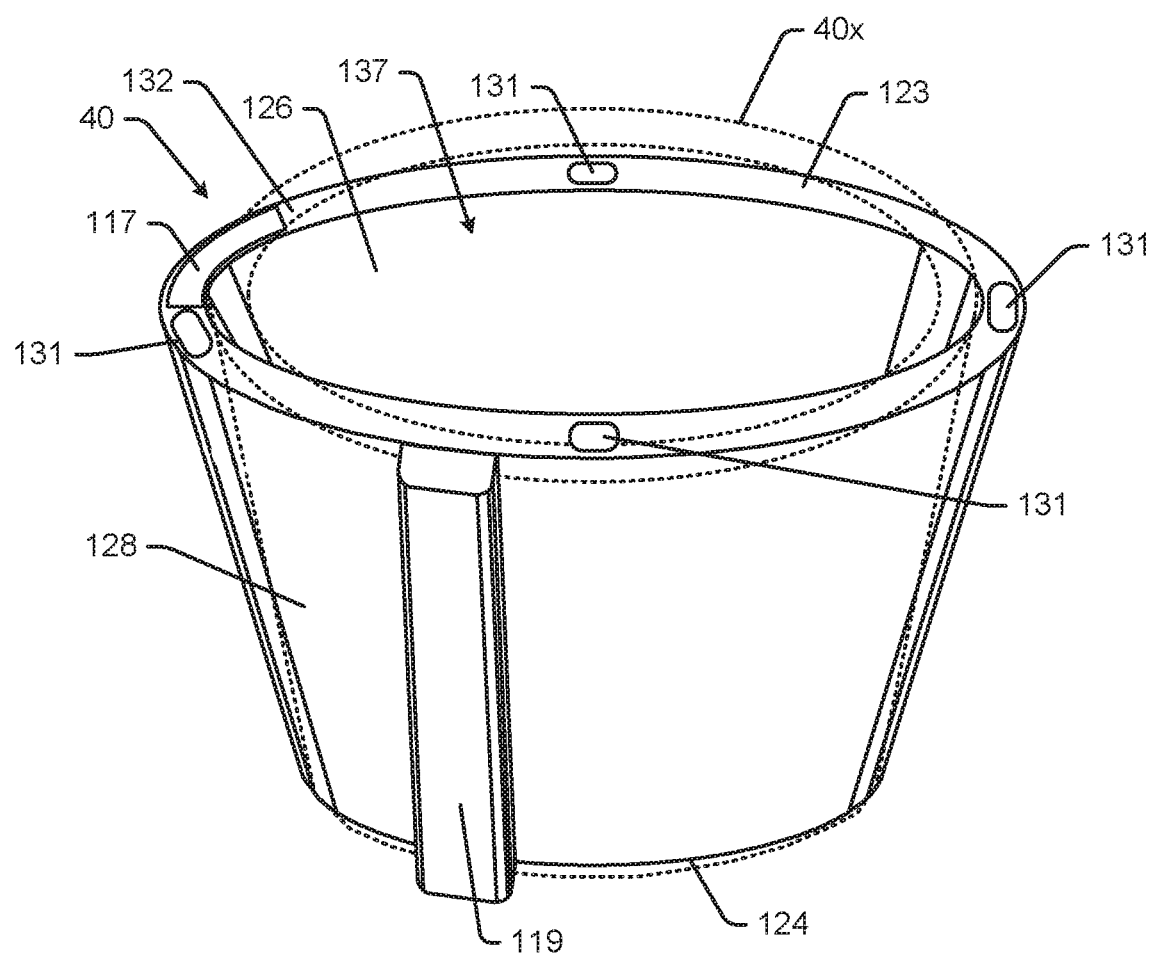
FIG. 3 is a perspective view of a cone shaped gadget that is consistent with at least some embodiments of the present disclosure.
Figure 4:
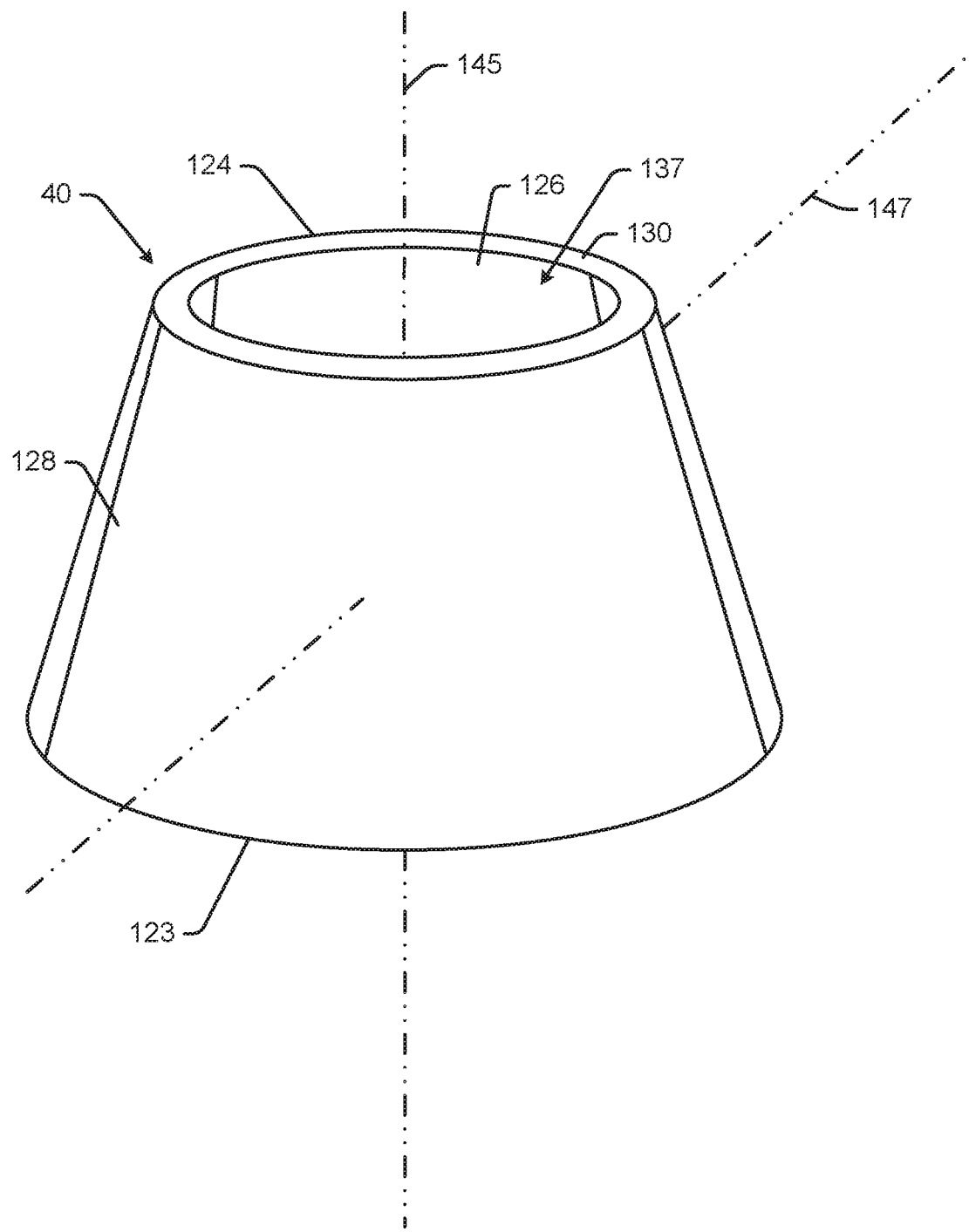
FIG. 4 is similar to FIG. 3, albeit illustrating a different exemplary gadget shape that does not include a mechanical registration rib.

Referring still to FIG. 1 and now also to FIGS. 3 and 4, one exemplary and particularly useful interface gadget is referred to hereinafter as a "cone" gadget 40. Cone gadget, as the label implies, has a cone shape having large and small circular end edges 123 and 124, respectively, and frusto-conical inner and outer surfaces 126 and 128, respectively, where the inner surface forms a frusto-conical passage 137. In at least some embodiments each end 123 and 124 includes a flat circular surface having a radial dimension between the inner and outer surfaces 126 and 128. In at least some embodiments the inner and outer surfaces 126 and 128 are substantially parallel to each other so that the radial dimension between the inner and outer surfaces is substantially constant at all points within gadget 40. In other embodiments the inner and outer surfaces may have different slopes with respect to an axis through a central location of gadget 40 so that the circular end surfaces 130 and 132 have different radial dimensions. In some cases the radial dimensions of each circular end surface may be consistent at all locations about the circumference of the gadget while in other cases the radial dimension may change along the circumference (e.g., be wider at one point and narrower at an opposite point along the circumference, tapering between the two points).

In at least some cases some type of mechanical registration feature may be presented on a gadget that can be felt via a user's fingers. For instance, see again FIG. 3 where gadget 40 includes a rib 119 that extends outward from the external surface 128 and between the gadget ends 130 and 132. Here, when an employee picks up gadget 40, like a seem on a football, rib 119 can be sensed by touch without ever looking at the rib and gadget 40 can be rotated into a known operating position with respect to the employee's hand.

Mechanical registration features like rib 119 are particularly important in cases where a gadget has features that are orientation dependent. For instance, in FIG. 3 a small display screen is shown on edge 132 at 117 where the screen is only located along one section of edge 132. Screen 132 may, for instance, be provided to enable feedback to a gadget user on affordances being targeted therewith. By providing rib 119 in a specific juxtaposition to screen 117, an employee can use rib 119 as a tactile screen aligning feature when using gadget 40.

In other embodiments gadget 40 may not have features where orientation is important and the gadget itself may adjust its features to accommodate for any orientation that occurs. For instance, referring to FIG. 4, assume that a full annular or ring shaped emissive surface is provided on edge 130. Here, when gadget 40 is held up to target some space affordance, the orientation of gadget 40 may be automatically determined and a top portion of the annular edge screen may present whatever information would be presented via display 117 in FIG. 3. Here, where gadget 40 is rotated about axis 145 so that the top portion of the annular edge screen changes, gadget 40 would simply move the presented information along the annular screen to maintain that information at the top of the annular screen. To the employee, even while gadget 40 is rotating, the presented content would appear to persist at the upper portion of the gadget edge 130.

While not shown on all of the gadgets described in this disclosure, a mechanical registration feature may be provided on any of the contemplated gadgets.

Figure 5:
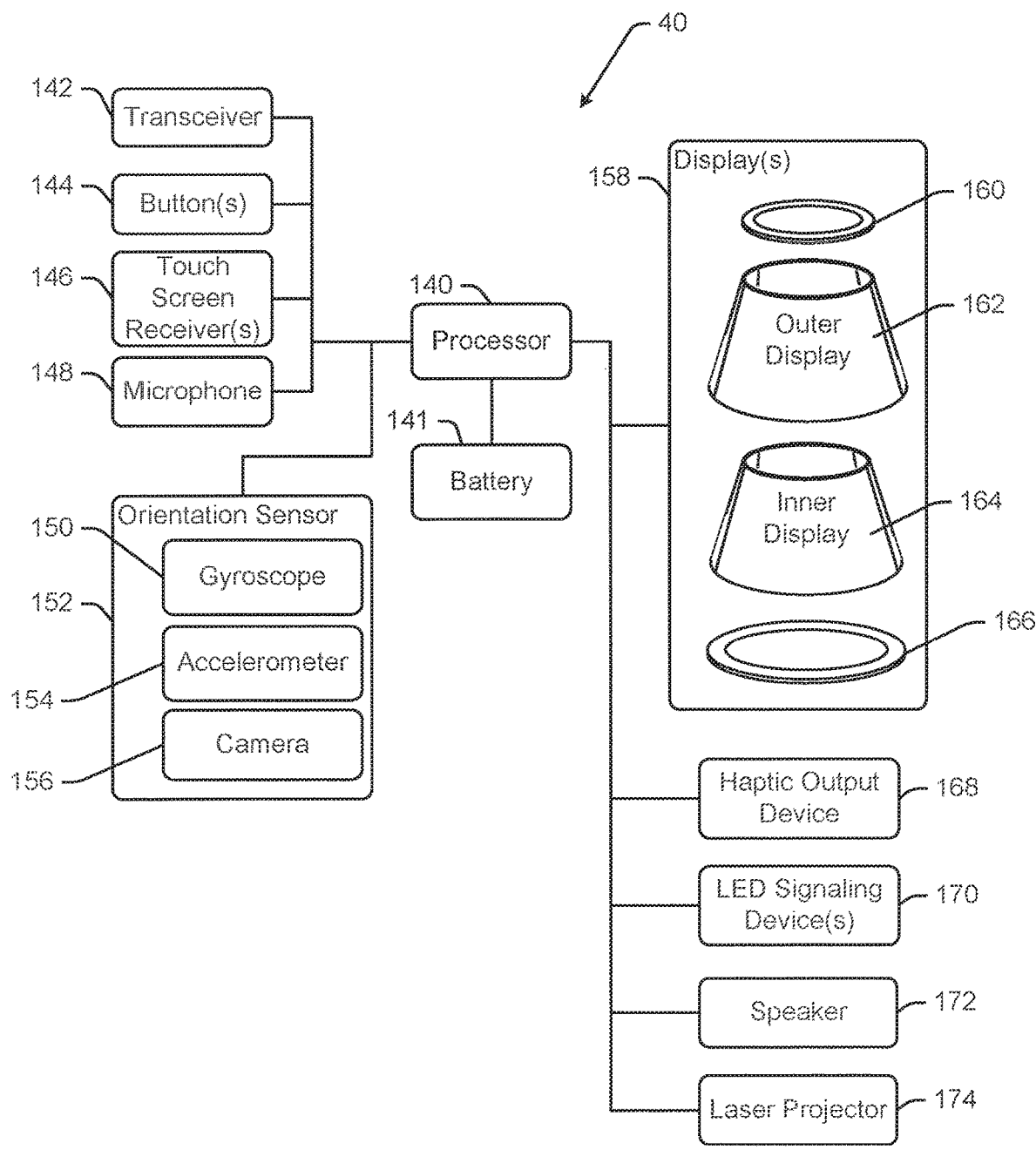
FIG. 5 is a schematic illustrating exemplary components that may be included in the gadgets of FIGS. 3 and 4.

Referring now to FIG. 5, one set of possible cone gadget components is illustrated. While several components are shown in FIG. 5, it should be appreciated that different embodiments of gadget 40 are contemplated herein where different embodiments would include different subsets of the illustrated components. For instance, a relatively complex cone gadget 40 may include all of the components illustrated in FIG. 5 while a simple cone gadget may only include a subset of the illustrated components. Hereafter, initially, a relatively simple cone gadget and its operation in use will be described followed by more complex versions of exemplary cone gadgets. To the extent that some features or capabilities are described in the context of one cone assembly and not the other, it should be appreciated that any cone gadget may be modified to have capabilities associated with another cone gadget as described herein and still be consistent with the present disclosure.

Referring again to FIGS. 1 and 3 through 5, in addition to including a structural element that forms the shape shown in FIGS. 3 and 4, a simple exemplary cone gadget includes a processor 140, a battery 141 and a transceiver 142, where the battery and transceiver are linked to processor 140. In addition, in at least some embodiments, gadget 40 or the overall system of FIG. 1 will include some type of orientation sensor 152. For instance, gadget 40 may include a gyroscope 150 and/or an accelerometer 154 or other sensing devices linked to processor 140 that generate signals for processor 140 to use to determine gadget location and orientation within space 28. In still other cases, referring also to FIG. 2, space 28 cameras may cooperate with gadget mounted sensors 150, 152, etc., to determine device location and orientation in space 28. For instance, space 28 cameras may obtain images including gadget 40 in space 28 that can be used to relatively precisely locate gadget 40 in space 28 and then on-gadget sensors 150, 152, etc., may be used to identify precise gadget orientation. Gadget 40 location and/or orientation calculated by gadget processor 140 may be transmitted to system server 14 via transceiver 142 and access points 30 essentially in real time at those parameters are calculated.

In still other cases, gadget 40 may transmit signals to access points 30 which are useable by server 14 to triangulate gadget location 40 within space 28 (e.g., via signal strength or time of signal flight as well known in the art). In still other cases, server 14 may transmit location determining signals via access points 30 to gadget 40 which processor 140 uses to calculate gadget location in space 28 and that location information and orientation information may be transmitted back to server 14 via access points 30.

In addition to detecting location and orientation, the gadget processor 140 may also be programmed to use sensed movements from devices 152 to detect subtle and not so subtle movements of gadget in space 28 and the processor 140 may ascribe different affordance commands to different movement types. For instance, placement of gadget 40 on a table surface (e.g., the top surface of table 60 in FIG. 2) with either end 123 or 124 facing down may cause gadget 40 to enter a sleep mode in which gadget 40 does not generate any control signals and the sensor devices 152 recalibrate based on which end is up and an assumption that the gadget 40 is resting on a flat horizontal surface. Here, when an employee grabs gadget 40 to use the gadget, processor 140 may detect the initial movement and immediately transition gadget 40 into an awake state in which processor 140 tracks orientation and location and attempts to discern the different movement types as well as targeted affordances.

Figure 6:
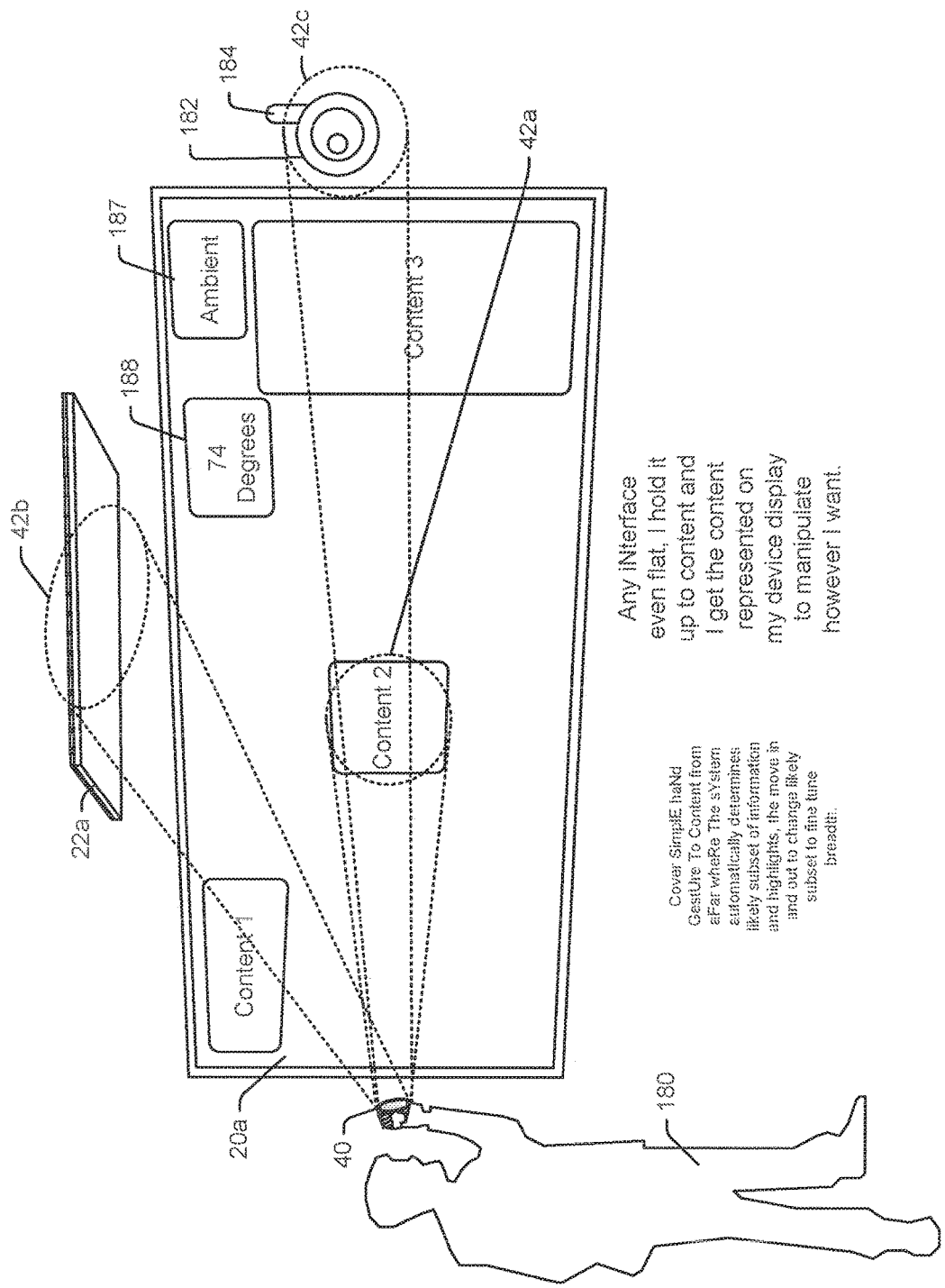
FIG. 6 is a schematic illustrating an employee using one of the gadgets of FIG. 3 to target various affordances or target items in a conference space.

Referring now to FIG. 6, exemplary large flat panel display 20a and light device 22a are illustrated that may be located in space 28 as shown in FIG. 2. In addition, an exemplary wall mounted thermostat 182 is shown adjacent display 20a. In at least some embodiments gadget 40 may only be used in a single orientation relative to an employee so that one end of gadget 40 has to be generally pointed in the direction of a controllable affordance to perform at least some control functions associated therewith. For instance, in some cases the wide diameter end 123 of gadget 40 may need to be pointed at a light device 22a to control device 22a operating characteristics. In FIG. 6, an exemplary field of view (FOV) associated with gadget 40 is shown at 42b where the field of view includes at least a portion of light device 22a. Here, it is contemplated that an employee 180 may hold gadget up with narrow diameter end 124 proximate the employee's eye and look through (e.g., target) gadget passage 137 at an affordance, in the present example, light device 22a, that is to be controlled.

In at least some cases, viewing an affordance 22a through passage 37 may cause system server 14 to set up a virtual link between gadget 40 and affordance 22a so that gadget 40 can be used to control the affordance viewed through passage 37. In the case of light device 22a, for instance, once gadget 40 is associated with light device 22a, in at least some cases, rotation of gadget 40 about a central axis (see 145 in FIG. 4) there through may cause light intensity of device 22a to be adjusted up or down. Here, in at least some cases, the simple task of adjusting light intensity by gadget 40 rotation may serve as substantially immediate feedback to a controlling employee indicating that gadget 40 is currently associated with light device 22a.

Where there are more light devices 22b through 22n in space 28, in some cases all of the light device intensities may be tied together so that controlling intensity of one light device results in intensity of all light devices being controlled. In some cases targeting and controlling one light device in a space that includes many light devices may cause the set of light devices in the space to cycle through different lighting effects until a desired effect occurs where different light devices generate different intensities or colors and the combined effects of all light devices result in the desired effect. For instance, a first effect may have all light devices in a space generate white high intensity light, a second effect may have all light devices in the space generate yellow high intensity light, a third effect may have all light devices in the space generate a blue high intensity light, a fourth effect may have all light devices in the space generate a low intensity white light, a fifth effect may have light devices over a central conference table generate high intensity white light and other light devices about the periphery of the space generate low intensity yellow light, etc. In other cases it is contemplated that each of several light devices in a space 28 may be independently controlled via gadget targeting of the separate devices.

In some embodiments there may be controllable affordances where changing a control command does not immediately result in a discernible change in operating characteristics of the affordance. For instance, in the case of the thermostat in FIG. 6, changing a target HVAC temperature does not immediately change temperature in an associated space 28. In these cases, it is contemplated that affordances may be equipped with other signaling components to provide selection and control feedback to an employee using an interface gadget 40. For instance, in the case of thermostat 182, an LED or some other signaling device 184 may be provided on the affordance 182 that lights up when gadget 40 is used to target the affordance 182 as indicated by FOV 42c. In some cases signaling device 184 may be able to indicate different states including a first state (e.g., a red color) that indicates that gadget 40 has successfully targeted the thermostat 182 for control, a second state (e.g., a green color that blinks off and on for each degree change) indicating an increase in target temperature and a third state (e.g., a yellow color that blinks off and on for each degree change) indicating a decrease in target temperature. Here, clockwise rotation of gadget 40 may cause processor 140 to generate a temperature increase while counterclockwise rotation causes a decrease in target temperature. Instead of including a light signaling device 184, thermostat 182 or any other controllable affordance may include a speaker or other audio generating device controlled to emit audio signals or even a voice signal confirming reception of control commands.

Even in cases where the result of a control signal is immediately noticeable from a change in operating characteristics of an affordance, the affordance may be controlled to indicate initial selection of the affordance for control prior to generating any control signals for the affordance. For instance, in the case of light device 22a in FIG. 6, simply targeting light device 222a via gadget 40 may cause light device 22a to indicate a successful gadget-affordance association by, for instance, blinking the intensity of light device 22a from a set level to some other (e.g., higher or lower) level where the intensity difference is discernible to indicate gadget-light device association. Thereafter, gadget 40 could be rotated or otherwise moved to control intensity as described above.

In cases where two or more different affordance characteristics can be controlled independently, gadget 40 may be moveable through various clearly distinguishable motions where each motion is associated with a different control function or command. For instance, to adjust the color or temperature of light generated by light device 22a an employee may be able to tip gadget 40 about a substantially horizontal 147 axis (see FIG. 4) that is perpendicular to central axis 145. Tipping gadget forward or reverse may cause the color generated by device 22a to cycle through light colors that device 22a can generate until a color preferred by the employee is generated.

Other distinguishable motion sequences may be used as command triggers for controlling light intensity, color, and even other functions or capabilities like setting intensity or color cycling of space lighting devices 22a through 22n. For instance, in addition to rotation and front and rear tipping motions, other discernible motions may include pushing gadget 40 forward toward an affordance or pulling gadget 40 backward away from an affordance, quick tipping of gadget 40 to either the left or the right about a substantially vertical axis while gadget passage 37 is substantially horizontal, panning gadget 40 left, right, up, down, or in any intermediate direction between those four directions that is discernible from the other directions, shaking the gadget, placing the gadget at some specific location on a table top, in a tray, with respect to some other space affordance (e.g., another gadget), etc. In addition, different degrees and/or rates of tipping, rotating, shaking, pushing or pulling and panning may be discernible and each may be associated with different control commands. For instance, relatively slow rotation of gadget 40 while targeting lighting device 22a may adjust light intensity while a quick rotate to the left changes a lighting device characteristic selected for control (e.g., may change the selected characteristic from intensity to color).

Referring again to FIG. 3, in at least some embodiments it is contemplated that gadget 40 may be at least somewhat resiliently flexible so that its shape can be pressed inward at one or both ends as shown in phantom at 40x to indicate yet another control motion. Here, for instance, aiming gadget 40 at an affordance and compressing an end of gadget closest to the affordance may indicate an affordance selection action while compressing the end of gadget furthest away from the affordance may indicate a de-selection action. For example, a close end (e.g., the gadget end closest to an affordance) compression may cause selection of specific targeted content on a display screen simulating a grasping action and a far end (e.g., the gadget end furthest from an affordance) compression may cause the previously selected content to be moved onto a different target location on a display screen simulating a squeezing action (e.g., squeezing the content out onto the targeted display surface).

Hereinafter, unless indicated otherwise, the phrase "target object" will be used generally to refer to any affordance within a space, any content set that is presented on a display screen in a space or even any section of a display screen in a space regardless of whether or not content is currently displayed in the screen section that is targeted using one of the interface gadgets. Thus, for instance, referring again to FIG. 6, each of light device 22a, thermostat 182, content 1, content 2, content 3, or even section 1 (or any other section of the display screen surface) that does not currently include content may comprise a target object.

Hereafter, several exemplary gadget motions or movements will be described for controlling target objects. Nevertheless, it should be appreciated that any gadget may be programmed with a different set of motions or movements for generating specific target object commands. In particularly advantageous embodiments the movements or motions will be intuitive and, as described herein, will mirror activities that employees will already associate with specific types of affordance control. In the figures included in this specification, exemplary gadget motions or machinations are indicated via activation fields that indicate an action and a resulting or associated gadget command. For example, see activation field 200a in FIG. 8 where an action includes a gadget push forward toward display screen 20a (e.g., an affordance) where the action results in a gadget command to zoom or shrink a selection field for selecting an area on the screen. As another example, see activation field 200c in FIG. 9 where an action include pushing a quick gadget rotate left that exceeds 15 degrees and where the action results in a gadget command to select highlighted content on a display screen. Many other exemplary activation fields are shown in FIG. 9 and figures subsequent to FIG. 9.

Referring to FIG. 6, three different content subsets including content 1, content 2 and content 3 are presented via display screen 20a near an upper left corner, a central section and the lower right corner of the screen 20a, respectively. Any of content 1, content 2 and content 3 may be targeted as a target objet for control via gadget 40 in a fashion similar to that described above with respect to lighting device 22a and thermostat 182 by aiming gadget 40 via the gadget passage 37 at one of the content subsets (e.g., viewing a content subset through the passage 37). In the figures that follow, numeral 220 is used to identify exemplary content 2.

Figure 7:
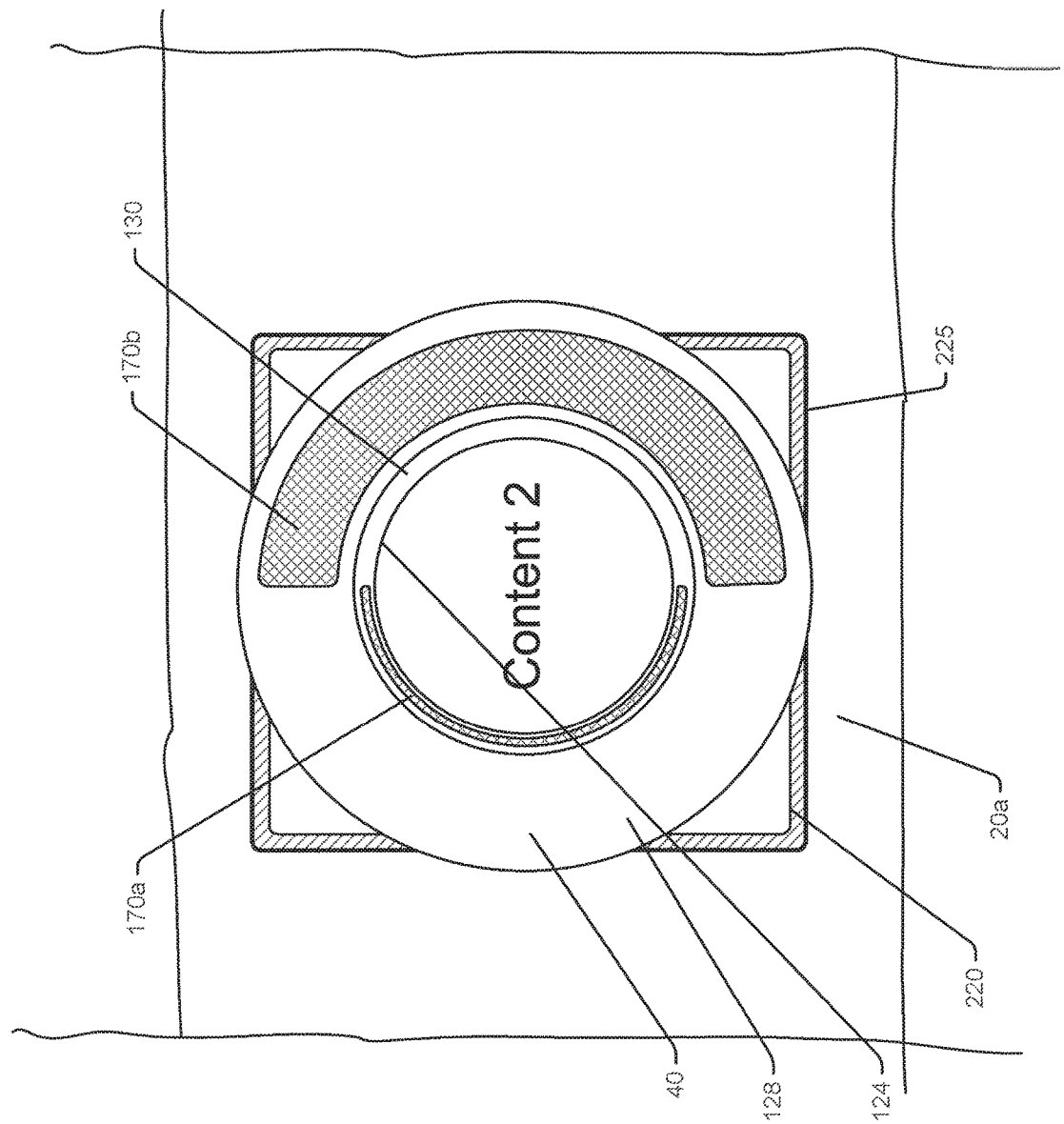
FIG. 7 is a schematic illustrating an end view of the gadget of FIG. 6 aimed at content on a display screen.

While embodiments are contemplated where targeted content on a display is not distinguished in any fashion, in most cases it is contemplated that target content or a target selection border should be highlighted or otherwise visually distinguished so that a gadget user can discern when and which content or display area comprises a current target object on a display screen. Hereinafter, unless indicated otherwise, a current target area field on a screen will be indicated by left up to right cross hatching (see 220 in FIG. 7) and a selected target object, content or area will be indicated by double horizontal cross hatching (see 260 in FIG. 9). Thus, referring still to FIGS. 6 and 7, when an employee 180 uses gadget 40 to initially target content 2, a field including content 2 may be highlighted or otherwise distinguished visually (e.g., the content in the field may be increased slightly in size, may be wiggled as a separate object on the screen for a short period or persistently, etc., as indicated by highlighted border 225.

In at least some cases, server 14 will automatically identify a likely target object in the area aimed at via a gadget 40. Thus, for example, where gadget 40 is aimed at a left section of content 2, server 14 may automatically identify all of content 2 as a logical subset of related content and may then highlight all of content 2 on display 20a using a highlighted aiming box or field as shown at 225 in FIG. 7. In at least some cases the simple task of holding gadget up and targeting an area of display 20a will cause server 14 to identify a likely intended target object and highlight the object with an aiming field without requiring any other step by the employee. In other cases, the aiming field may only be presented in response to some type of "select on" command (e.g., a sensed quick rotate left of gadget 40).

Figure 8:
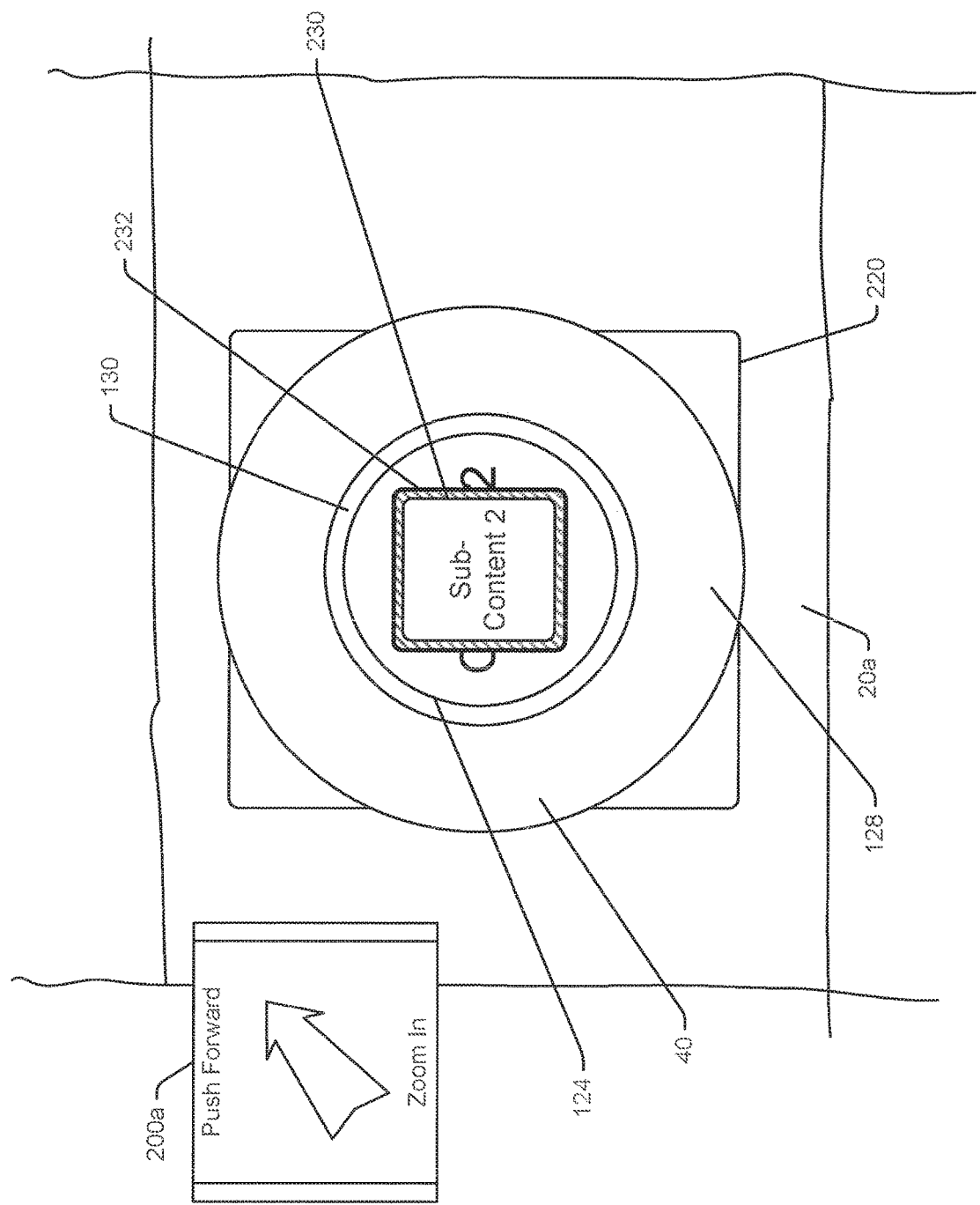
FIG. 8 is a schematic similar to FIG. 7 illustrating a zoom in motion using the gadget of FIG. 7.
Figure 9:
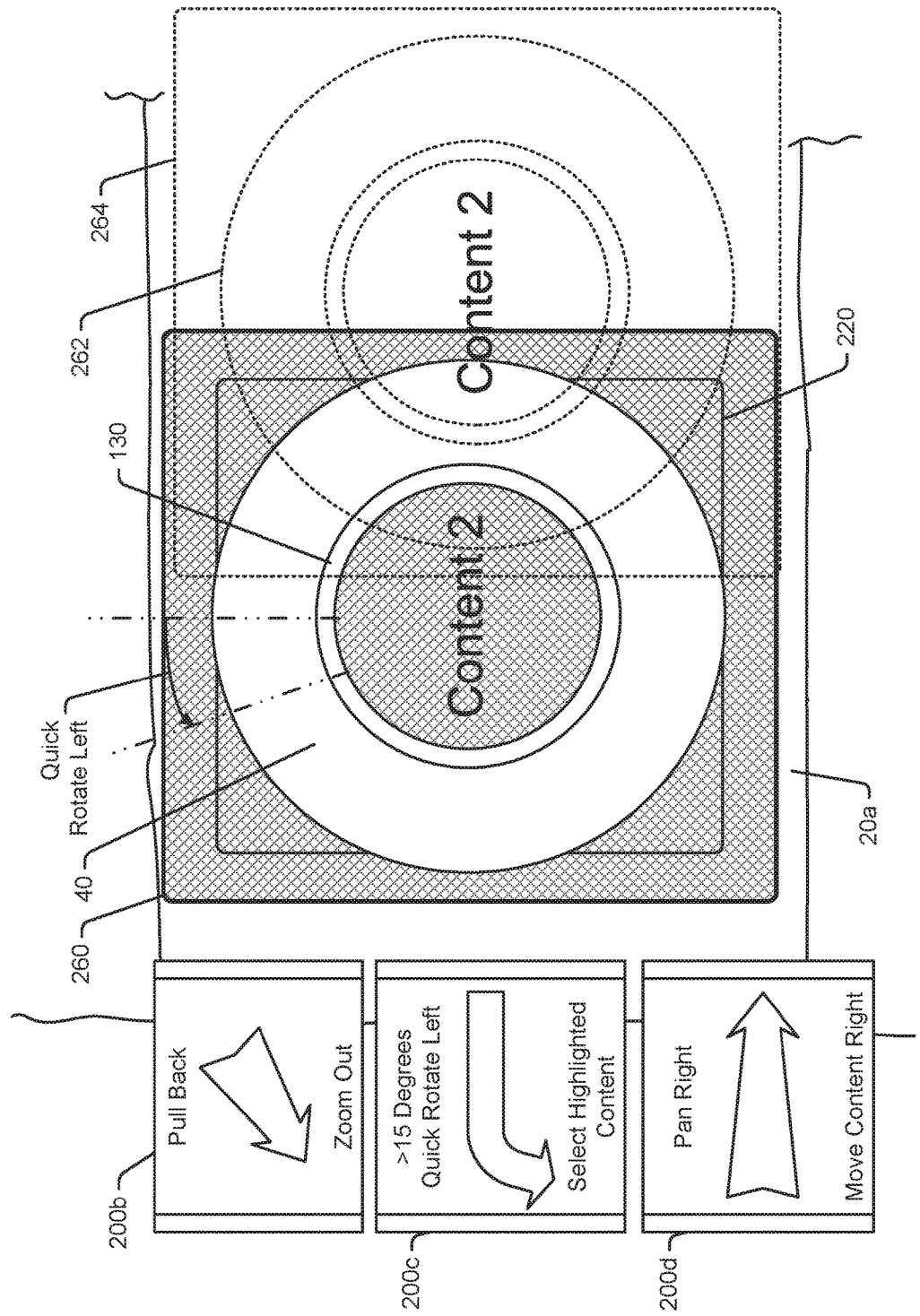
FIG. 9 is a schematic similar to FIG. 8, albeit illustrating several other exemplary gadget actions and their effects.

After a highlighted aiming field 225 is provided to indicate a target object, referring to FIG. 8, gadget 40 may be moved toward (e.g., pushed forward as indicated by command field 200a) display screen 20a to generate a zoom in or shrink command for the highlighted aiming field. To this end, see the smaller highlighted aiming field 230 that covers only a sub-content 2 area.

In the alternative, after a highlighted aiming field is presented to indicate a target object, the aiming field may be enlarged by pulling gadget 40 back as shown in FIG. 9 at command field 200b so that an enlarged aiming field 260 is highlighted. Once the enlarged aiming field is presented, a quick rotate left gadget action as indicated by field 200c may cause selection of the larger target object associated with the aiming field 260 as indicated by the double cross hatching in FIG. 9.

Figure 10:
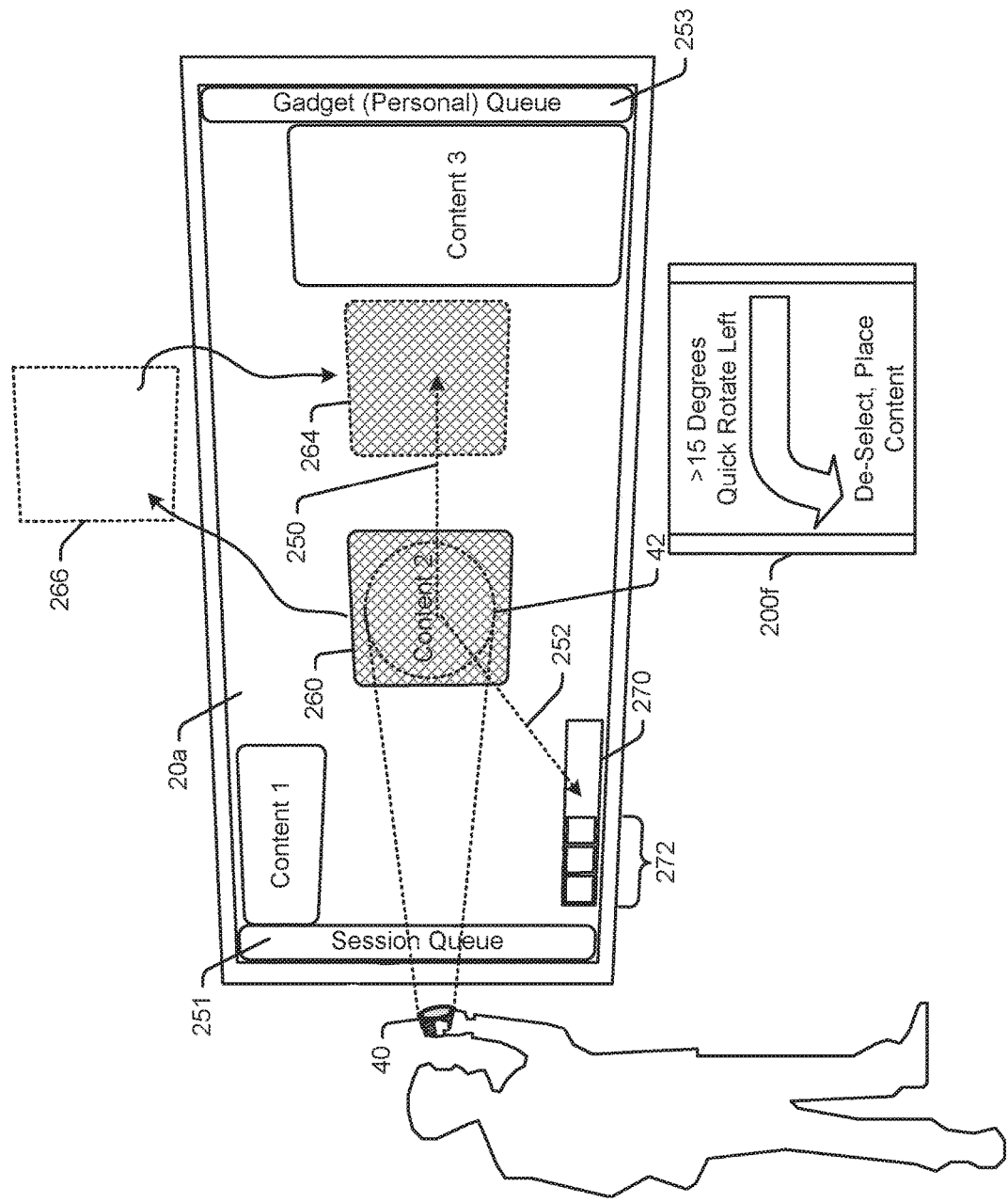
FIG. 10 is similar to FIG. 6, albeit illustrating other actions and system features.

After a target object on the screen 20a has been selected, yet another gadget action including panning the gadget 40 to the right as indicated in field 200d may cause the selected target object to be moved to the right to follow the trajectory of gadget 40 as indicated in phantom at 264 and 262. See also FIG. 10 in this regard where content 2 and field 260 is generally moved to the location indicated at 264 as gadget 40 pans along the path indicated by arrow 250. In FIG. 10, a de-select control field 200f indicates that another quick rotate left action with gadget 40 operates as a command to server 14 to deselect the content in field 264 to drop that content at the current location aimed at via the gadget 40.

Figure 11:
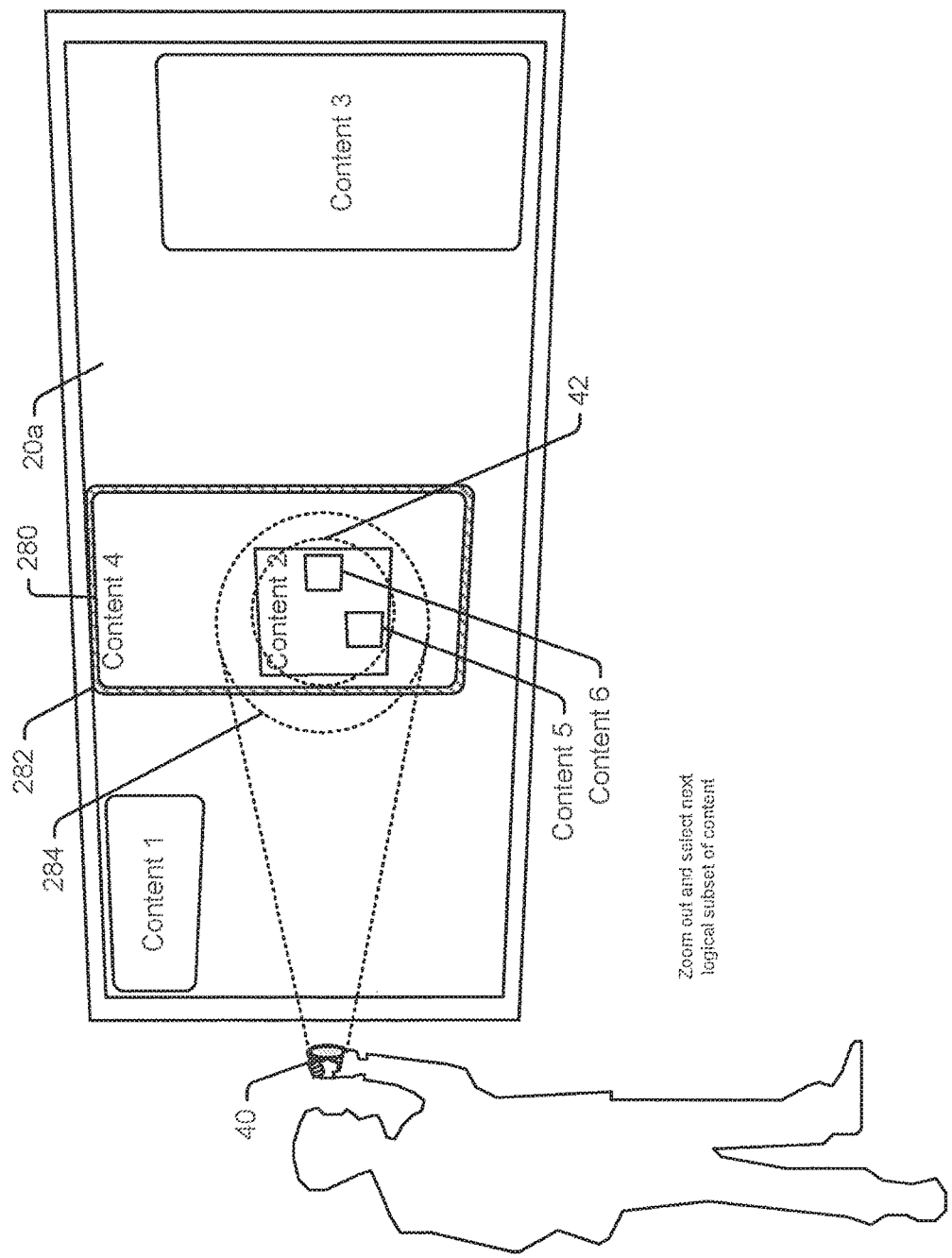
FIG. 11 is similar to FIG. 10 albeit illustrating other exemplary actions and features of the system.

In other embodiments, after an initial target object is highlighted via an aiming field, any in or out zooming action of the gadget 40 may cause server 14 to identify a different likely intended content subset that includes content that is logically associated in some fashion as opposed to simply equally increasing the dimensions of the original aiming field (e.g., just increasing or decreasing square dimensions). For instance, referring again to FIG. 7 and now also to FIG. 11, after initial aiming field 225 is presented around content 2, if an employee moves gadget away from screen 20a as indicated by larger FOV 284 in FIG. 11 so that the FOV is larger than the initially targeted area, server 14 may determine that a next logical content set associated with the larger FOV includes all of a larger content 4 set as indicated at 280. Here, a new aiming field 282 that highlights the larger content 4 area may be presented automatically.

Figure 12:
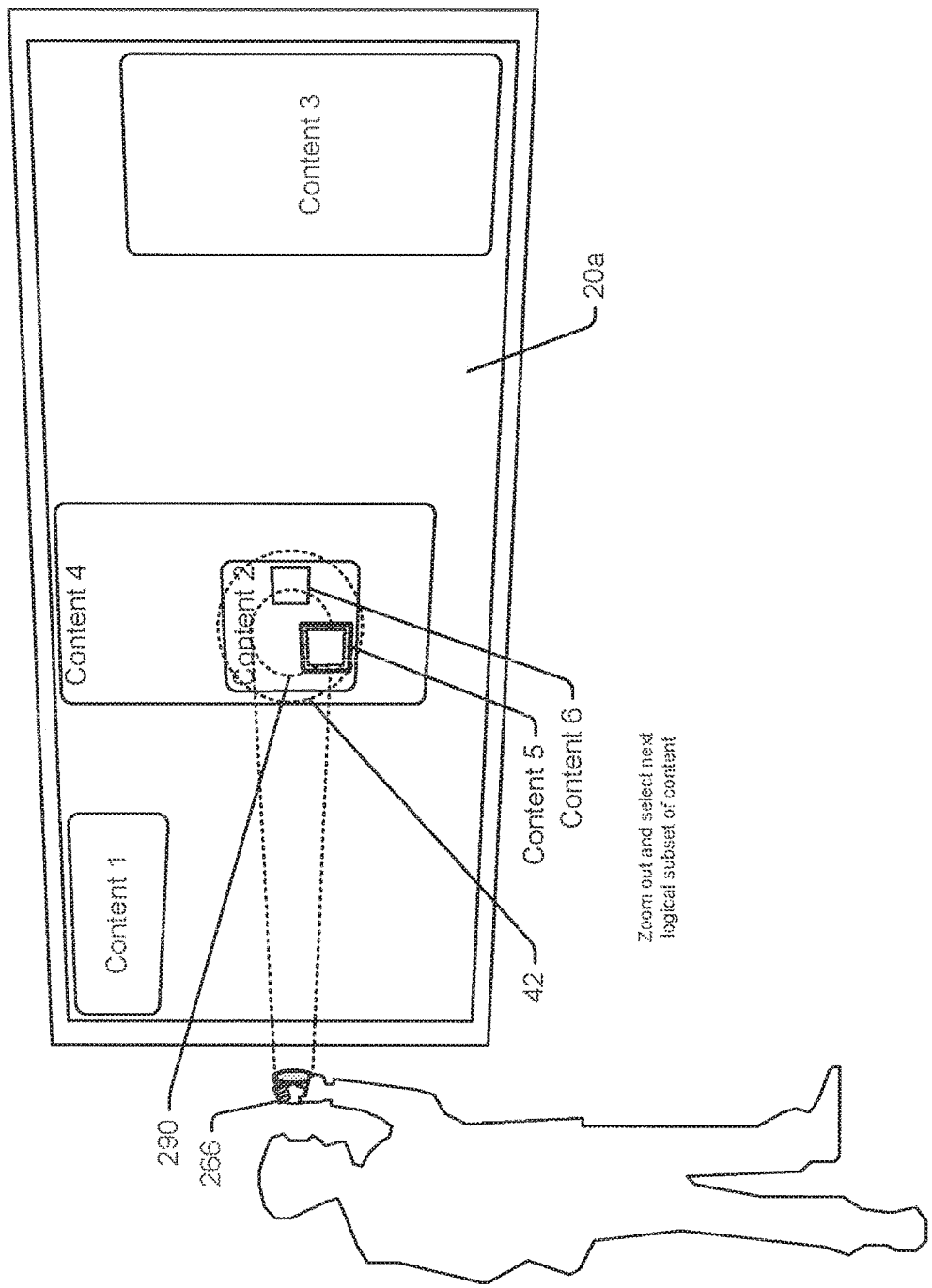
FIG. 12 is similar to FIG. 10 albeit illustrating other exemplary actions and features of the system.

Similarly, referring again to FIG. 7 and now also to FIG. 12, after initial aiming field 225 is presented around content 2, if an employee moves gadget toward screen 20a as indicated by smaller FOV 290 in FIG. 12 so that the FOV is smaller than the initially targeted area, server 14 may determine that a next logical content set associated with the smaller FOV includes a specific smaller content set content 5. Here, a new aiming field 291 that highlights the smaller content 5 area may be presented automatically. Prior to selecting the content in aiming field 291, if the employee pans gadget 40 right, the server 14 may automatically identify the next content set in the panning path (e.g., content 6 as illustrated in FIG. 12) and then automatically present an aiming field (not shown) about that next most likely intended target object. Thus, server 14 may cooperate with other system components to help an employee use gadget to quickly hunt for intended target objects.

Figure 13:
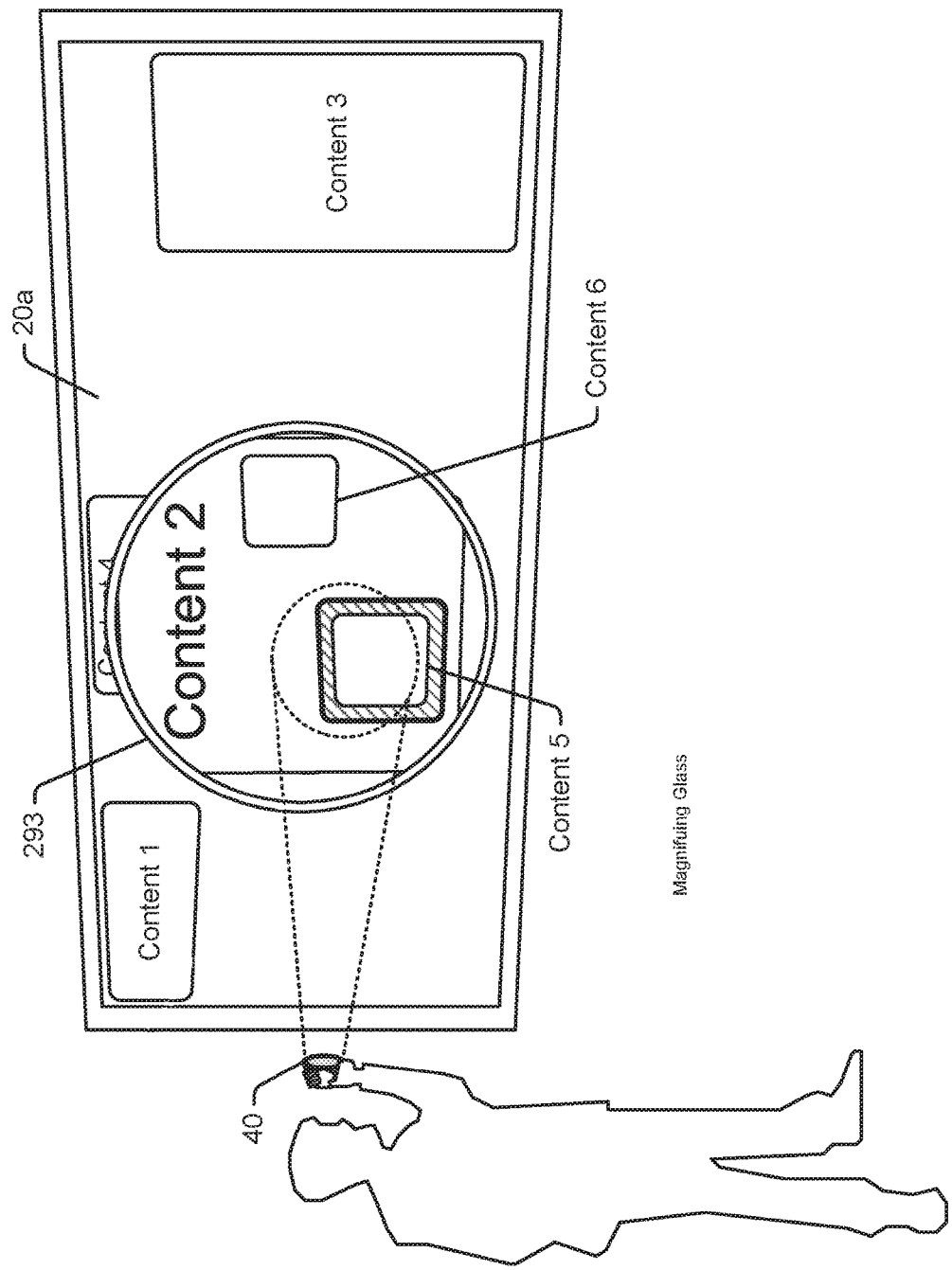
FIG. 13 is similar to FIG. 10 albeit illustrating other exemplary actions and features of the system.

In some cases it is contemplated that server 14 may automatically at least temporarily enlarge portions of content on display 20a during a target object hunting process. To this end, see FIG. 13 where a section of the display 20a content has been enlarged in a magnifying window 293. Here, referring also to FIG. 12, once gadget 40 is controlled to zoom in on a small area of the display surface as at 290, server 14 may automatically present the magnifying window 293 and content at least proximate the small area 290. Again, in FIG. 13, an aiming filed is provided about the most likely target object based on trajectory of gadget 40.

In addition to moving content type target objects about on a display screen 20a, it is contemplated that gadget 40 may be used to move content type target objects among display screens. For instance, after selecting a target field on screen 20a, an employee may pan to aim gadget 40 at display screen 20d and then perform a de-selection gadget action to drop the content on screen 20d.

In at least some cases, when a selected target field is panned off a screen (e.g., to a side, the top or the bottom edge of screen 20a) as shown in phantom in FIG. 10 at 266, the content may become virtually "associated" with gadget 40 until deselected. For instance, once a target field is moved to the location 266, if the employee then walks out of the space including screen 20a with gadget 40, the content may remain associated with the gadget. Here, if the employee takes the gadget into a different space (e.g., 12b in FIG. 1), aims gadget 40 at a screen in the new space 12b and then performs a deselect or content dumping action, the content in the target field associated with the gadget may be dumped onto the targeted screen. In this case, server 14 tracks movement of the gadget from one space to the other and associates the gadget with the other space once gadget 40 is moved into that space so that target object-gadget association can be made and content associated with the gadget 40 can be represented on displays in the new space. In other words, in at least some cases, a gadget 40 may be automatically associated with the enterprise space in which the gadget is currently located.

In other cases, when a gadget is removed from a specific enterprise space, any content or content queue that was associated with the gadget in the initial space (e.g., the space from which the gadget is removed) may be completely disassociated with the gadget. By automatically disassociating a gadget from content based on gadget location, the problem of inadvertently and unintentionally moving and presenting content from one space in another enterprise space can be avoided. In this case, if the gadget were moved to a second enterprise space such as 12b in FIG. 1, server 14 may track the location of the gadget and automatically associate the gadget with the new space 12*b* so that the gadget can be used in the new space.

In at least some embodiments where affordances in a space include at least one display screen and some other controllable affordance, the display screen may be used to signal control information related to the other affordances during affordance control activities. For instance, referring again to FIG. 6, when gadget 40 is used to target thermostat 182, a current threshold indicator may be presented on display screen 20*a* as shown at 188. Here, once the current temperature indicator 188 is presented, the temperature setting may be changeable by gadget 40 action such as rotation of gadget 40 clockwise or counterclockwise and a changing target temperature value may be updated accordingly via indicator 188. Similarly, when gadget 40 is aimed at light 22*a*, a current light intensity indicator (not illustrated) may be presented on screen 22*a* to be updated as intensity is increased or decreased. If an employee uses gadget 40 to cycle through different light characteristics to be controlled, the intensity indicator may be replaced with a different indicator (e.g., light temperature) indicating a current state of the other characteristic.

In some cases it is contemplated that employees may participate in meetings or conferences where content is generated or otherwise shared during the session that needs to be removed and, at times, re-accessed, during the session or subsequent to the session. In at least some embodiments, referring still to FIG. 10, it is contemplated that a session queue field 270 may be presented on at least one common display screen within a space 28 that can be used to store and then subsequently access session content. In FIG. 10, exemplary queue field 270 includes a field border that distinguishes the queue field from other space on the screen 20*a*. In some cases, as content is stored in a session queue, a thumbnail like the exemplary thumbnails shown at 272 that includes a small version of the content may be presented in field 270. To move a highlighted selected target object into the queue and remove that object from display 20*a*, an employee may pan the content down into queue field 270 as indicated by arrow 252 followed by a de-select action (e.g., quick rotate left as indicated at 200*f*) causing sever 14 to present an associated thumbnail in field 270 and to remove the content from display 20*a*.

In at least some cases, to retrieve content from queue 270, an employee may simply aim gadget 40 at a content thumbnail in the queue and perform some selection action via gadget 40. Once a thumbnail has been selected, gadget 40 can be aimed at some desired location for the content being retrieved and a de-select action may be performed via gadget 40 to dump or represent the data onto a display screen at the desired location.

In some embodiments, a separate instance of the session queue may be presented on each display screen in a space 28 where any of the queues may be used as a field for receiving content for storage during a session. Here, one queue would, in effect, have multiple input fields akin to field 270 (e.g., a separate field 270 per display) described above where each field could also be used to retrieve content as described above.

To help an employee target small thumbnail icons in queue field 270, an employee may aim gadget 40 generally at the field 270 and server 14 may provide an enlarged field 270 (not illustrated) and thumbnails so that gadget 40 can be used to better target individual thumbnail icons in the field 270 (e.g., larger versions of the icons 272 may be presented in the enlarged field so that the icons are more easily individually targeted).

Figure 14:
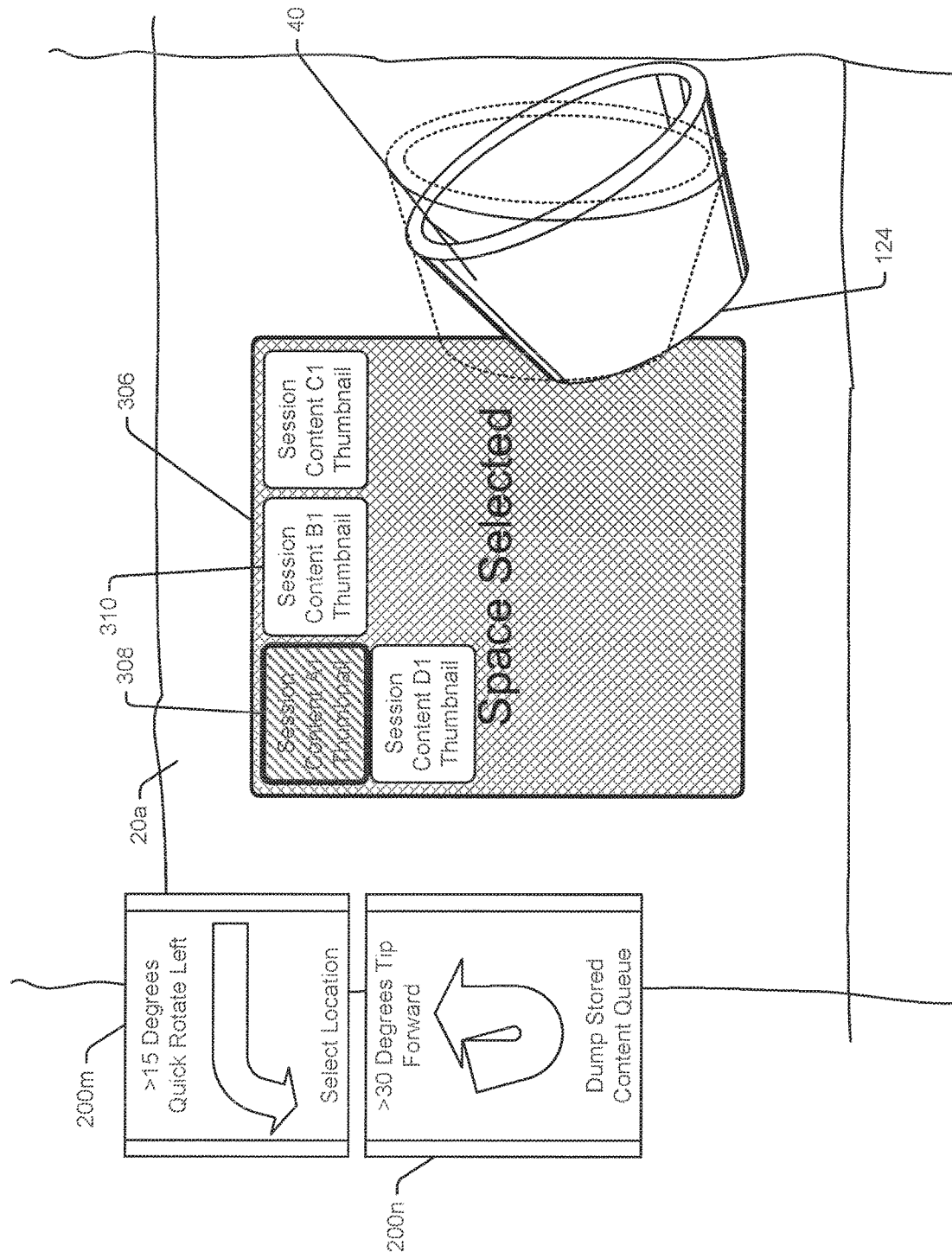
FIG. 14 is similar to FIG. 9, albeit illustrating other gadget actions and their effects.

In some cases, moving a target object off screen 20*a* to a specific side thereof may automatically move that object into a session content queue to be available subsequently when required. For instance, movement of the selected target object 260 off the lower edge of screen 20*a* in FIG. 10 may automatically place object 260 in the session queue. In this case, queue field 270 may or may not be persistently presented.

Where there is no persistent session queue, some specific gadget action or series of actions may be used to access the queue. For example, referring to FIG. 14, a series of actions to access a session queue may require that an employee aim the narrow end 124 of gadget 40 at a location on a display screen 20*a* at which the queue should be opened and then perform a quick left rotate as indicated by field 200*m* to select the location aimed at followed by a "pouring" or forward tipping action. The pouring action may generate a control command causing server 14 to present a temporary session queue field 306 including content thumbnails for each content instance in the queue, two of which are labeled 308 and 310. A first thumbnail 308 in the queue is highlighted to indicate an initially targeted thumbnail. Here, the highlighted thumbnail 308 may be selected via another gadget action or gadget 40 may be used to target a different one of the thumbnails. Once a thumbnail is selected, server 14 replaces queue field 306 with the associated content and the queue is removed from the screen.

Again, in some cases, when a gadget 40 is removed from an enterprise space, the gadget will be completely disassociated with the space and any content, including the session queue, associated with that space. If the gadget 40 is moved into a different enterprise space, server 14 may automatically associate the gadget with the new space so that affordances therein can be controlled via the gadget. In particular, a gadget moved into a new space may be automatically associated with any session queue associated with the new space so that an employee using the gadget has full access to the session content.

In at least some embodiments it is contemplated that, in addition to maintaining a session queue, server 14 may maintain a separate gadget queue for each gadget located in an enterprise space. Here, for instance, where four gadgets 40 are located in space 18 shown in FIG. 2 and each gadget 40 is used by a different employee during a session, an employee may have the option to store content in either a session queue or a gadget queue where the gadget queue operates as a sort of personal queue for content that the employee wants to capture in a personal database. In this case, server 14 would maintain a separate gadget queue for each of the gadgets 40 used in the space 28. In some cases, when content is moved to a gadget queue, the content may persist on a display screen in the space 28 and only a copy of the content may be moved to the gadget queue. Here, even if the content is subsequently moved to the session queue and therefore off the display screen, the employee can access the content via the gadget queue by some gadget action (e.g., another pouring or forward tilting action). In some cases when a target object is moved to a gadget queue, the target object may also be represented as a thumbnail in the session queue. Thus, while each gadget queue may include a unique set of content thumbnails stored using the gadget, the session queue would maintain a full set of all content thumbnails associated with any content stored via any of the gadgets 40 during a session in an associated space.

Referring to FIG. 10 again, an exemplary session queue bar 251 and an exemplary gadget queue bar 253 are shown along left and right edges of display 20*a*, respectively. In this embodiment, any target object on display 20a may be selected and dragged into either of the queue bars 251 or 253 to move the content into an associated queue. Which gadget queue content is added to when a target object is moved to bar 253 would depend on which gadget was used to move the content.

It is contemplated that during a session, different employees may use a single gadget 40 even when more than one gadget is located in a space 28. For instance, a first employee may use a first gadget to move a first target object into bar 253 in FIG. 10 and then a second employee may subsequently use the first gadget 40 to move a second target object into bar 253. Here, in at least some cases server 14 will use images from space cameras 32a-32n (see again FIG. 1) as well as perhaps sensed parameters from other system sensors (e.g., an accelerometer in a gadget may signal when tht gadget is picked up) to identify which employees are using which gadgets for control purposes and may maintain personal or employee queues as opposed to gadget specific queues, based on which employee moved which target objects into the queue bar 253. For example, where the first employee uses the first gadget to move first through fourth target objects into bar 253 and the second employee uses the first gadget to move fifth through tenth target objects into bar 253, first and second employee queues should be maintained. In this case, if the first employee uses the first gadget to access her employee queue, only the first through fourth target objects would be presented and if the second employee uses the first gadget to access his employee queue, only the fifth through tenth target objects would be presented.

In the case where separate personal employee queues are maintained, if the first employee were to use a second gadget and then a third gadget to move eleventh and then twelfth target objects into bar 253, respectively, despite using different gadgets to generate the control signals, the eleventh and twelfth target objects would be added to the first employee's personal queue. Thus, any time any employee picks up any interface gadget in a space 28, server 14 may use camera images to automatically associate the specific employee with the specific gadget and also with a specific employee content queue so that the specific gadget can be used to control the employee's personal content queue automatically.

Figure 15:
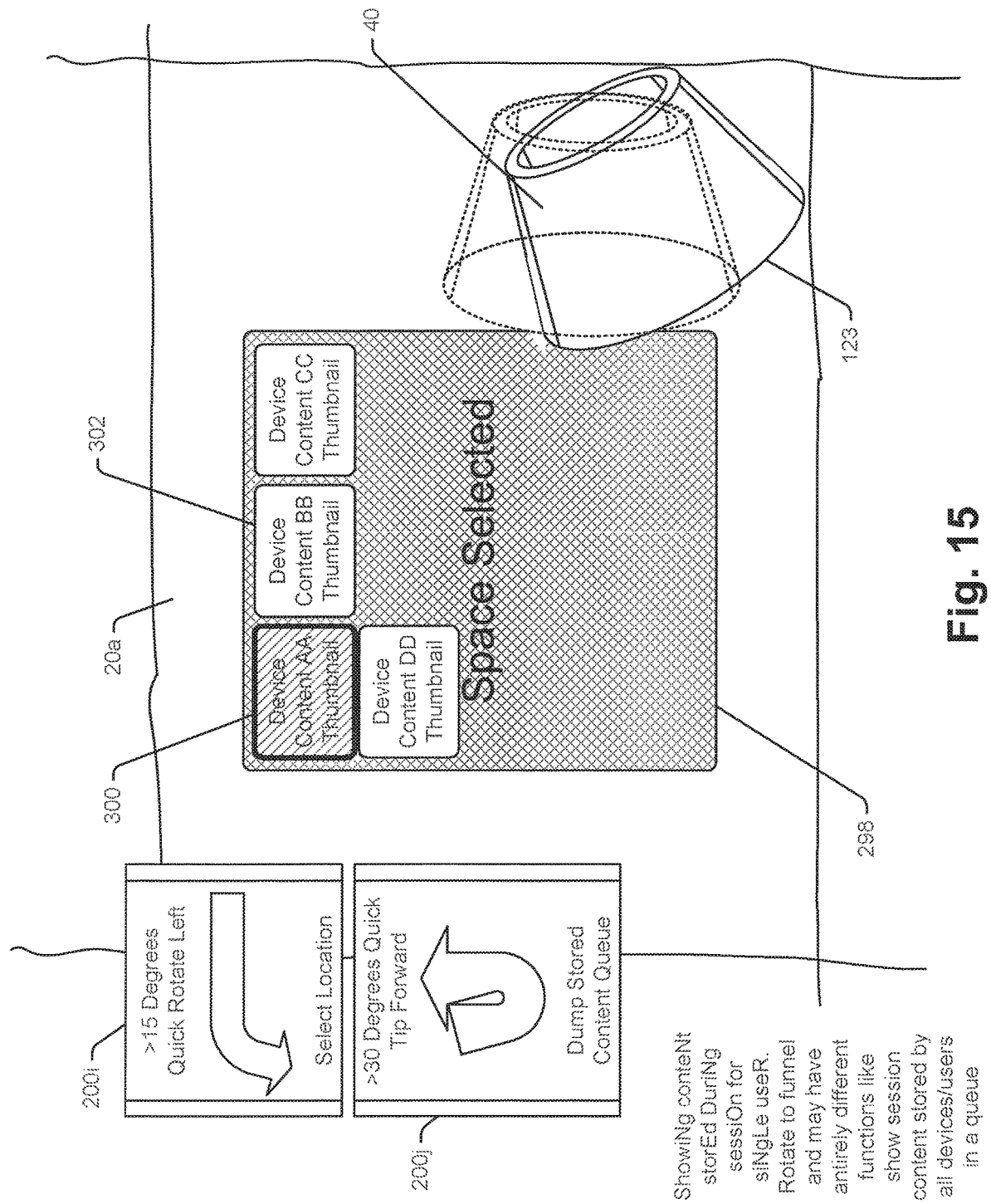
FIG. 15 is similar to FIG. 9, albeit illustrating other gadget actions and their effects.

In at least some embodiments, a gadget 40 may operate differently as a function of which end (e.g., narrow or wide) is aimed at a target object. For instance, referring again to FIG. 14, when narrow gadget end 124 faces and is aimed at a display screen 20a and a forward tipping action is performed, the session queue instantaneously associated with a space may be presented on the display 20a. In contrast, referring to FIG. 15, when wide gadget end 123 faces and is aimed at display screen 20a and a forward tipping action occurs after a select location action as indicated by fields 200j and 200i, respectively, a personal queue associated with a specific employee using gadget 40 may be presented on the display as shown at 298. Again, a first thumbnail icon 300 in the personal queue 298 may be highlighted to indicate an initial target icon that may be selected to access associated content. Other icons (e.g., 302) may be selected via targeting with gadget 40.

Figure 16:
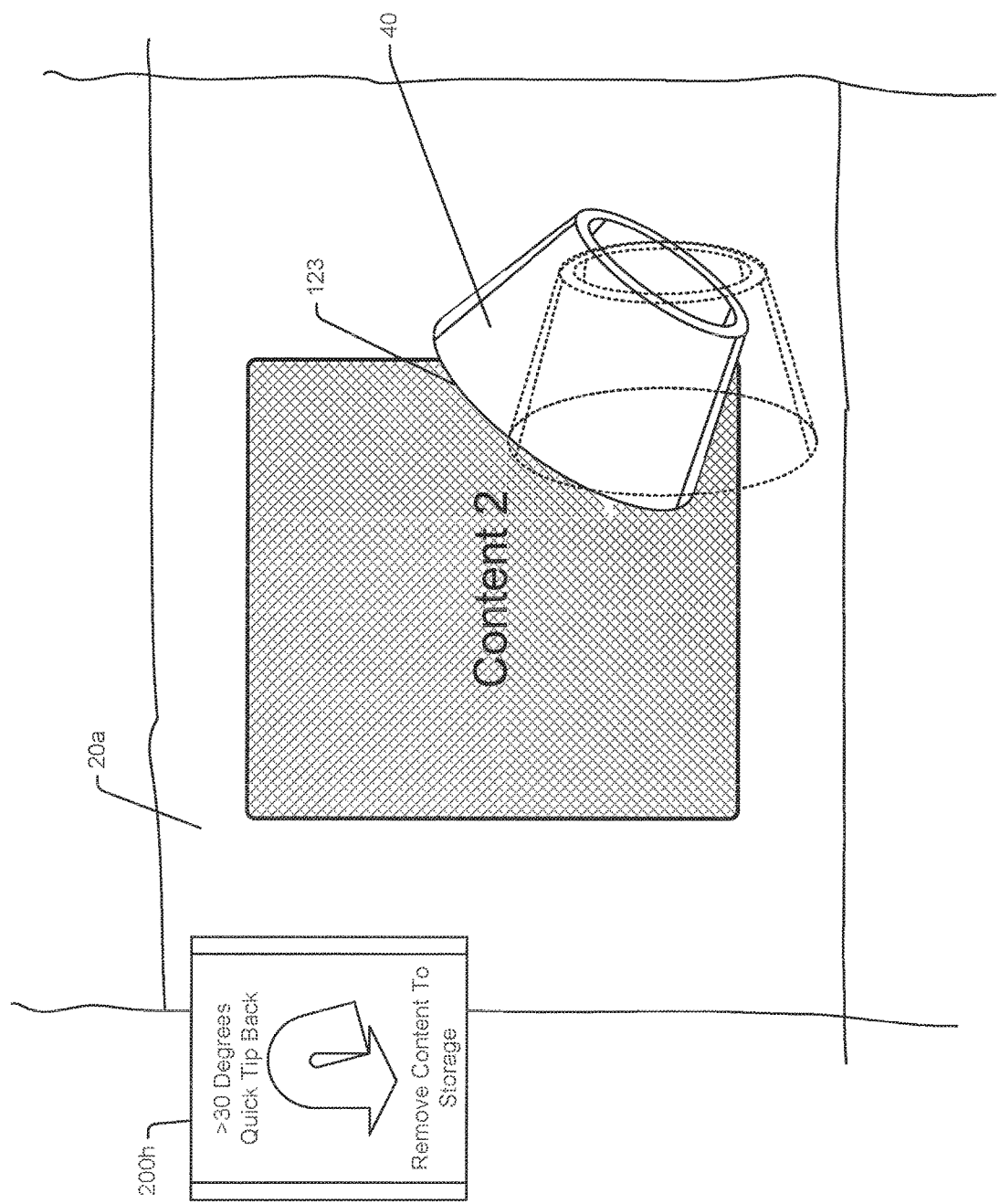
FIG. 16 is similar to FIG. 9, albeit illustrating other gadget actions and their effects.

Other gadget actions are contemplated for generating target object store commands. For instance, referring to FIG. 16, in at least some embodiments a rearward or back tipping action while the wide gadget end 123 faces a selected target object (e.g., Content 2 in FIG. 16) as indicated in field 200h may generate a command causing server 14 to store the selected object in the session queue. Although not illustrated, a similar back tipping action with the narrow end 124 of gadget 40 facing and aimed at a selected target object may generate a command causing server 14 to store the selected object in a personal queue.

Figure 17:
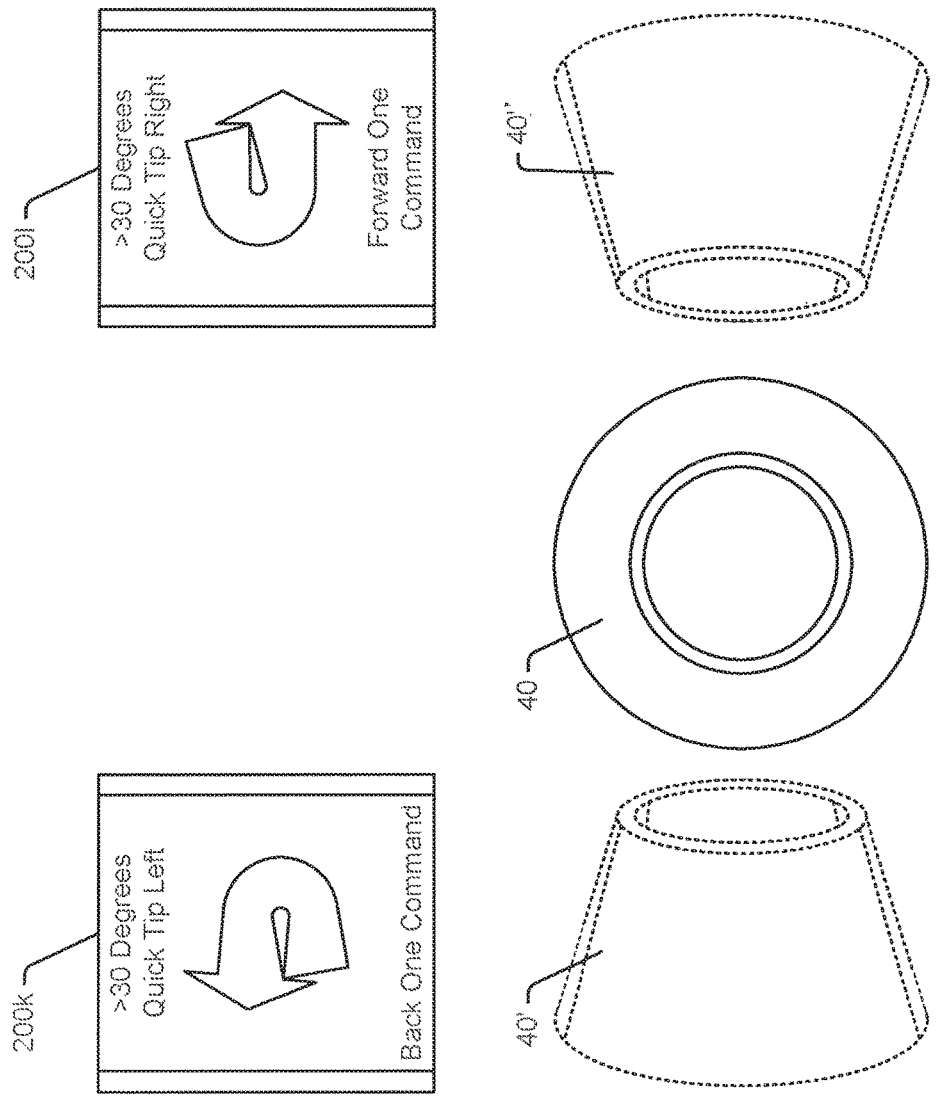
FIG. 17 shows undo and redo gadget actions.

While gadget actions performed to generate control commands for affordances are optimally programmed to be intuitive, it has been recognized that it may take some time for an employee using an interface gadget the first time to get used to the gadget actions and resulting affordance control and that inadvertent and unintended affordance control may occur. For this reason, in at least some embodiments it is contemplated that there will be some gadget action that can be performed to reverse the effects of a prior gadget action and control command. For example, referring to FIG. 17, a quick tip left by more than 30 degrees as indicated by field 200k and phantom gadget 40' may result in an undo most recent control command to cause server 14 to undo the most recently performed affordance control activity. For instance, if the most recent control activity was a change in light intensity, the action 200k may cause server 14 to revert back to the light intensity in a space prior to the change. As another instance, if the most recent control activity was movement of content from a displays screen to a session queue, action 200k may cause server 14 to move the content from the session queue back onto the display screen. Similarly, a quick tip right action by more than 30 degrees as indicated by field 200l and phantom gadget 40" may result in a redo of a most recent undo command so that an employee can toggle forward one system control command is desired.

Here, the undo and redo command may be space specific, gadget specific or even personal to specific employees. For instance, where first and second employees use first and second different gadgets in the same space, when the first employee uses the first gadget to effect an affordance control activity, the second employee may use the second gadget to undo (or redo) the activity caused by the first employee or the first employee may use the first gadget to undo (or redo) the activity caused by the first employee where the commands are space specific.

Where the undo and redo commands are gadget specific, only the gadget used to effect a most recent affordance activity may use the undo command to undo a most recent activity caused using the gadget. Thus, here, only the first gadget could be used to undo the most recent activity caused by a first gadget action and only the second gadget could be used to undo the most recent activity caused by the second gadget.

Where the undo and redo commands are employee specific, only an employee that caused a most recent affordance activity could use a gadget to undo the most recent activity. Thus, for instance, where the most recent affordance control by a first employee reduced light intensity and the most recent affordance control by a second employee moved a target object on a display screen to a session queue, an undo command generated by the first employee using any gadget in an associated space would undo the light intensity change while an undo command generated by the second employee using any gadget in the space would undo the movement of content to the session queue. Again, server 14 would track which employee is instantaneously using which gadget in a space so that employee specific undo and redo commands could be generated regardless of which gadget is used by which employee.

In at least some cases undo and redo commands may be generated regardless of whether or not specific affordances are targeted when those commands are issued. Thus, for instance, where a first employee uses a gadget 40 to reduce light intensity by aiming gadget 40 at a light and performing some intensity control action, thereafter, the employee may undo the intensity adjustment by simply performing the undo action (see again 200k in FIG. 17) regardless of whether or not the gadget 40 is aimed at the light device when the undo action is performed. In other cases, a gadget 40 may need to be aimed at a specific affordance or target object in order to undo a most recent control activity associated with the target object. For instance, where an employee uses a gadget 40 to first adjust light intensity, second, adjust a thermostat setting and third, move a target object to a session queue, if gadget 40 is not aimed at any of the light device, thermostat or displays screen associated with the session queue when an undo action is performed, the undo action may not result in any activity (e.g., the most recent command may not be undone). Here, despite the fact that the movement of the target object to the session queue was the most recent affordance activity, by aiming the gadget 40 at the light device and performing an undo action, the light device light intensity would be changed back to the initial intensity setting.

Figure 18:
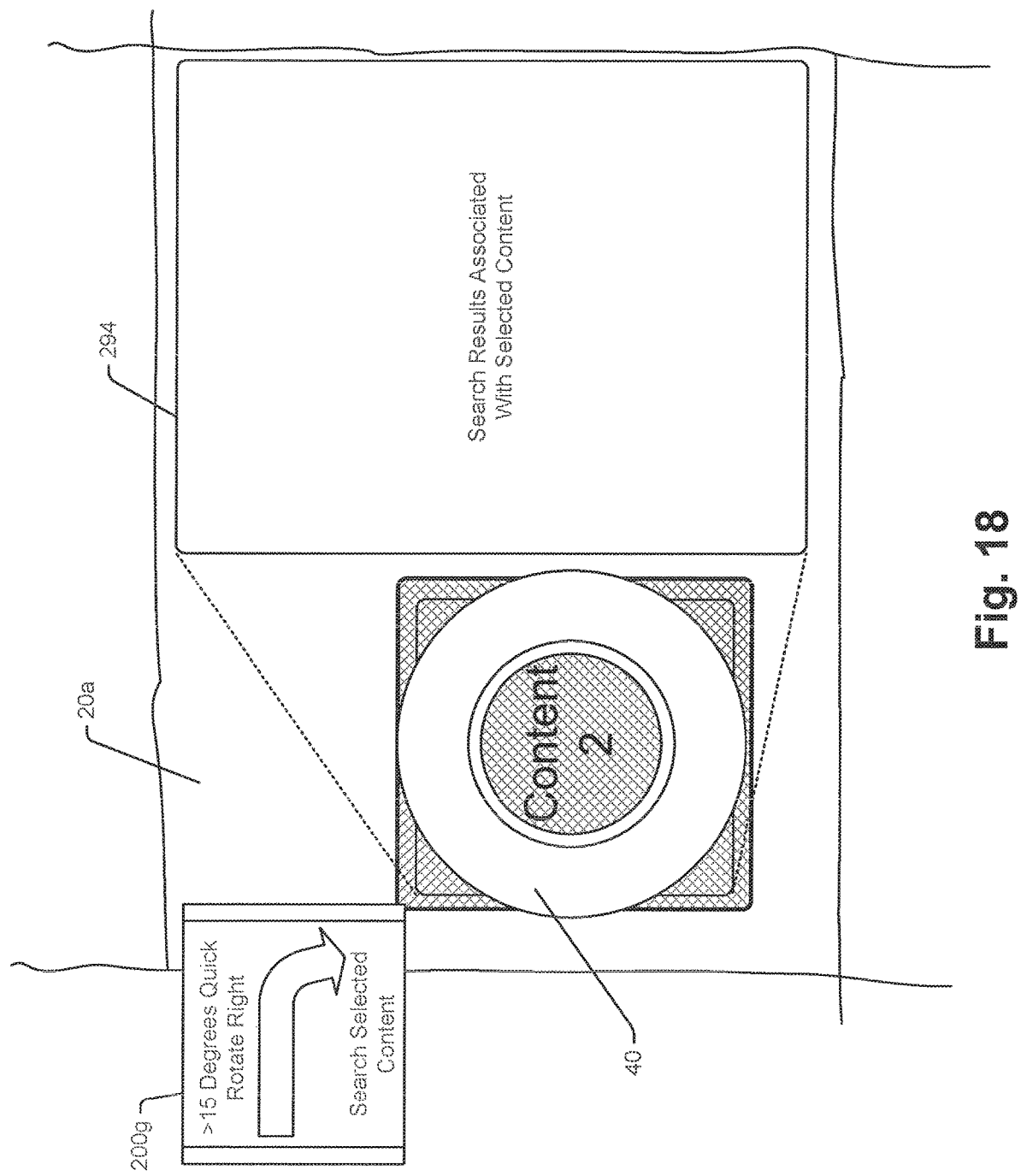
FIG. 18 is similar to FIG. 9, albeit illustrating other gadget actions and their effects.

Many other affordance activities may be controlled via gadget 40. For instance, referring to FIG. 18, a quick rotate right through at least 15 degrees action as indicated in field 200g while a target object is selected may generate a content search command causing server 14 to identify main topics or subjects associated with content in the target object. In some cases, the search command may also cause server 14 to open up a search results window 294 for presenting search results in list or other form (e.g., each result may be presented as a selectable thumbnail icon). Here, each search result in window 294 may be selected to access associated content either via window 294 or an additional window (not illustrated). Other search commands are contemplated such as a gadget shaking action.

In some cases it is contemplated that one or more of the displays in a space may be used to provide an ambient affordance tool to be used along with one or more interface gadgets to provide a particularly intuitive interface. For instance, see FIG. 19 where an ambient control field 322 is presented on display screen 20a that includes light, temperature, air flow and sound control icons 324, 326, 328 and 330, respectively. In this case, the control field may be persistently presented in the upper right hand corner of the display 20a as illustrated as a clear indicating of affordance control capabilities within a space. In the alternative, a simplified "Ambient" entry or access icon 187 (see again FIG. 6) may persistently be presented and the ambient control field 322 in FIG. 19 may only be presented once an employee aims gadget 40 at the access icon 187. In still other embodiments, whenever a user aims gadget 40 at any of a light (e.g., 22a in FIG. 6), a thermostat (e.g., 182 in FIG. 6) or some other controllable ambient affordance, system server 14 may present the ambient control field 322 on display 20a.

Figure 19:
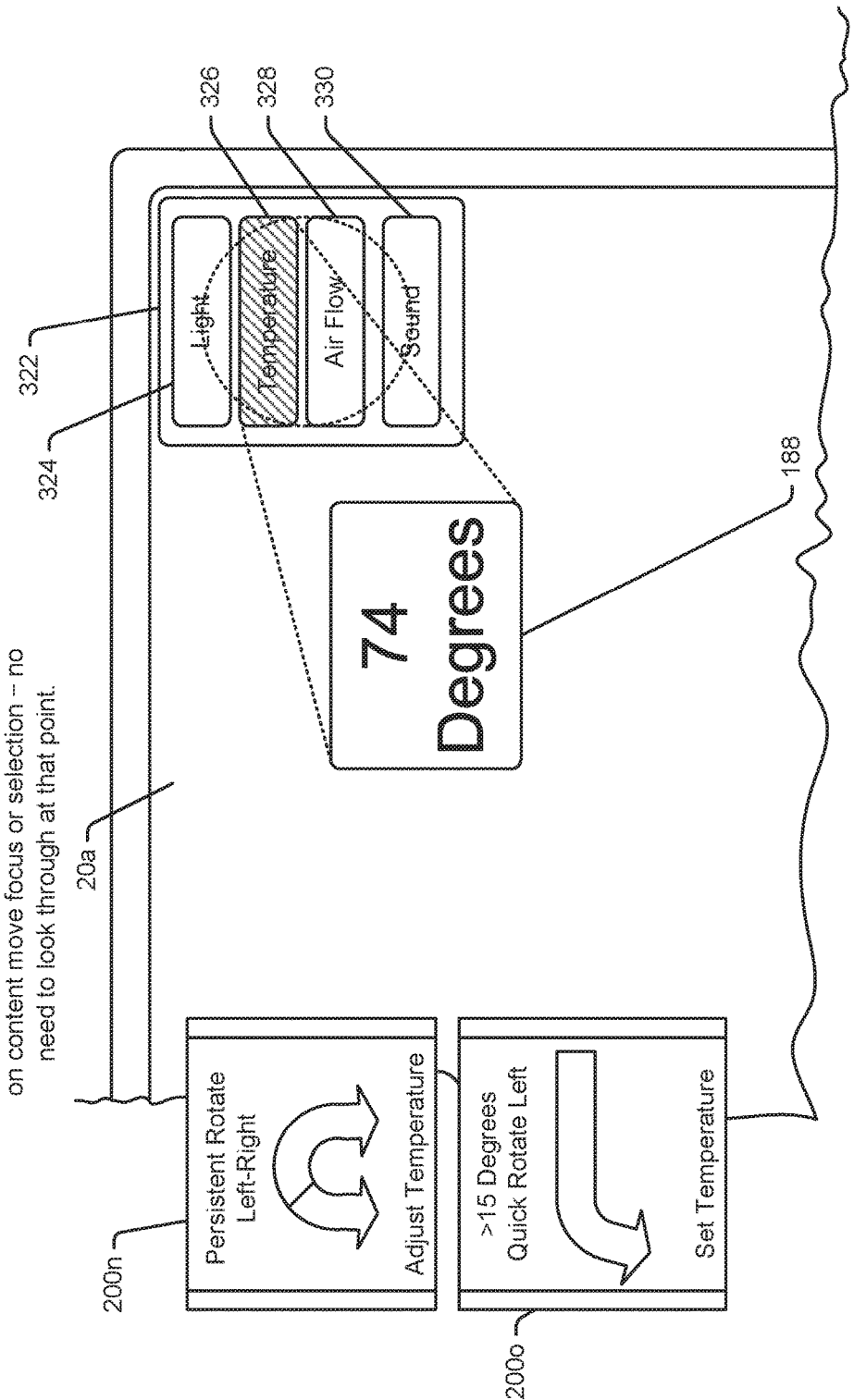
FIG. 19 is similar to FIG. 9, albeit illustrating other gadget actions and their effects.

Once field 322 is presented, an employee may aim a gadget 40 generally at control field 322 to select the field as a target object. Initially, the first control icon (e.g., light icon 324) in field 322 may be highlighted and a current setting sub-window (not illustrated) may be opened to indicate a current light setting. An employee may use the gadget to pan down to change the highlighted ambient control icon so that a different ambient condition can be controlled. In FIG. 19, the temperature control icon 326 is shown highlighted and a current temperature setting sub-window 188 is presented. As shown at filed 200n, a persistent and relatively slow rotation right or left of a gadget 40 can be used to adjust temperature setting where an updated target setting would be shown in window 188 as that setting is adjusted. Once a desired target temperature appears in window 188, a quick rotate left action as in field 200o generates a command to set the temperature.

In at least some embodiments it is contemplated that any gadget in a space may be used at any time to control any target object in that space in an egalitarian fashion. Thus, for instance, first second and third employees using first, second and third interface gadgets at the same time may be controlling different target objects at the same time in a single space and control by one of the employees may be unaffected by control commands issued by the others. For example, referring again to FIG. 2, the first employee may be moving a target object to a session queue on a first display screen 20a while a second employee is moving a different target object to the same session queue via a second display screen 20b. Here, if two employees attempt to control the same target object at the same time, a first employee to start a control sequence would be granted control and the second employee to start a control sequence would not have control.

In other cases, server 14 may enforce any of several different types of control rules. For instance, in some systems it is contemplated that only a single gadget may be active and used to control affordances in a single space at a time. Here, for example, where there are two gadgets 40 in a single space 28, if the first gadget is active and being used by a first employee, the second gadget may remain deactivated even if moved by a second employee as long as the first gadget remains persistently active. Once the first gadget is set down and deactivated (e.g., the server recognizes that the first gadget is stationary on a table top or the like for at least some threshold period of time), the second or some other gadget in the space may be rendered active if moved or if not in a stowed position (e.g., not stationary on one of its wide or narrow circular end surface).

As another instance, server 14 may enforce rules such that only one gadget can be used to control any affordance at one time but multiple gadgets can be used to control multiple different affordances at the same time. For instance, where two displays 20a and 20b (see again FIG. 2) and first and second gadgets 40 are located in a space 28 at the same time, server 14 may only allow one of the first or second gadgets to control one of the displays 20a or 20b and the other gadget to control the other of the displays at one time. Many other control schemes are contemplated.

Figure 20:
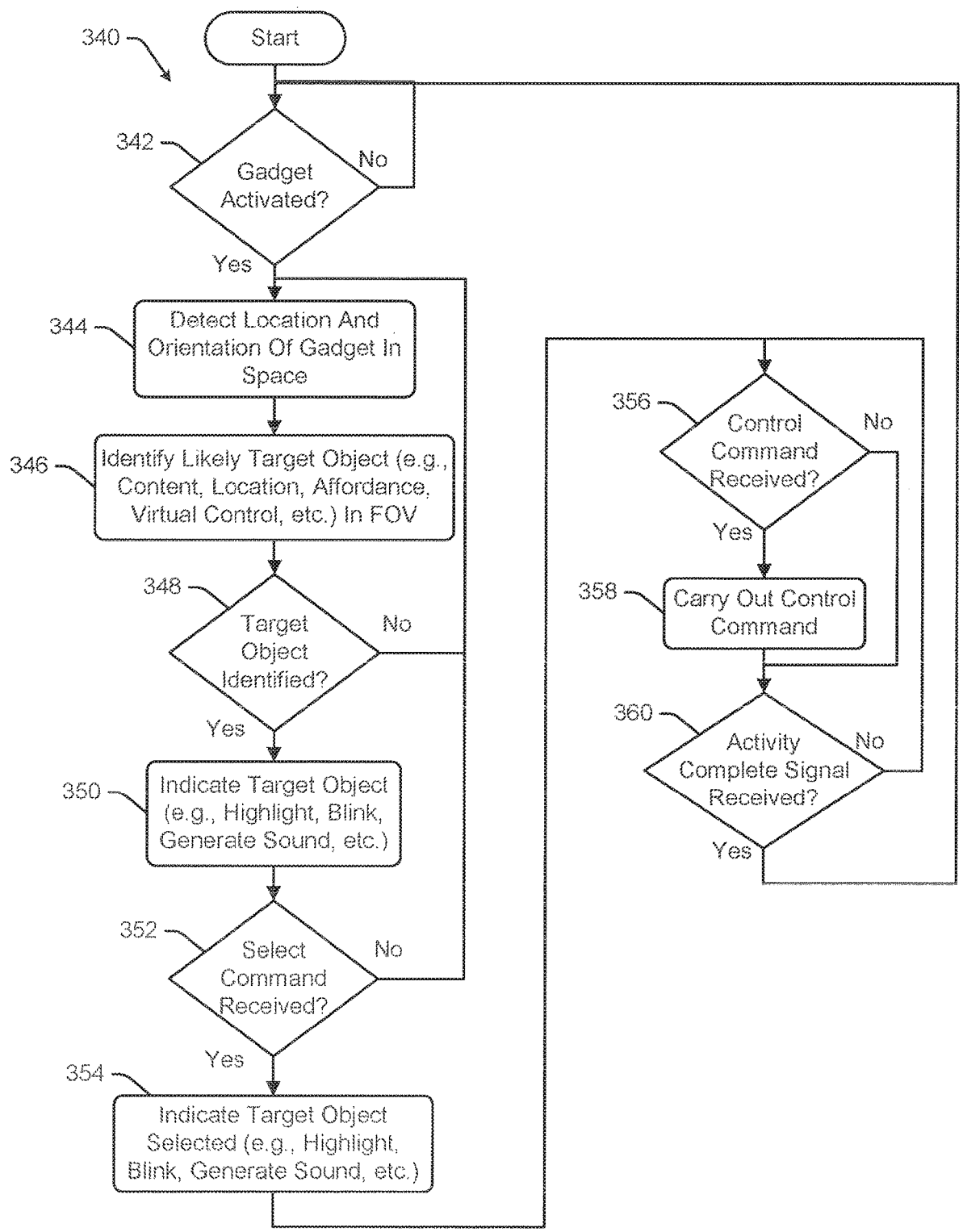
FIG. 20 is a flow chart showing a method whereby a gadget is used to target an object in a space to take command of at least certain aspects of the target affordance.

FIG. 20 illustrates a general process 340 for using a gadget to interface with target objects (e.g., affordances or content on display screens) that is consistent with the general description above. At block 342, server 14 monitors gadgets in a space 28 (see again FIG. 2) to determine when one or more of the gadgets is activated by an employee grasping and moving or changing the orientation of the gadget which is sensed by the sensors in the gadget 40 (see again FIG. 5) or by cameras 32a-32n in the space. Once a gadget is activated, at block 344, server 14 determines the location and orientation of the gadget in space 28. At block 346, based on the location and orientation of the active gadget in space, server 14 identifies a likely target object in the space 28 that is aligned with the gadget 40. Once a likely target object is identified at block 348, control passes to block 350 where the target object is indicated (e.g., via light blinking, placement of a highlighted aiming field about a content set, etc.). At block 352, server 14 monitors for a select command from the targeting gadget 40. If no select command is received, control passes back up to block 344 where gadget location and orientation re continually tracked and the sub process associated with blocks 344 through 352 continues to cycle. In this way, the employee can move the gadget around in space to target different objects without issuing any control commands which each targeted object or some other indicator providing an intuitive indication of which object is currently targeted.

At block 352, once a target object select command is received, control passes to block 354 where the selected object is indicated (e.g., light may be blinked again, a content subset may be highlighted differently, etc.). At block 356 server 14 monitors for a control command for the selected target object. Once a control command is received, at block 358 the control command is carried out to control an associated affordance. At block 360, once the control activity is complete, control passes back up to block 342 where the process described above continues to cycle.

Referring again to FIG. 5, exemplary gadget 40 may include other components that enable other types of gadget input activity as well as at least some feedback or output to an employee using the gadget. To this end, in at least some embodiments a gadget 40 may include one or more LED or other light generating signaling devices 170 to generate gadget status signals. For instance, see exemplary LED light devices 170*a* and 170*b* in the narrow end surface 130 and the external side surface 128 of device 40 in FIG. 7. In at least some cases light device 170*a* may be illuminated whenever gadget 40 is picked up and therefore activated to be used to perform ay of the functions described above. Exemplary light device 170*b* may be illuminated to indicate that an affordance has been targeted or selected as a target object or any of several other states. While two light devices 170*a* and 170*b* are shown, many others are contemplated for signaling different gadget states.

Referring still to FIG. 5, a gadget 40 may also include some type of haptic feedback or output device 168 controllable to provide one or more different types of tactile sensations to an employee. For instance, when gadget 40 is initially aimed at a light 22*a* in FIG. 6, upon recognizing that gadget 40 is aimed at a controllable light device, sever 14 may cause gadget 40 to vibrate for a short period to signal that the gadget is associated with the light for control purposes. Similarly, when gadget 40 is aimed at specific content on display 20*a*, in addition to highlighting the content on the display 20*a*, gadget 40 may vibrate to indicate an instantaneous targeting. If gadget 40 is used to select the targeted content, a second haptic signal that is clearly distinguishable from the first haptic signal may be generated to signal selection. Other haptic signals are contemplated to indicate other gadget states or control conditions.

Referring again to FIG. 5, some gadgets 40 will include one or more speakers 172 controllable to generate sounds to indicate different gadget states or control conditions. For instance, in some cases the sounds may be verbal such as "light" or "content" or "temperature" to indicate that a light device, a content set on a display and a thermostat are currently targeted, respectively. In other cases sounds may include beeps, hissing, honks or other audibly distinguishable sounds that correspond to different states or actions. For example, a first beep having a first pitch and tone may be generated each time gadget 40 is aimed at a different target object (e.g., moving gadget 40 about to target three different target objects in succession would cause the first beep to be generated three times. When the gadget 40 is used to select one the third target object, selection and gadget to object association may be indicated via a second beep having a second pitch and tone combination.

Figure 21:
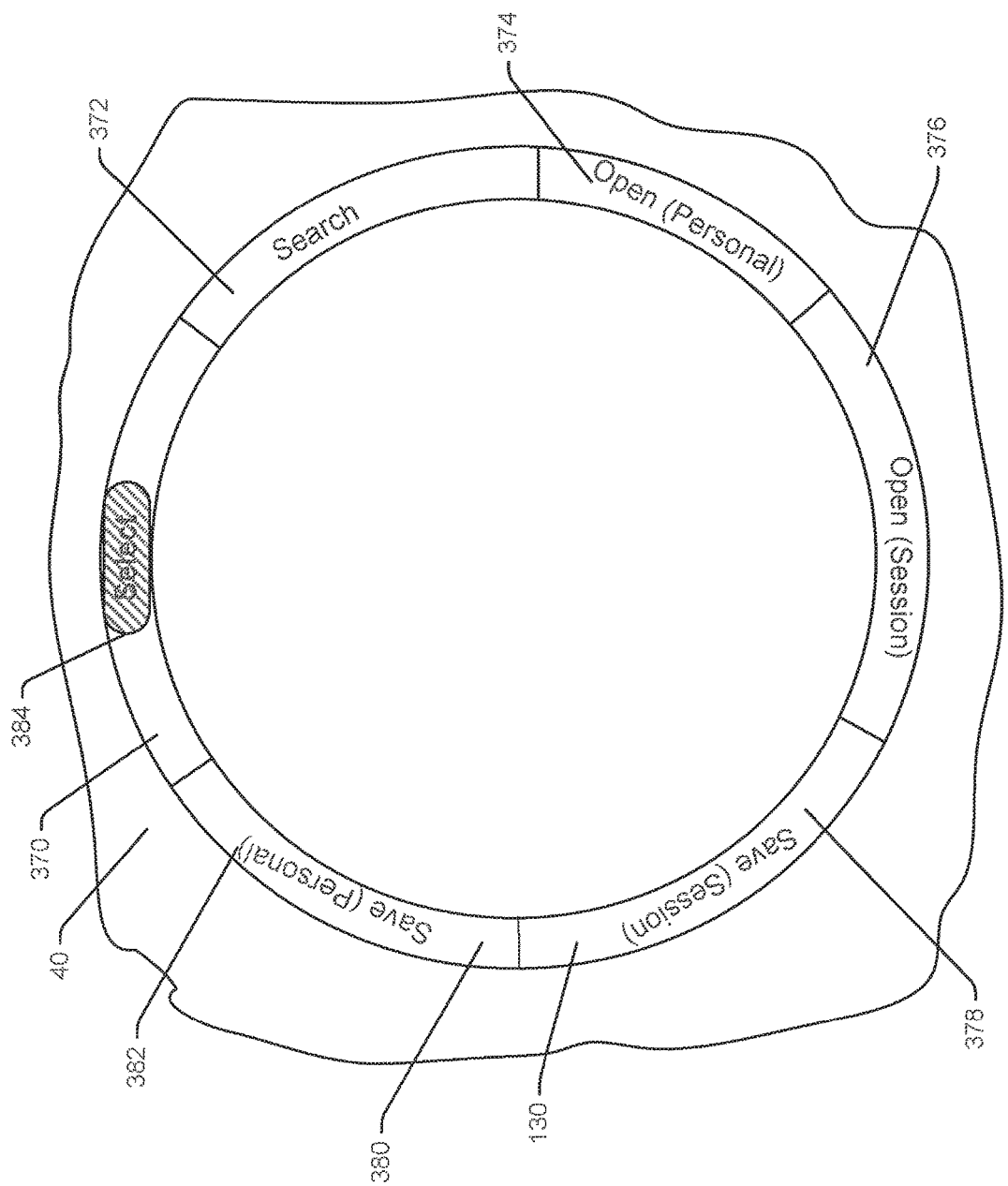
FIG. 21 is an end view of an exemplary gadget like the one shown in FIG. 3 where an annular screen is presented on the edge of the gadget for input and feedback to an employee using the gadget.

Referring again to FIG. 5, at least some gadgets may also include one or more buttons 144 for receiving various selection and control signals from an employee. The buttons may be built into any surface on a gadget including the narrow or wide end surfaces 130 or 132, respectively. To this end, see exemplary buttons 370, 372, 374, 376, 378, 380 and 382 provided at the narrow end surface 130 of gadget 40 in FIG. 21 that include a select button, a search button, an "Open (Personal)" button, an "Open (Session)" button, a "Save (Session)" button and a "Save (Personal)" button, respectively. Here, it is contemplated that an employee may aim gadget 40 at a target object and use the buttons to generate at least some affordance control commands. For instance, to select a target object for control. Button 384 may be selected. While the exemplary buttons are shown in end surface 130, the buttons may be provided in a side surface of gadget 40 or the other end surface 132.

Instead of or in addition to including mechanical buttons, a touch sensor 146 (see again FIG. 5) may be provided in conjunction with a gadget display screen 158 so that virtual control icons may be presented for issuing control commands. For instance, referring again to FIG. 21, the illustrated buttons 370 through 382 may be provided as touch selectable virtual icons when gadget 40 is aimed at a display screen 20*a* within a space.

Figure 22:
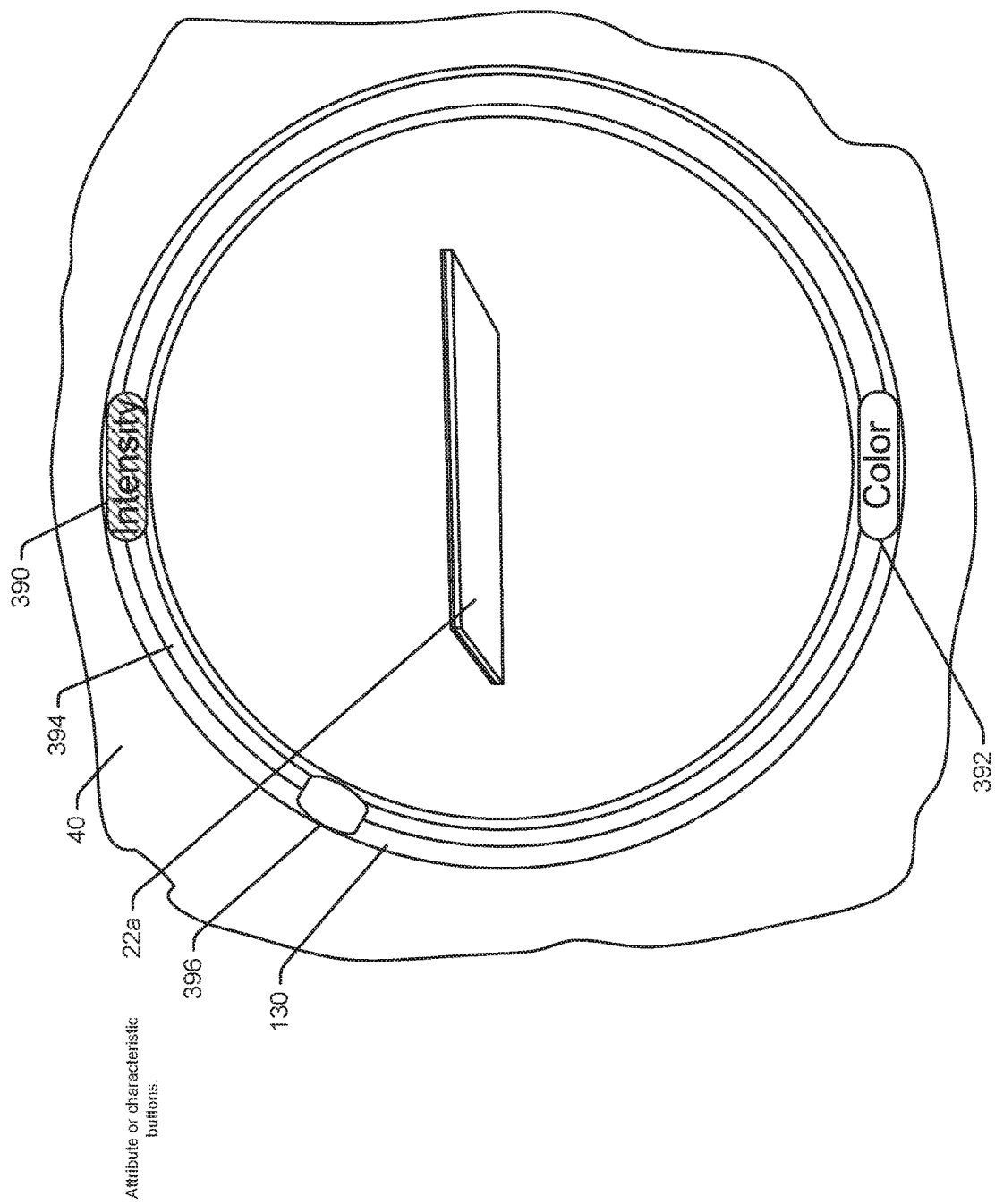
FIG. 22 shows an end view of a FIG. 3 ggadget being used to target a ceiling light for control.

One advantage of providing virtual control icons is that the icons and their associated functions can be changed automatically as a function of which affordance is targeted with the gadget. Thus, for instance, when the gadget 40 is aimed at a display, the icons in FIG. 21 may be provided and when the gadget is, instead, aimed at a light device 22*a* as in FIG. 22, a completely different set of virtual control icons for controlling light related operating characteristics may be presented. The exemplary light control icons include an intensity icon 390 and a color icon 392 where the intensity icon is shown highlighted to indicate a current selected state for control. A circular intensity scale 394 is provided on end surface 130 along with a slider button 396 that indicates a current intensity setting. To control color instead of intensity, an employee may simply select icon 392 causing a color scale and associated slider icon to be presented to indicate a current color status. In some cases a user may simply touch and slide the slider icon along the scale to change the selected operating characteristic. In other embodiments, the slider icon may be rotatable about the scale by simply rotating the gadget 40 about a central axis. Here, for instance, as the gadget is rotated, the intensity and color icons may remain at the 12 o'clock and 6 o'clock positions with only the slider icon moving to indicate a currently selected state. In other cases no scale may be provided and instead the employee would simply use instantaneous light settings in a space as feedback indicating intensity and color changes.

Referring again to FIG. 21, where icons 370 through 382 are virtual, each may be selected via touch or, in the alternative, the gadget 40 may be rotatable with only the button in the 12 o'clock position being highlighted as selected (e.g., see highlight 384 of the select icon 370). For instance, in this case, to select the search icon 372, gadget 40 would be rotated through 60 degrees counterclockwise, resulting in the search icon being highlighted as it moved to the 12 o'clock location. In still other cases, as gadget 40 is rotated in FIG. 21, the icons 370 through 382 may remain at their locations (e.g, icon 370 at the 12 o'clock location, icon 376 at the 6 o'clock location, etc.) and only the highlight 384 may rotate along with the gadget to highlight different virtual icons.

Figure 23:
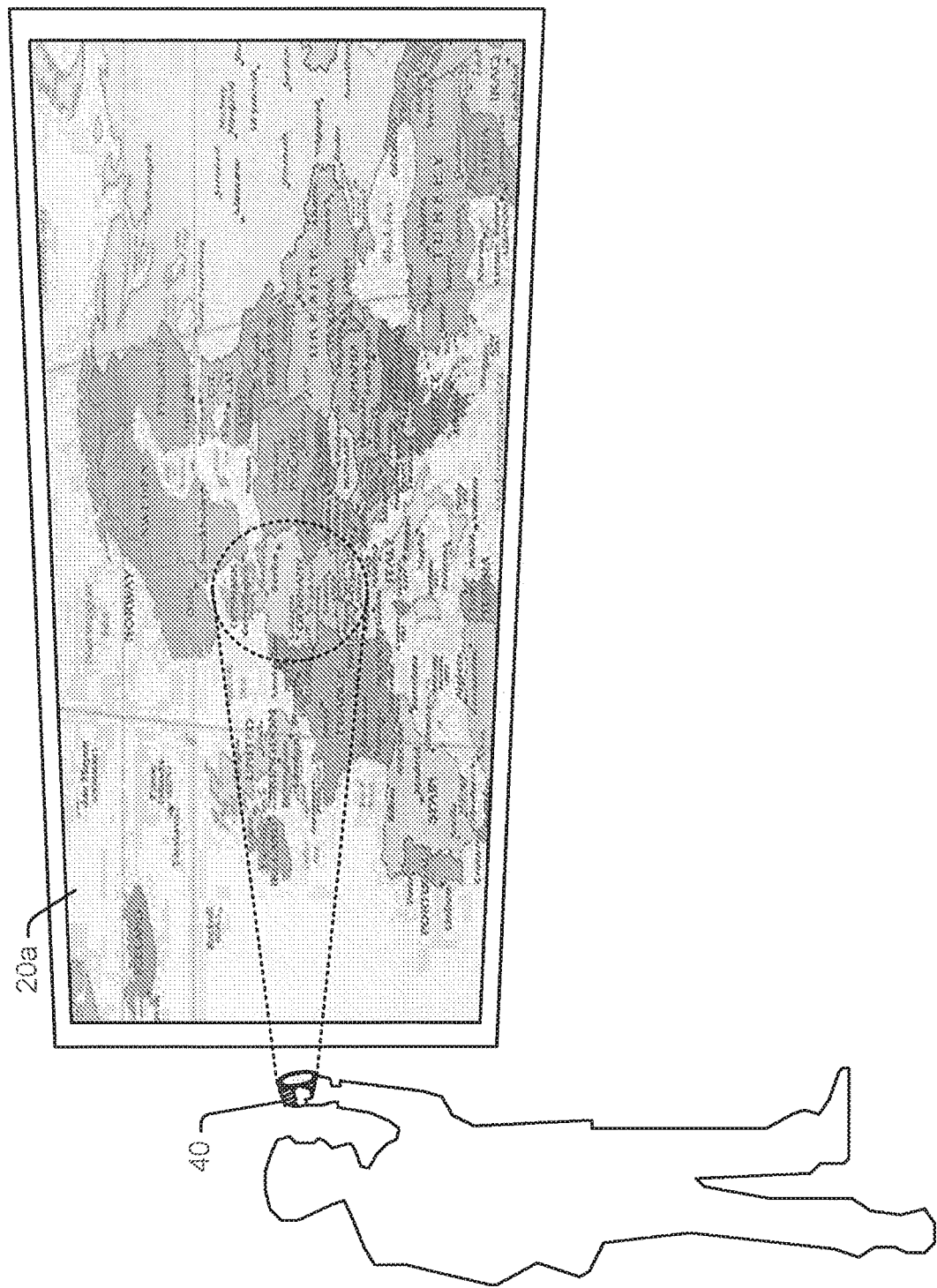
FIG. 23 is a view of an employee using a gadget to target a section of a map presented on a large common emissive surface.
Figure 24:
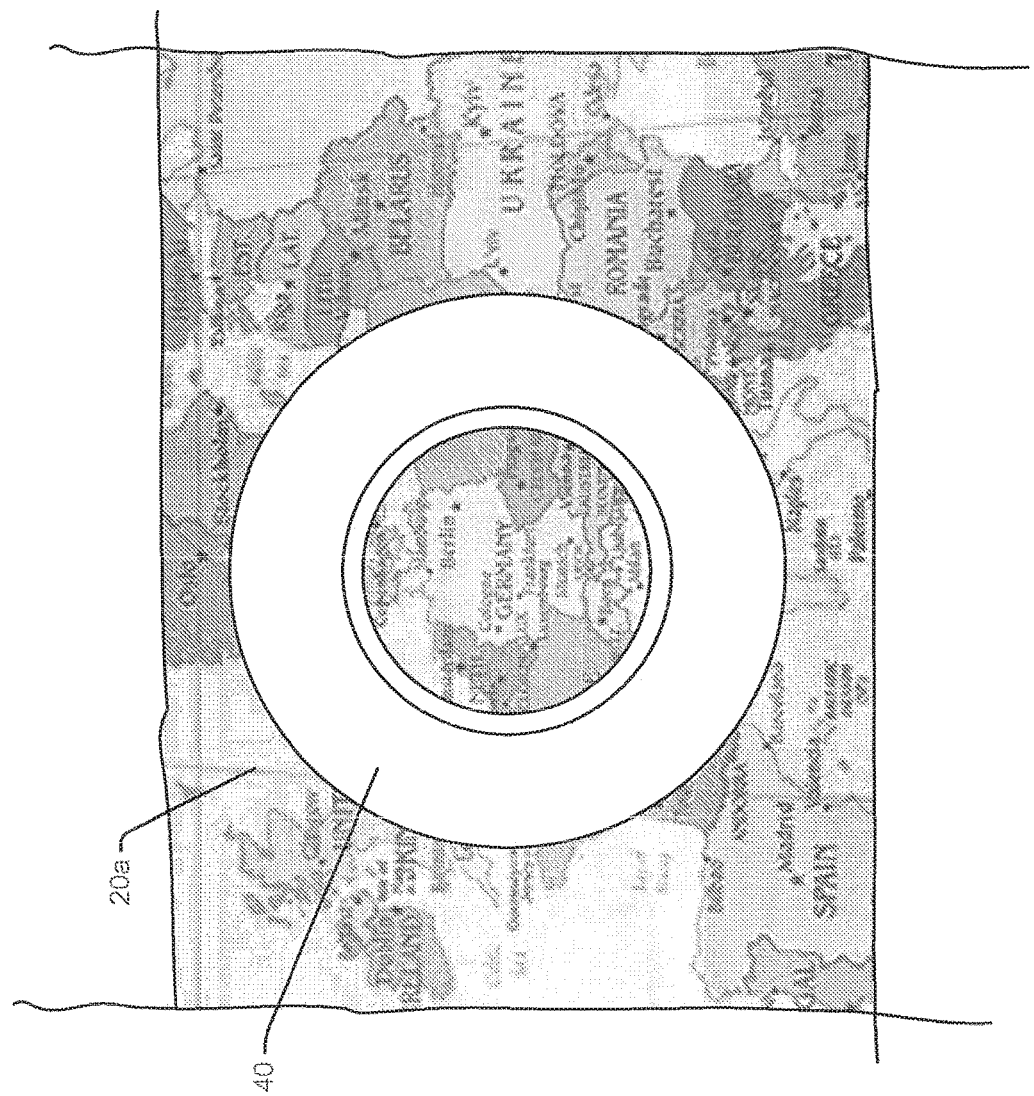
FIG. 24 is an end view through the adget in FIG. 23 showing a section fo the map targeted.
Figure 25:
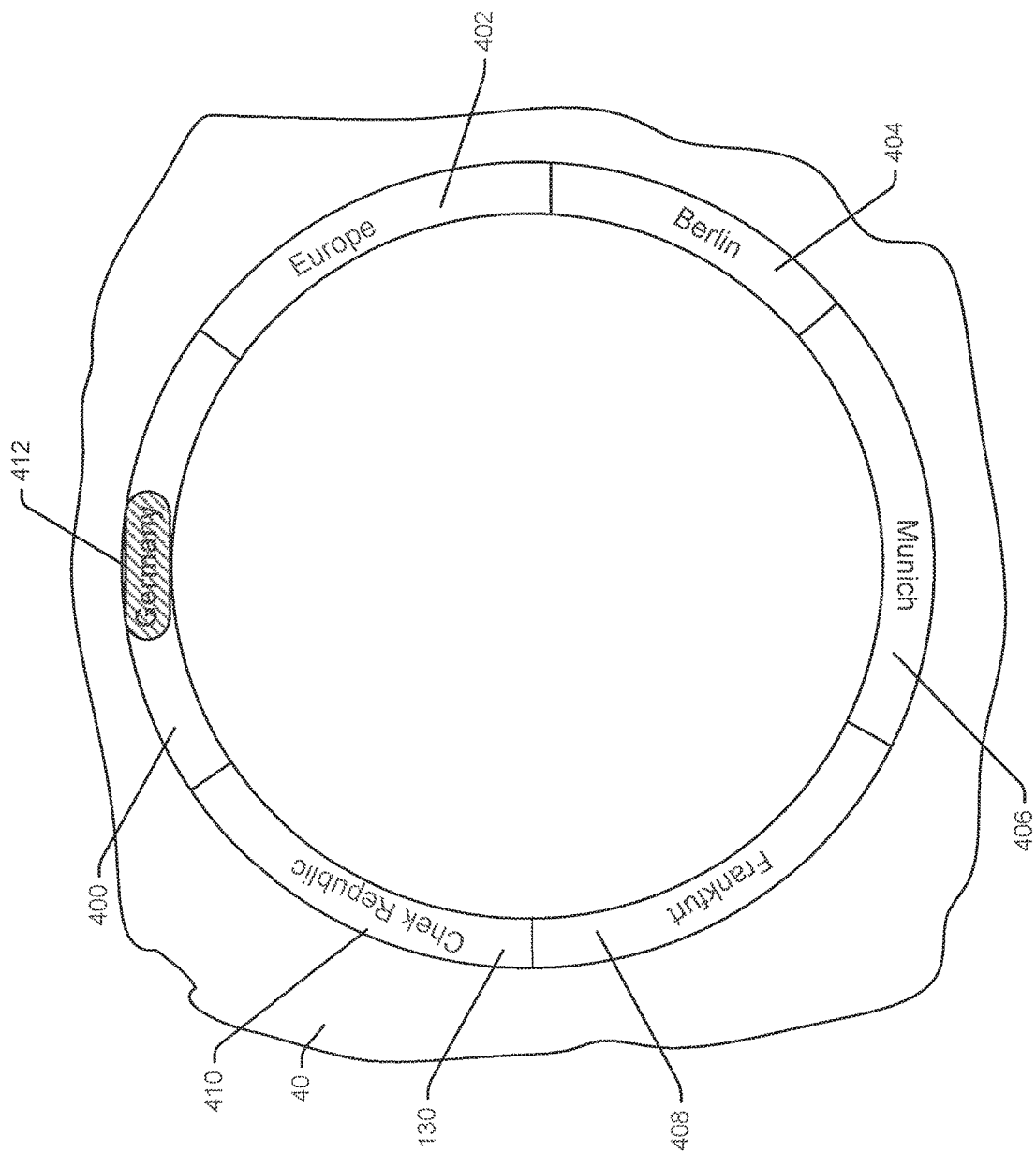
FIG. 25 is an end view of the gadget in FIG. 23 showing different options associated with the content targeted in FIG. 23.

In at least some embodiments it is contemplated that a gadget that can present virtual icons may present different content options based on instantaneous content presented on a target object aimed at using the gadget. For instance, FIGS. 23 and 24 show an employee aiming a gadget at a map presented on a display 20a and specifically aimed at a section of Europe including Germany and surrounding nations. In this case, server 14 may automatically identify the section of the map aimed at and topics associated with the map section and may present a set of most likely topics of interest on virtual control icons. For instance, see FIG. 25 that shows virtual topic icons 400, 402, 404, 406, 408 and 410 corresponding to Germany, Europe, Berlin, Munich, Frankfurt and Chek Republic, respectively, that server 14 gleaned from the content aimed at via gadget 40. Here, icon 400 is highlighted as indicated at 412 to indicate that Germany is the most likely target topic. Here, a selection action (e.g., quick rotate left) may cause selection of the highlighted topic and commencement of some other activity (e.g., opening a window with more information related to Germany). In the alternative, the employee could select one of the other topics presented on end surface 130 to access more information associated with any of the other presented topics. In some cases some other gadget action may cause a different set of topics to be presented on surface 130 (e.g., a different set of city names) for consideration or selection by the employee. Thus, in addition to presenting different control icons via surface 130 based on which target object in a space is aimed at, the server may present different control icons via gadget 40 depending on the content aimed at on a display screen or even based on an application associated with content aimed at on a display screen.

In addition to or instead of buttons and/or touch sensitive surfaces, gadget 40 may also include a microphone 148 (see again FIG. 5) for receiving voice commands or other information from an employee using the gadget 40. For instance, referring to FIG. 8, after using gadget 40 to shrink aiming field 230 to a specific target object, an employee may speak the command "Select" into the microphone causing gadget 40 to transmit a capture signal to server 14 causing the target object to become associated with gadget 40. Thereafter other voice, action or button selection commands may be initiated by the employee to perform other functions.

Gadget 40 may also include other sensing components for sensing location and orientation of gadget 40 in space in addition to the gyroscope and accelerometer 150 and 152. For instance, gadget 40 may include one or more cameras 156 for collecting images of affordances and ambient surroundings in a space 28. Here, the images may be compared to known affordances and other ambient surroundings in space and useable to discern gadget location and orientation. In some cases, images from gadget 40 may be used along with images from ambient cameras 32a through 32n to discern gadget location and orientation.

Figure 26:
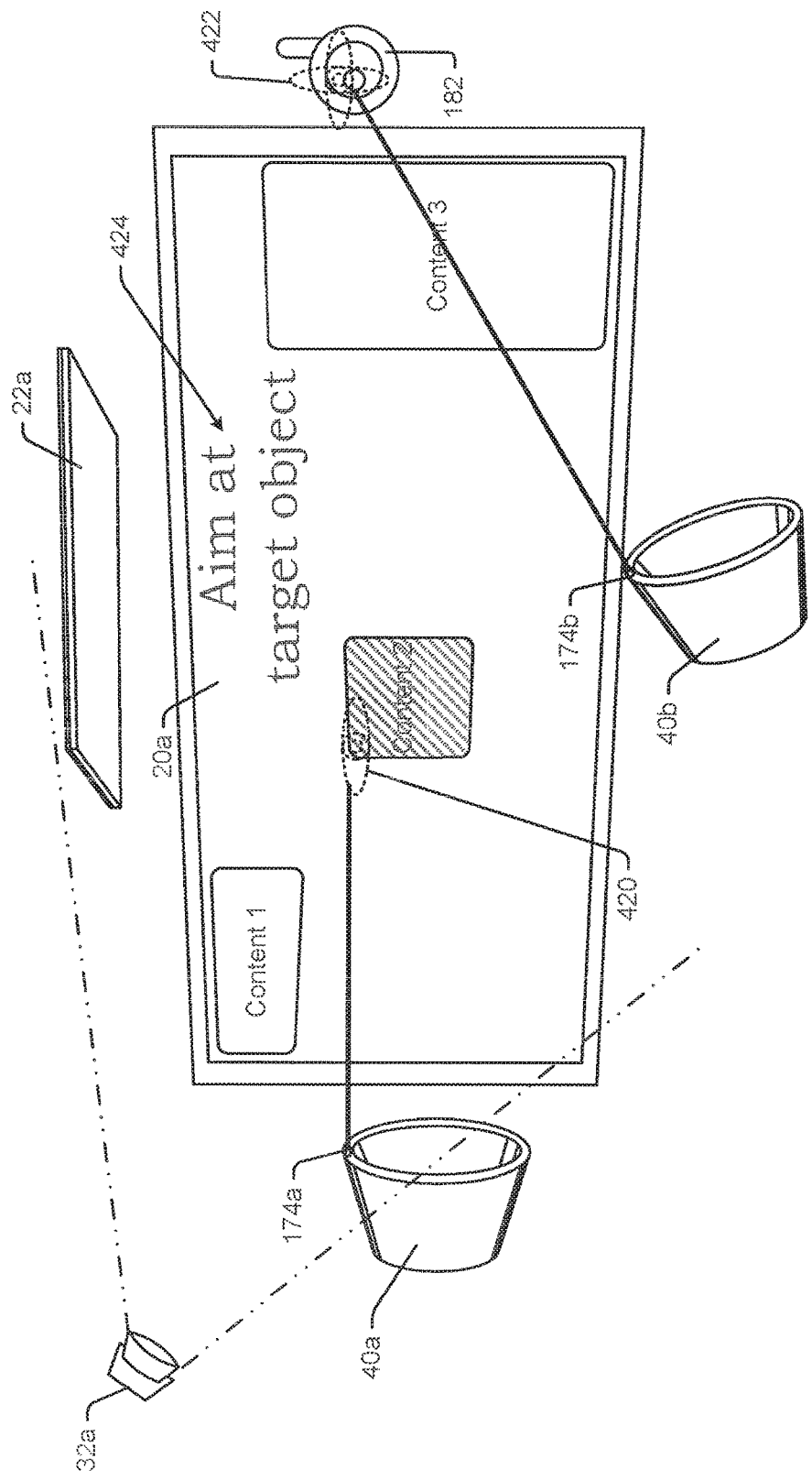
FIG. 26 shows another gadget embodiment where the gadget includes a laser device for generating an aiming and targeting pattern on targeted affordances.

Referring again to FIG. 5, in at least some embodiments it is contemplated that a gadget 40 may include a laser projector device 174 controllable to generate a laser light pattern within enterprise space. To this end, see exemplary gadgets 40a and 40b in FIG. 26 that include laser devices 174a and 174b that generate laser light patterns 420 and 422, respectively. Here, the light patterns may serve different functions or subsets of functions in different embodiments. For example, in a simple embodiment, the light pattern may simply operate as a gadget aiming aid. In this case, an employ may generally aim gadget 40a at an affordance and a persistent (e.g., non-changing) light pattern may be moved about until it subtends the affordance. The employee can observe the aiming pattern and determine when it subtends an affordance to control and the server 14 may then control the affordance or some other signaling feature to indicate that the affordance has been targeted (e.g., blink light intensity when a light device is targeted).

In other cases, the laser light pattern may be used by the overall system to ascertain which affordance is targeted via the gadget 40a. For instance, in FIG. 26, enterprise space cameras like 32a may be arranged to obtain images of all affordances in a space including any laser light patterns generated via gadgets 40a, 40b, etc. Server 14 can examine the images essentially in real time and identify gadget laser light patterns therein as well as which affordances have been targeted. Here, when a gadget action like a selection action (e.g., quick rotate left) is sensed, the server 14 can associate the action with an instantaneously targeted affordance (e.g., a target object) and can then perform control functions accordingly.

In at least some embodiments it is contemplated that different gadgets 40a, 40b, etc., may generate different laser light patterns 420 and 422 that can be used by server 14 to determine which gadget is used to target different affordances. Here, for instance, when camera images include two different and simultaneous laser light patterns, the server can distinguish source gadgets from each other so that sequences of commands generated by the first gadget and the second gadget are not confused. For instance, where gadget 40a is used to remove and store specific content from display 20a and to then dump that content onto a different display (e.g., 20b in FIG. 2), pattern 420 would operate as a signal to the server 14 that the dumping action is performed via gadget 40a as opposed to gadget 40b.

In still other cases, a laser light device 174a or 174b may operate as an instructional aid to guide employee use of an associated gadget. For instance, see message 424 that indicates "Aim at target object". Here, it is contemplated that laser device 174a may write out message 424 whenever gadget 40a is active (e.g., has been picked up) and is not currently aimed at a controllable affordance. Once gadget 40a is aimed at a target object, message 424 may be replaced by a target pattern 420 to indicate an aiming status change.

Figure 27:
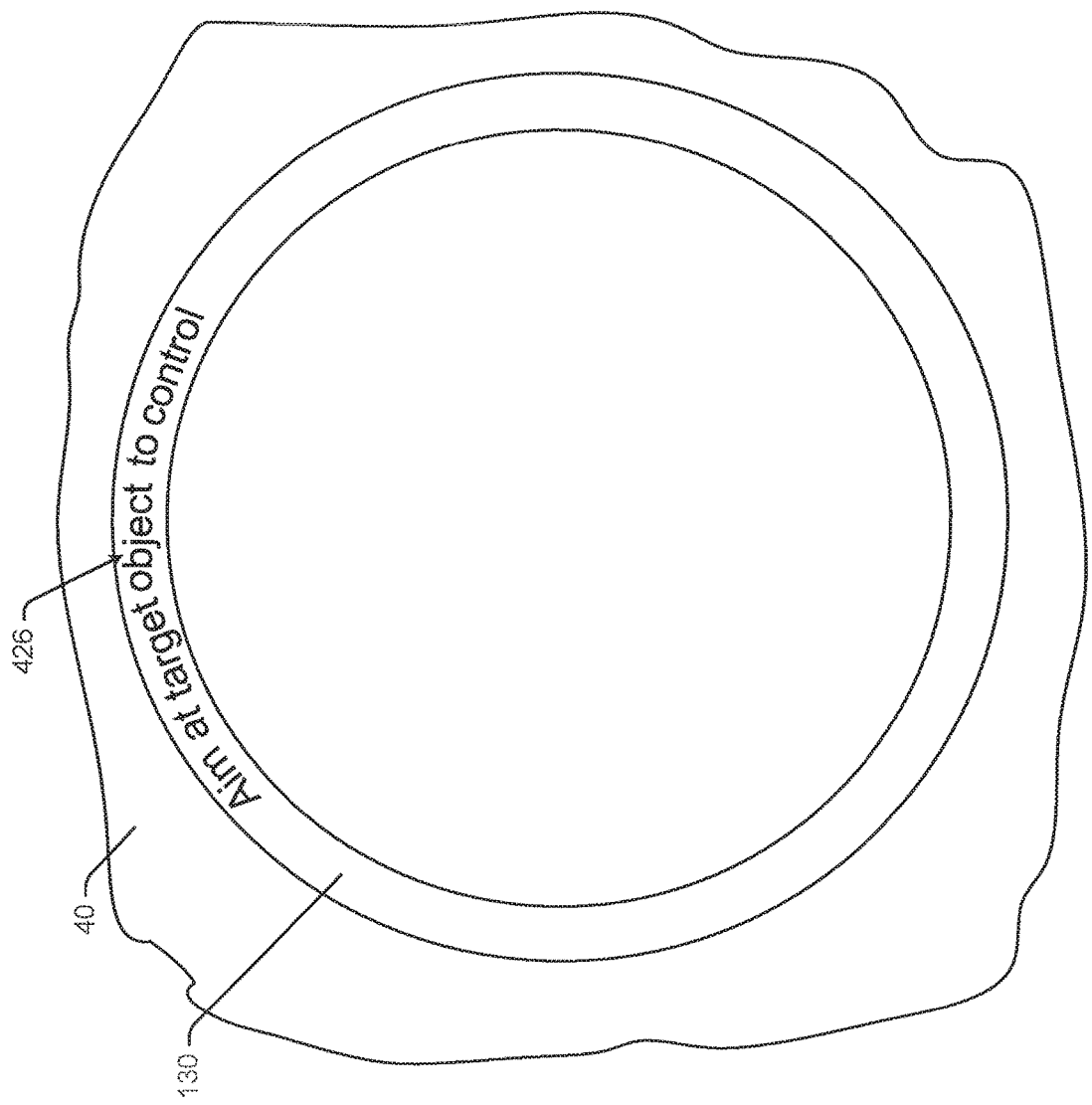
FIG. 27 is an end view of a gadget providing gadget use instructions to an employee on an end edge surface.

Referring once again to FIG. 5, in at least some embodiments gadget 40 displays may include a narrow end circular display 160, a wide end circular display 166, an inner surface display 164 and an outer surface display 162, or any combination of displays 160, 162, 164 and 166. In addition to providing virtual control icons and content associated with targeted objects via displays 158, the displays may be controlled to provide other type of information. For instance, simple gadget use guidance may be provided via the displays such as an instruction 426 to "Aim at target object to control" as shown in FIG. 27 which may be presented upon activation of gadget 40 whenever the gadget is not currently aimed at a controllable affordance and is not currently being used to perform some control activity.

Figure 28:
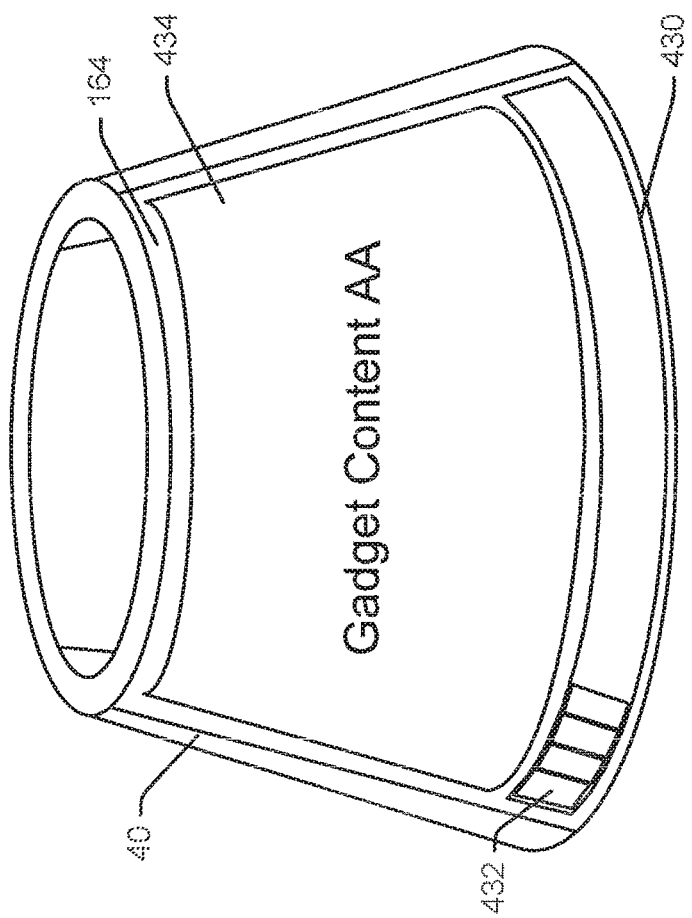
FIG. 28 is a perspective view of a cone gadget including an missive surface on an external surface.
Figure 29:
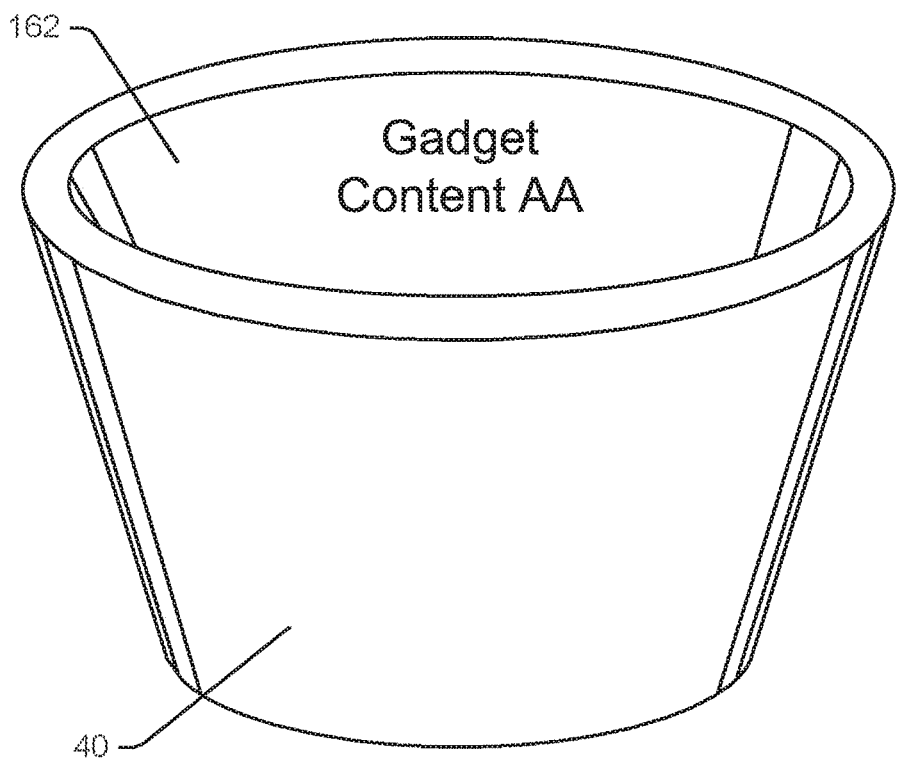
FIG. 29 is similar to FIG. 28, albeit showing a gadget having an emissive internal surface.

As another instance, one or both of the inner or outer displays 162, 164 may be used as an output device for various types of content. For example, where a plurality of content objects (e.g., images, documents, etc.) have been stored to a gadget queue using a gadget 40, that content may be accessible via outer display screen 164. In this regard, see FIG. 28 that shows gadget 40 with a gadget content queue 430 and a viewing field 434 presented on outer surface display 164. Thumbnails 432 of gadget queue content objects are presented within the queue field 430 that can be selected to present for personal viewing via field 434. Where display 164 is touch sensitive, selection of a thumbnail may cause an associated content object to be opened in field 434. Some other gadget action sequence like aiming at and selecting a location on a display screen and then tipping gadget 40 forward (e.g., a pouring action) may cause the content object currently in field 434 to be moved to the selected display location for common viewing. Although not illustrated, a session queue that stores all content related to a session or a project may also be accessed via gadget 40 in a similar fashion in at least some embodiments. Referring to FIG. 29, inner display 162 may be used in a fashion similar to the way the outer display 164 is used to access content queues and content objects.

In at least some cases a gadget 40 may be used in several different orientations with respect to an employee and may be controlled to operate differently when in the different orientations. For instance, sometimes gadget 40 will be used to target affordances for selection and control purposes by aiming the wide end 123 thereof at a specific affordance while at other times an employee may hold gadget 40 at a location and in an orientation such that the employee can view an outer or side surface display 164 to interact with a content queue and one or more content objects. Here, switching between using the gadget to aim at objects and using the gadget to access a queue and content objects may be automated where server 14 can determine the relative juxtaposition of gadget 40 to an employee using gadget 40.

Figure 31:
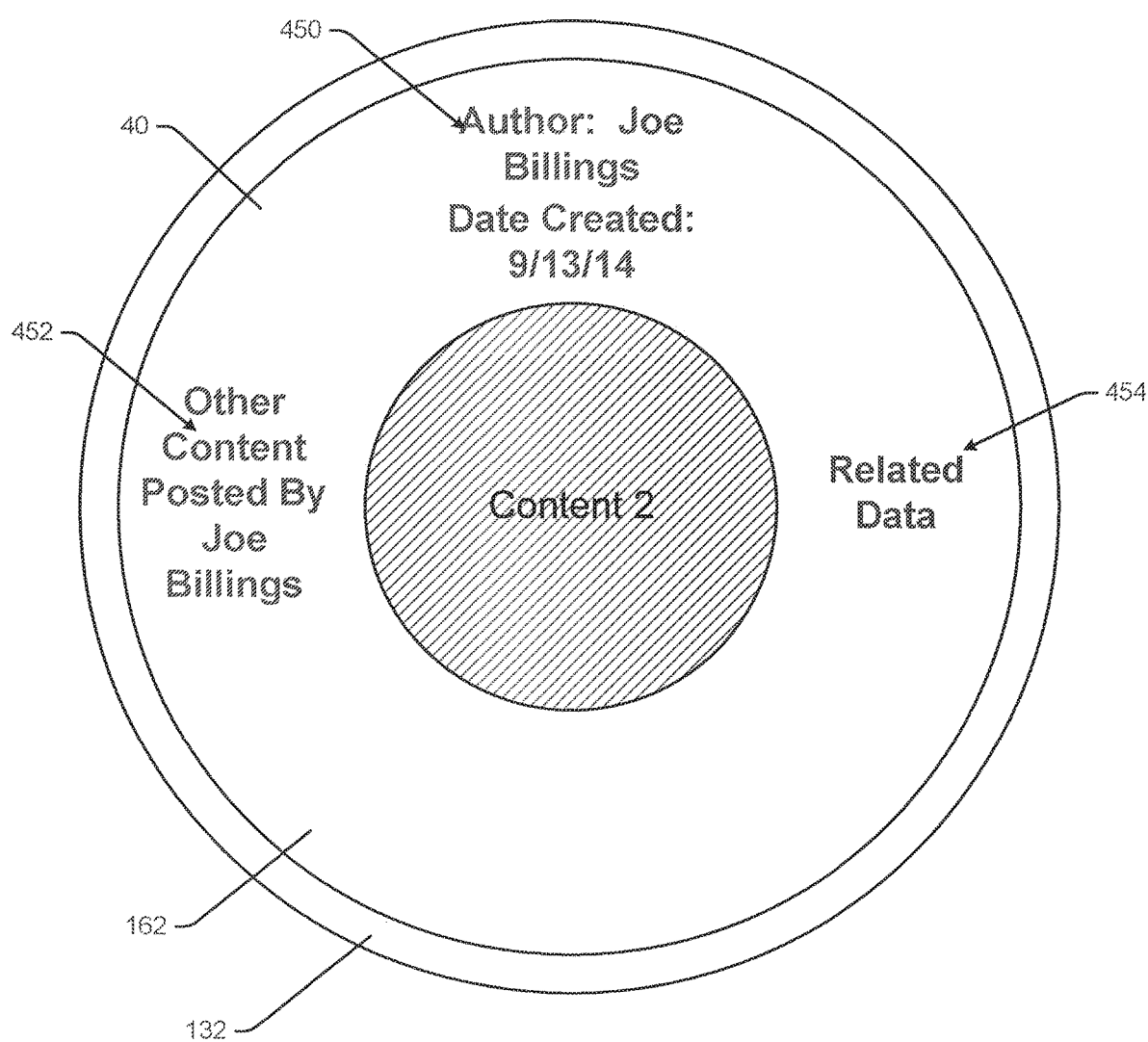
FIG. 31 shows the inner gadget surface with content presented thereon.

As another instance, gadget 40 may operate differently depending on which end, the narrow end 124 or the wide end 123, is aimed at a target object and switching between different operations may be automatic. For example, when the wide end 123 is aimed at content on a display 22a gadget 40 may operate as described above. In contrast, when the narrow end 124 is aimed at content on a display 22a, gadget 40 may automatically switch to operate differently and present historical data related to the targeted content to an employee. For instance, data related to who posted content and when the content was first created 450, was first posted, was edited, who edited the targeted content, etc., may be presented on inner surface 162 which should be viewable within passage 137 as shown in FIG. 31. In addition, a selectable option 452 for highlighting other posted content by the author of the targeted content may be presented, a selectable option 454 for highlighting other posted content that is related in some fashion (e.g., same primary topic, common words or phrases, etc.), may be presented, and other tools for enhancing an employees understanding of targeted or selected content may be presented on display 162. The other tools may be selected in various fashions including a gadget action (e.g., quick tip left, quick tip right), a touch action (e.g., touching the label associated with the tool or a portion of the end surface 132 proximate the label, etc.

Referring still to FIG. 31, when one of the other tools 452 or 454 is selected, gadget 40 may transmit a signal to server 14 causing the server 14 to highlight content of the selected type that is posted on display surfaces 20a through 20d in a space (see again FIG. 2). In addition, gadget 40 may also search a session queue for other content of the type selected that is not currently posted on one of the space displays 20a through 20d and may indicate that content via inner display 162 or outer display 164 (see again FIG. 28) as selectable thumbnails or via a session queue field 306 (see again FIG. 14) on one of the displays 20a.

Referring still to FIG. 31, the line of an employee's sight onto surface 162 when peering into passage 137 is angled with respect to surface 162. To correct for the angled viewing trajectory, in at least some embodiments, content on surface 162 may be compensated for the angle so that it appears to be presented on a flat surface perpendicular to the length of passage 137.

In order to switch gadget operation based on orientation with respect to an employee, in at least some embodiments, server 14 will be programmed to use sensed information from cameras 32a through 32n and gadget sensing components 152 to determine gadget to employee juxtaposition. More specifically, server 14 may be programmed to determine at least the general trajectory of an employee's gaze with respect to gadget 40 to determine which gadget 40 surface is most tangent to the employee's line of sight and may control gadget 40 operation as a function thereof. For instance, when an employee's gaze is generally tangent to the narrow end surface 130 of gadget 40, server 14 may cause gadget 40 to operate as an aiming device and when the employee's gaze is generally tangent to outer surface 128, server 14 may cause gadget 40 to operate as a content viewing device. While only two different general functions are described in this section of the specification, it should be appreciated that other gadget functions may be automatically assigned to a gadget 40 based on relative juxtaposition between the gadget and a using employee.

Thus, in at least some embodiments gadget operation will depend on location and orientation in an enterprise space, location and orientation relative to controllable affordances in a space, current settings of controllable affordances in a space, as well as relative juxtaposition of the gadget with respect to an employee currently using the gadget.

Figure 30:
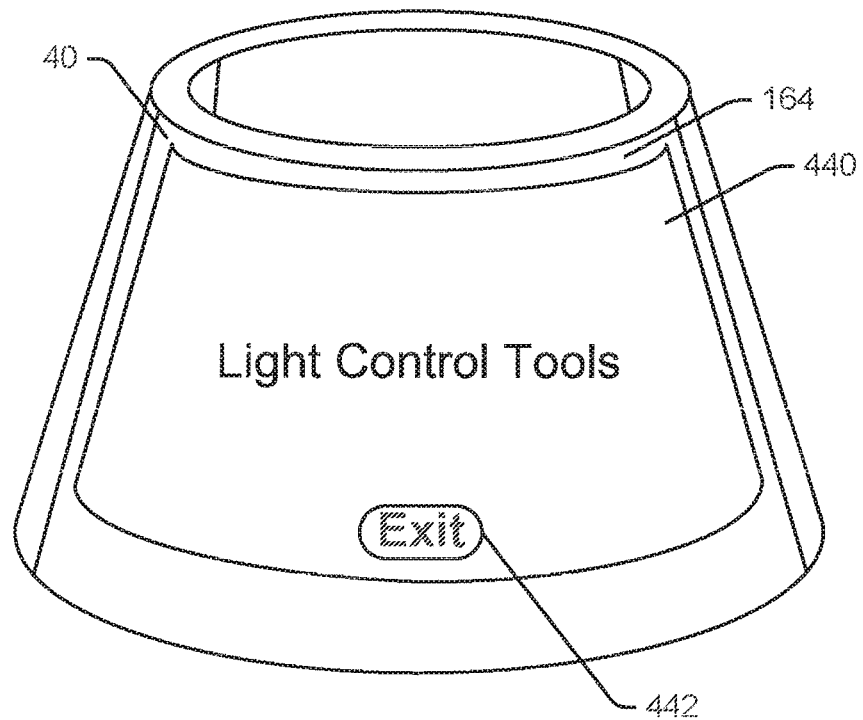
FIG. 30 is similar to FIG. 28, albeit showing specific light control tools presented on the external surface of a gadget.

In some cases initial association of a gadget with an affordance may require an aiming and affordance selection action and thereafter the gadget may remain associated with the selected affordance until some affirmative step occurs to disassociate the gadget from the affordance regardless of the orientation of the gadget within space. For instance, referring again to FIG. 6, light 22a may be targeted and selected using gadget 40. Thereafter, until some disassociating action, gadget 40 may be used in any orientation to control light 22a operating characteristics. For example, see gadget 40 in FIG. 30 where light control tools are provided on touch sensitive outer display 440. Here, tools 440 would remain on surface display 164 until exit icon 442 is selected to disassociate gadget 40 from the light 22a. Other disassociating activities including a specific physical movement or action using gadget 40 are contemplated.

In at least some embodiments gadget operation may be automatically (or manually in some cases) customized to specific gadget users. For instance, a first employee may want the full ability to change all light operating characteristics at all times while a second employee may only want the ability to changing light in a space between a high intensity and a low intensity without changing any other operating parameters. In this case, server 14 may treat a single gadget 40 differently based on which employee is using the gadget 40. Here, cameras 32a through 32n or other sensing devices in a space have to be able to generate information useable by server 14 to identify specific employees that use a gadget 40. For instance, where employees wear RF identification tags or the like, signals received from the access points 30 may be able to triangulate locations of specific employees in space. In this case, when one employee is proximate a gadget when the gadget is activated (e.g., picked up), server 14 may assume that the one employee picked up the gadget and may associated that employee and the employee's gadget preferences with the gadget until some other event which disassociates the employee and the gadget occurs. For instance, if a space camera 32*a* detects that the one employee is no longer proximate an active gadget, a disassociation event may occur. Images from space cameras 32*a* through 32*n* as well as signals from gadget components 152 may be used to continuously track gadget and employee positions.

Figure 32:
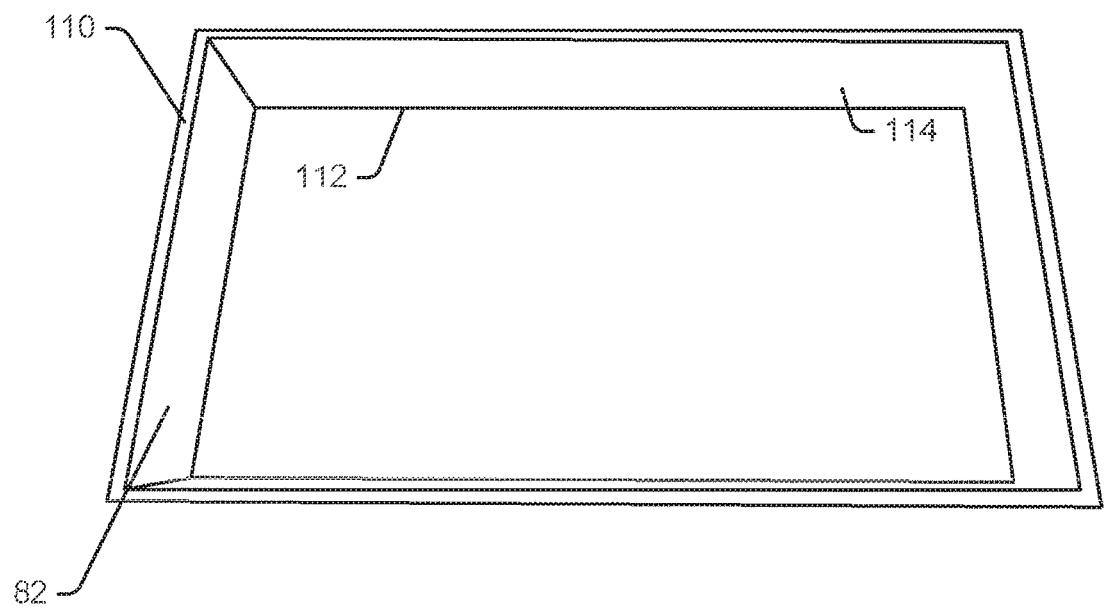
FIG. 32 is a perspective view of an exemplary frame shaped gadget that is consistent with at least some aspects of the present disclosure.

While control features and a system have been described above in the context of a cone shaped gadget 40, other shaped control interface gadgets are contemplated. For instance, see exemplary full frame gadget 82 in FIG. 32 that includes a rectangular frame shaped structure having four generally straight side members that form a rectangular front edge 110 and a smaller rectangular rear edge 112, an inner surface 114 and an outer surface (not shown but opposite the inner surface 114), where the inner and outer surfaces angle from the rear edge 112 outwardly toward the front edge 110. Here, gadget 82, like gadget 40, forms a central passage that can be used for aiming purposes and also forms an internal surface that can support an inner display (not illustrated) akin to display 162 described above with respect to gadget 40. In at least some embodiments one or more gadgets 82 may be provided within an enterprise space for controlling space affordances in any of the ways described above with respect to gadget 40. Gadget 82 may be equipped with essentially any subset of the components described with respect to FIG. 5 that includes the processor 140, a battery 141 and a transceiver 142 along with some location or orientation sensing devices except that any display components would have shapes that are similar to the shapes of the outer surfaces that define the shape of gadget 82.

Figure 33:
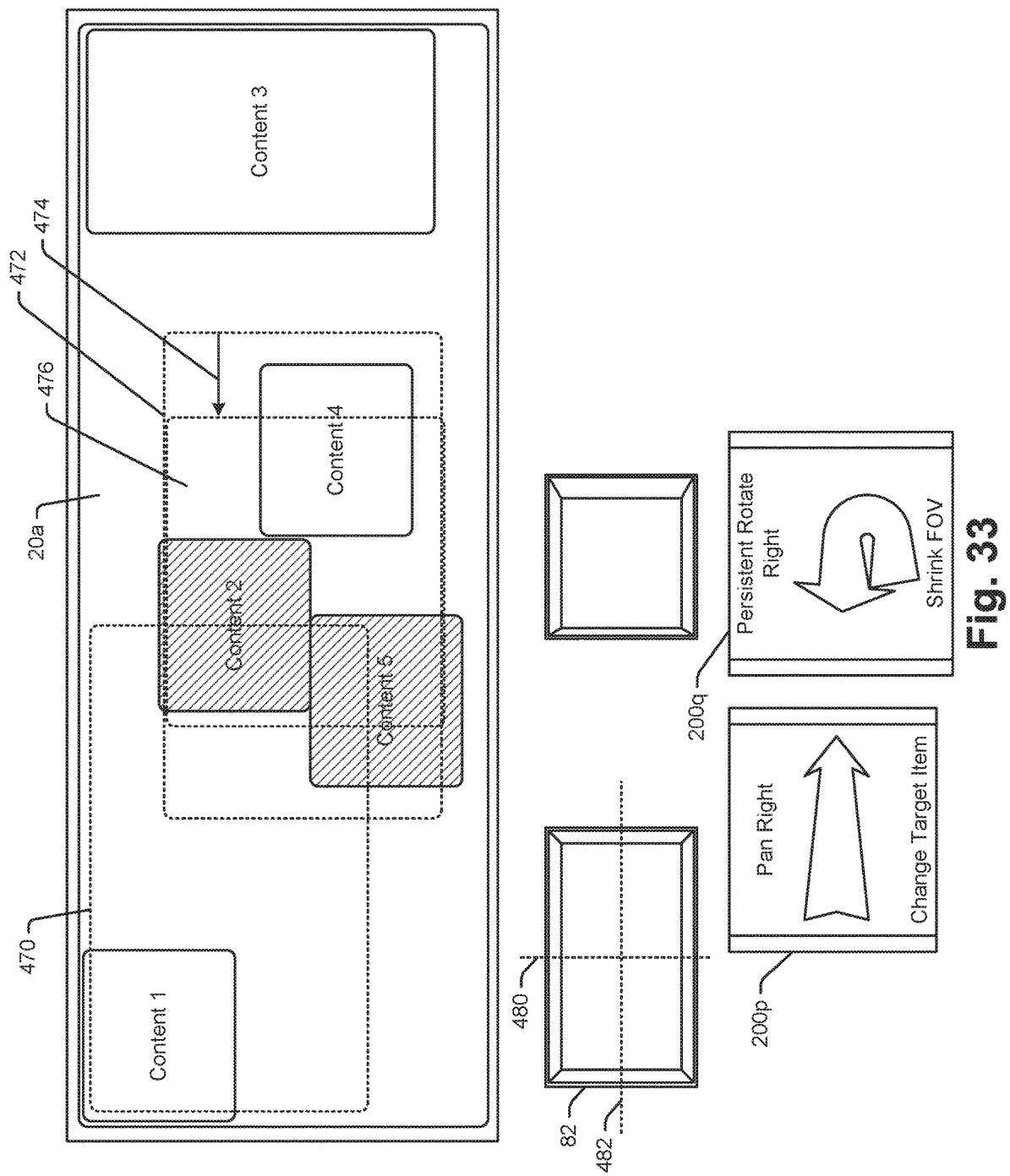
FIG. 33 is a schematic view of the FIG. 32 gadget being used to perform various actions and showing their effects.

In addition to operating in ways that are similar to those described above with respect to gadget 40, gadget 82 may operate in other ways which are uniquely intuitively related to its shape. For instance, see FIG. 33 where gadget 82 is shown aimed at a display screen 20*a* and specifically, initially, as indicated by field of view 470. Here, as an employee pans gadget 82 right while aiming at display 20*a* as indicated by field 200*p*, the FOV moves right as indicated by a second FOV 472 in a fashion similar to that described above with respect to gadget 40. Here, however, when the employee persistently rotates gadget 82 right about a vertical axis 480 as indicated by field 200*q*, instead of moving the FOV to the left, the FOV width is made smaller as indicated by arrow 474 and smaller FOV 476. To reduce the height of an FOV, gadget 82 may be rotated about a horizontal axis 482. Once a desired FOV is highlighted on the display 20*a*, some type of gadget selection option may be performed. While not described here in detail, many other gadget movements that are intuitively associated with the rectangular frame shape are contemplated.

Figure 34:
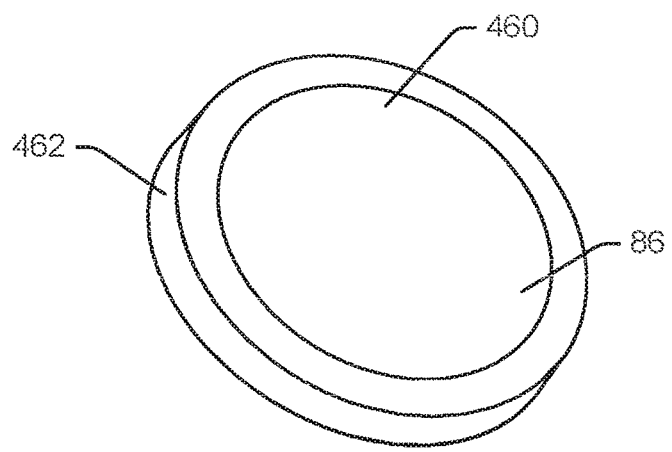
FIG. 34 is a perspective view of a puck shaped gadget.

Referring now to FIG. 34, another gadget that may be included in at least some systems that are consistent with various aspects of the present disclosure includes puck shaped gadget 86 that has a shape similar to a hockey puck having a cylindrical or annular outer surface 460 and oppositely facing front and rear surfaces (only front surface 462 shown). In at least some embodiments one or more gadgets 86 may be provided within an enterprise space for controlling space affordances in any of the ways descried above with respect to gadget 40, albeit where aiming at target objects would not include peering through a gadget passage as gadget 86 has no passage. Instead, aiming at a target object with device 86 may simply include holding device 86 up so that one of the flat end surfaces (e.g., 464) faces an affordance being targeted. In this case, because both ends of gadget 86 are substantially identically shaped, in at least some embodiments either end of gadget 86 may be used for aiming and the gadget may operate in the same fashion as an interface regardless of which end is aimed at an affordance.

Gadget 86 may be equipped with essentially any subset of the components described with respect to FIG. 5 that includes the processor 140, a battery 141 and a transceiver 142 along with some sensing devices except for the display set 158 (e.g., where gadget 86 includes one or more displays, those displays would have shapes that have outer surfaces that are flush with the surfaces of gadget 86 as illustrated (e.g., flat circular or annular).

Figure 35:
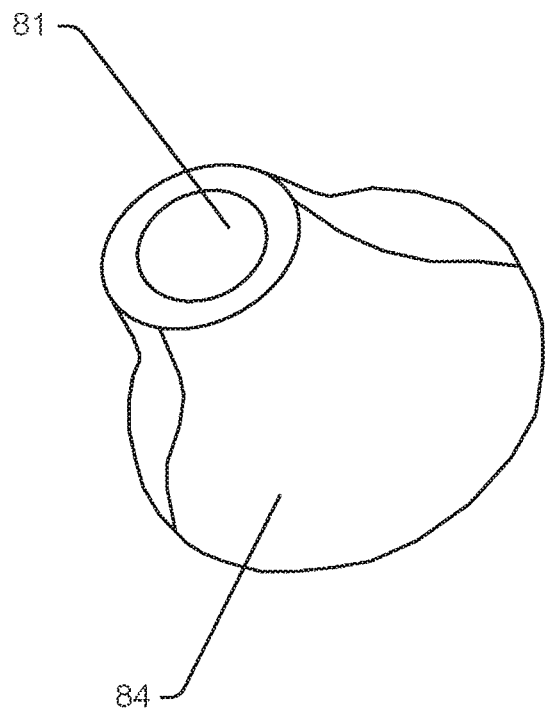
FIG. 35 is a perspective view of a funnel shaped gadget.

Referring to FIG. 35, another exemplary gadget is a funnel gadget 84 that has a funnel shape that is wide at one end and narrow at the other where a diameter between the wide and narrow ends narrows progressively along a midsection between the wide and narrow ends. Here, gadget 84, like gadget 40, forms a central passage 81 that can be used for aiming purposes and also forms an internal surface that can support an inner display (not illustrated) akin to display 162 described above with respect to gadget 40. In at least some embodiments one or more gadgets 84 may be provided within an enterprise space for controlling space affordances in any of the ways descried above with respect to gadget 40. Gadget 84 may be equipped with essentially any subset of the components described with respect to FIG. 5 that includes the processor 140, a battery 141 and a transceiver 142 along with some sensing devices and a differently shaped set of displays.

Figure 36:
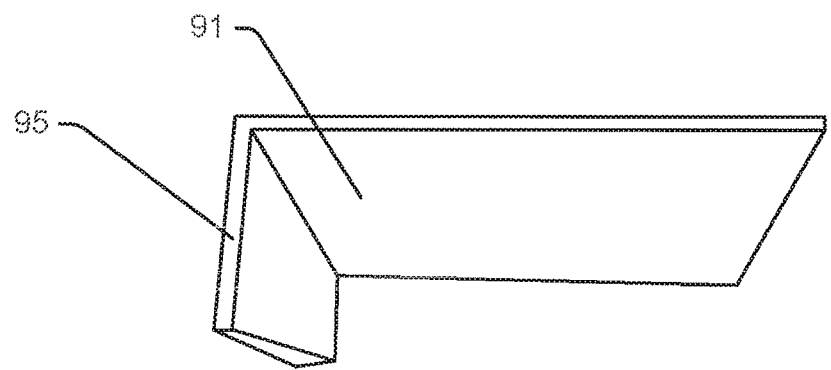
FIG. 36 is a perspective view of an exemplary angle gadget.

Referring to FIG. 36, an angle gadget 91 may be provided in some embodiments that includes a shape that resembles two sides of a rectangular frame that form one corner. One or more of angle gadgets 91 may be provided within an enterprise space for controlling space affordances in any of the ways descried above with respect to gadget 40, albeit where aiming at target objects would not include peering through a gadget passage as gadget 91 has no passage. Instead, aiming at a target object with gadget 91 may simply include holding gadget 91 up so that a short angled edge surfaces (e.g., the edge surface opposite edge 95) faces an affordance being targeted. Gadget 91 may be equipped with essentially any subset of the components described with respect to FIG. 5 that includes the processor 140, a battery 141 and a transceiver 142 along with some sensing devices except for the display set 158 (e.g., where gadget 91 includes one or more displays, those displays would have shapes that have outer surfaces that are flush with the surfaces of the gadget shape illustrated.

Figure 37:
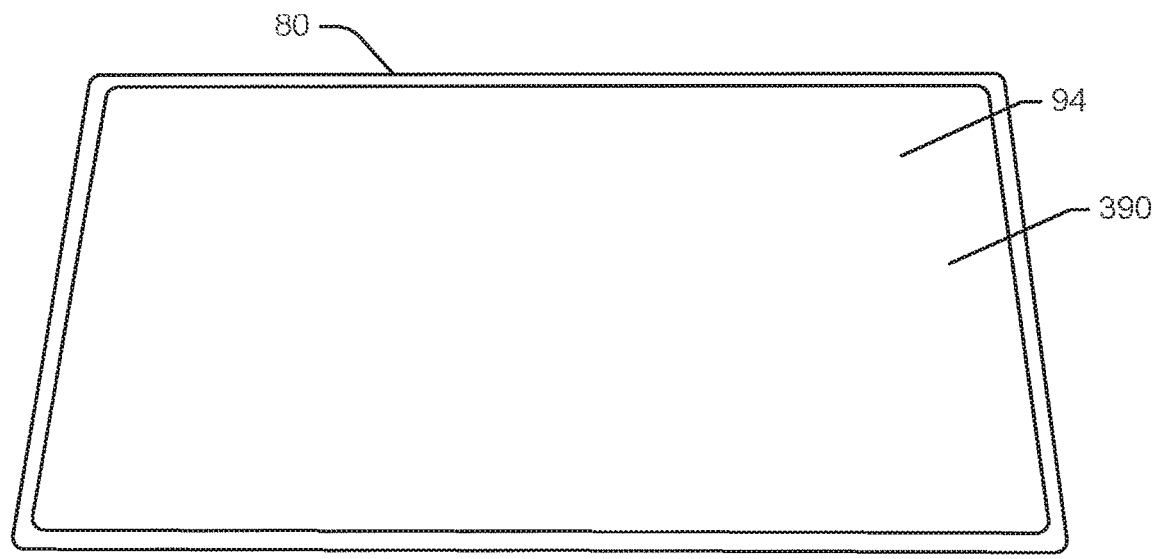
FIG. 37 is a perspective view of a planar gadget.

Referring to FIG. 37, another advantageous gadget may include a planar gadget 80 that includes first and second substantially parallel and flat rectangular surfaces 94 (and the surface opposite 94) and that is relatively thin. In at least some embodiments one or more gadgets 80 may be provided within an enterprise space for controlling space affordances in any of the ways descried above with respect to gadget 40, albeit where aiming at target objects would not include peering through a gadget passage as gadget 80 has no passage. Instead, aiming at a target object with gadget 80 may simply include holding gadget 80 up so that one of the flat planar surfaces (e.g., 94) faces an affordance being targeted. In this case, because both flat surfaces of gadget 80 are substantially identically shaped, in at least some embodiments either flat surface of gadget 86 may be used for aiming and the gadget may operate in the same fashion as an interface regardless of which end is aimed at an affordance.

Gadget 80 may be equipped with essentially any subset of the components described with respect to FIG. 5 that includes the processor 140, a battery 141 and a transceiver 142 along with some sensing devices except for the display set 158 (e.g., where gadget 80 includes one or more displays, those displays would have shapes that have outer surfaces that are flush with the surfaces of gadget 80 as illustrated (e.g., flat, rectangular).

Again, while gadget 80 may operate in a fashion similar to that described above with respect to gadget 40, in other cases gadget 80 may operate differently or at somewhat differently. For instance, where gadget 80 includes at least one flat display screen on one side (e.g., 94 in FIG. 37), the display (labelled 490 in FIG. 37) may be used to facilitate other interface functionality. For example, referring to FIG. 38, when gadget 80a is held up and aimed at a display screen 20a that includes content thereon, a quick rotate left through 15 degrees as indicated by field 200r may turn on a content access feature whereby content on the targeted display screen is all duplicated in whole or in part on the gadget screen 390. In some embodiments the section of the content presented on display 20a that is replicated on gadget display 390 may be related to how close gadget 80a is to the display screen which could affect a virtual field of view of the gadget 80a. In other cases, a content access action 200r may cause all content displayed on display 20a to be replicated on display 390 regardless of how close gadget 80a is to display 20a. Here, in at least some cases it is contemplated that when an employee aims gadget 80a at a display and the display content is replicated on the gadget display 390, there may be no indication on display 20a that the targeting or replication occurred.

Figure 38:
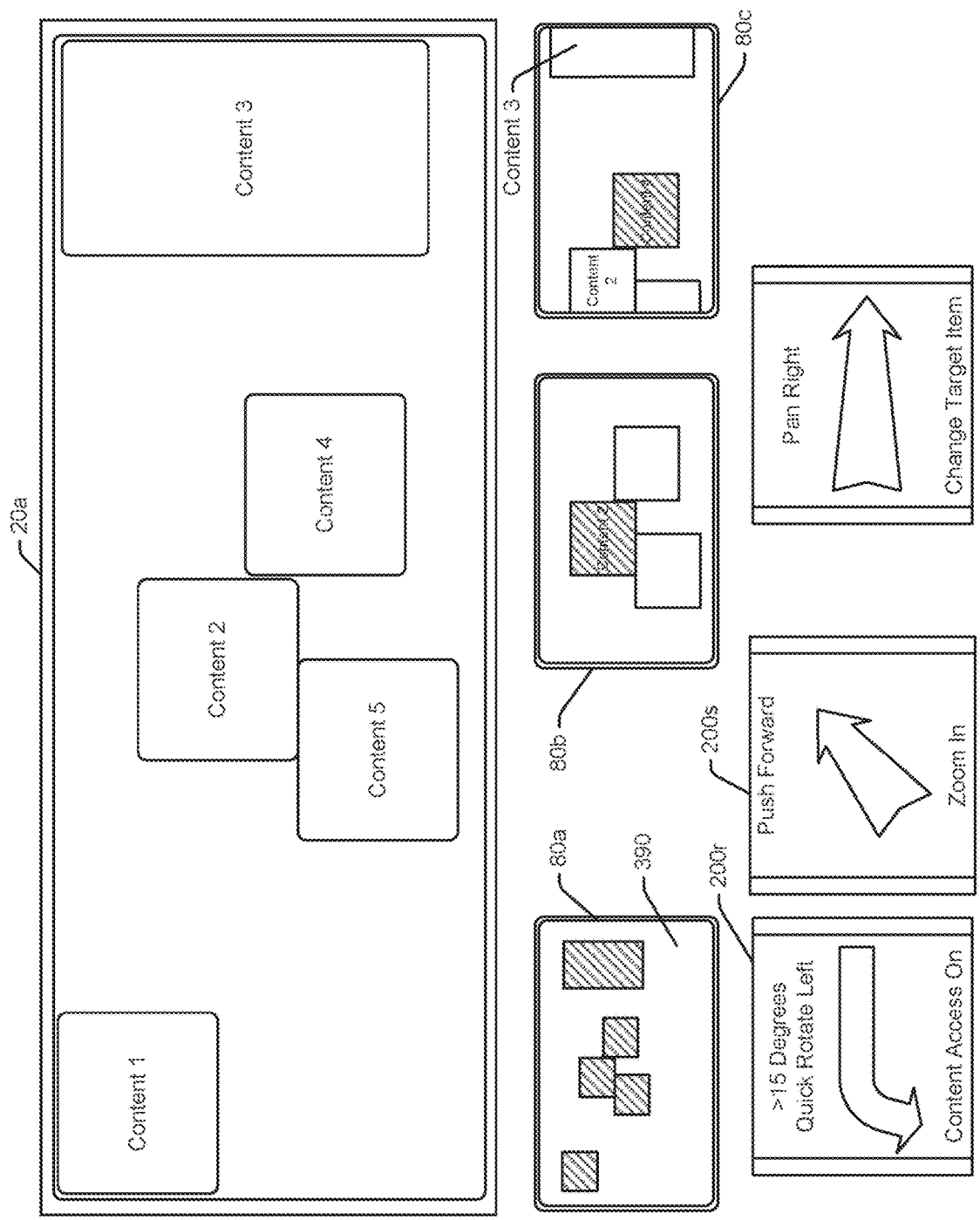
FIG. 38 is a view similar to FIG. 33, albeit showing the planar gadget of FIG. 37 performing various actions and their effects.

Initially, as shown on display 390 in FIG. 38, the full set of replicated content from display 20a may be highlighted or otherwise visually distinguished to indicate that the full set can be selected by the employee using gadget 80a. Full selection may allow the employee to then move gadget 80a into a more comfortable (e.g., lap or table supported) position for working with the selected content.

Continuing, when an employee pushes gadget 80 forward toward display 20a as indicated by field 200s, without changing anything about the content on the display 20a, the view of content on gadget display 390 may pan in to show a smaller content set as shown by gadget instance 80b. Content 2 is highlighted on the display of gadget 80b to indicate a likely intended target content set as discerned by the system server 14 (see again FIG. 1). Here, panning out again may cause the original full content set to be presented as shown at gadget 80a.

Referring still to FIG. 38, after zooming in as indicated at field 200s, if gadget 80b is panned right, in at least some cases the scene on the gadget display may also pan right in a virtual view of display 20a to show a different portion of the content presented on display 20a. In addition, the highlighted content set will be automatically altered based on content located proximate a central portion of the display screen 390 as shown on the screen of gadget 80c where Content 4 is highlighted instead of Content 2 which was previously highlighted as indicated at 80b.

Figure 39:
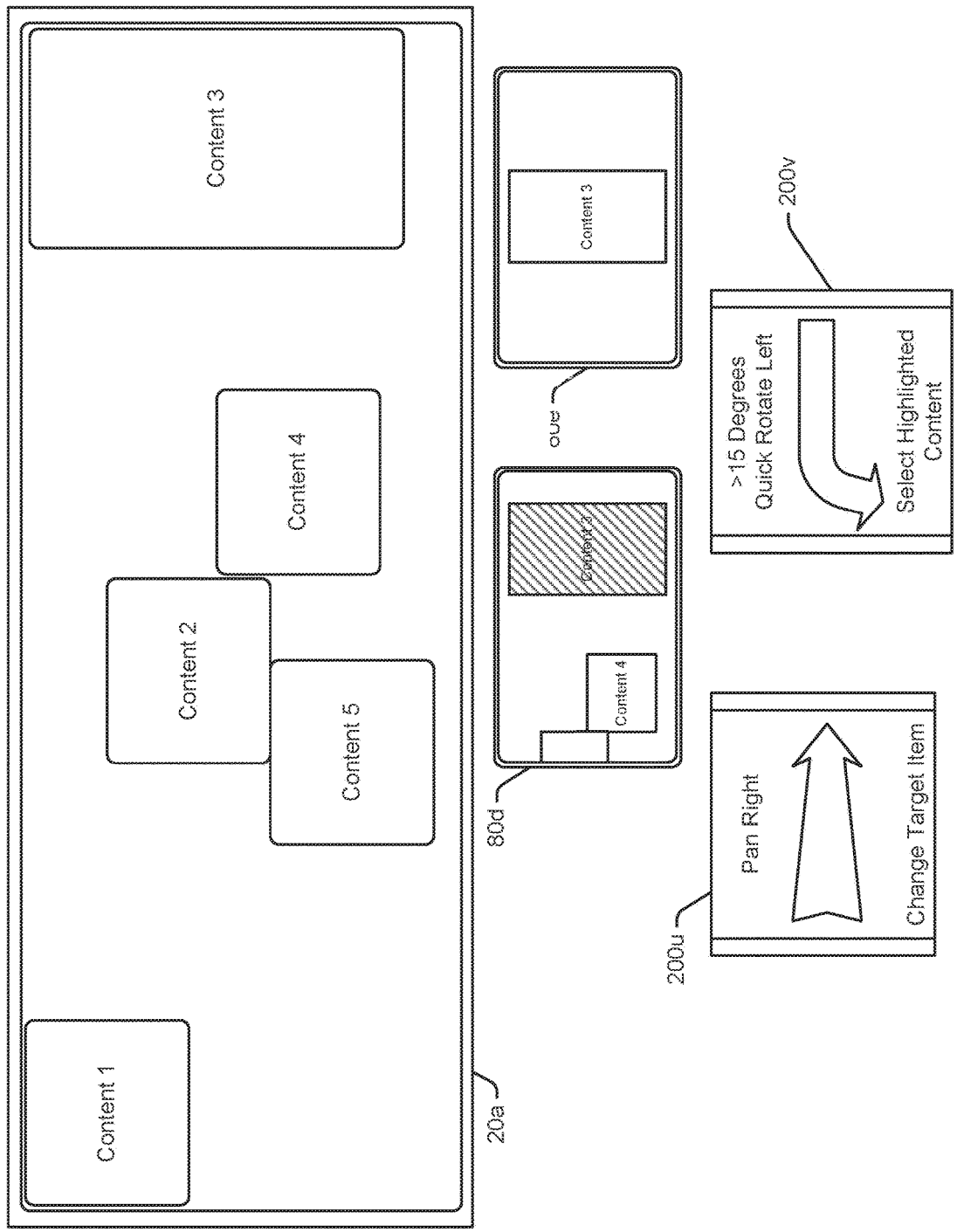
FIG. 39 is similar to FIG. 38, albeit showing different actions and their effects.

Referring to FIG. 39, eventually as gadget 80c is panned right (see field 200u), Content 3 is highlighted as indicated on the display of gadget 80d. if an employee wants to select the highlighted Content 3, another quick rotate left action of gadget 80 will select the highlighted content as indicated at field 200v. After Content 3 is selected, gadget 80 may be used to perform other functions related to the selected content as described above.

Referring again to FIG. 38, if an employee pulls gadget 80a rearward away from display 20a instead of pushing the gadget toward display 20a after action 200r, in at least some cases other content associated with the content presented on display 20a may be replicated on gadget display 390 or at least associated with gadget 80a to be selected. For instance, referring again to FIG. 2, assume that additional content is presented on displays 20b through 20d when an employee accesses content via action 200r in FIG. 38. Next assume that the employee moves gadget 80a away from display 20a to pan out another level. In this case all of the content presented via each of the display screens 20a through 20d may be replicated on display 390 or otherwise associated with gadget 80a for selection. Here, another action or further pulling away from display 20a may cause yet another jump out in content targeted to include all content in a session queue to be targeted by gadget 80a and yet further pulling away may cause another jump out to all content associated with a long term project that is associated with the current session. Queues of content may be presented in any of several different forms on gadget display 390.

When controlling an ambient affordance, when gadget 80 is aimed at an ambient affordance, association therewith may be indicated via some type of message or content on display 390. For instance, in at least some cases, when gadget 80 is aimed at a light fixture 22a (see again FIG. 1), an image of the exact type of light fixture may be presented on display 390 to provide a clear indication that the light fixture is controllable and can be targeted for control via the gadget. As another instance, where gadget 80 includes a camera on a side opposite display 390, the camera may obtain images of a field of view associated with the gadget 80 and present those images as a real time video clip on display 390 as an employee moves gadget 80 about to target different controllable affordances. In this case, when server 14 identifies a target object in the FOV of gadget 80, the server may cause gadget 80 to highlight the targeted object (e.g., a light, a thermostat, a controllable shade, etc.) in the scene presented via display 390. Here, as the object targeted by gadget 80 changes, server 14 and gadget 80 would update the highlighted affordance to indicating the changing targeted object. While not as intuitive, the targeted object may be indicated via a text message presented on display 390.

Figure 40:
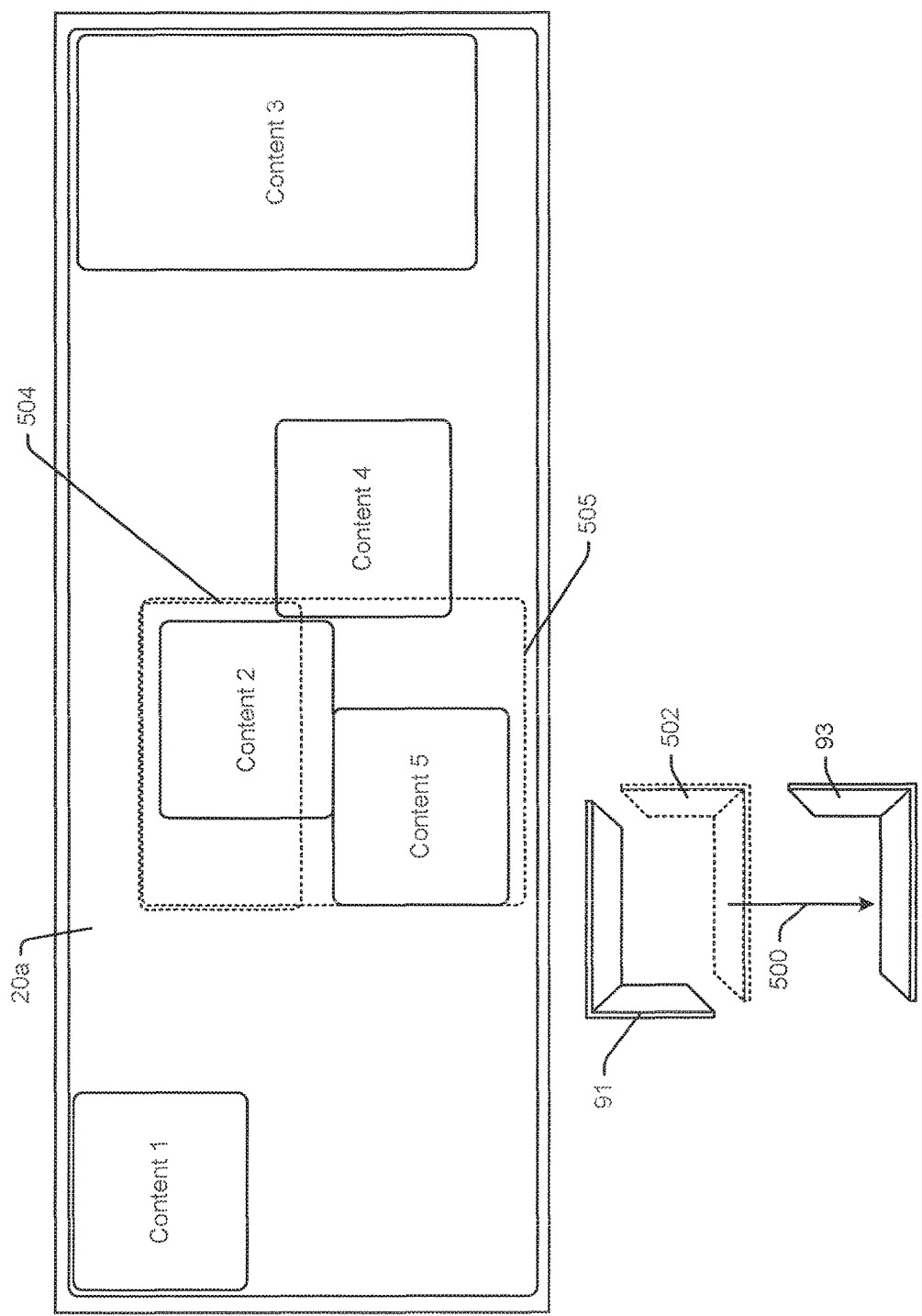
FIG. 40 is similar to FIG. 39, albeit showing two of the angle gadgets performing a function and an associated action.

In at least some embodiments it is contemplated that two or more gadgets may be used together in some fashion to generate other commands in an intuitive fashion. For instance, see FIG. 40 where angle gadget 91 is shown along with a second angle gadget 93 that is similar in shape and function to angle gadget 91. Here, when one employee uses first ans second angle gadgets 91 and 93 simultaneously, the combination of gadget actions may be ascribed a different meaning. In FIG. 40, gadgets 91 and 93 (initial position shown in phantom 502) are shown being initially aimed at a display 20a where inner edges of the gadgets generally form a horizontally elongated rectangular shape. As shown, an initial FOV associated with the shape defined by the two gadgets is rectangular and horizontally elongated (see 504). As gadget 93 is moved (see arrow 500) from its initial location shown in phantom at 502 to a second relative position with respect to gadget 91, the FOV is extended downward as shown at 505. Here, server 14 tracks relative locations and juxtapositions of gadgets 91 and 93 and uses the spatial relationships thereof to adjust a target FOV accordingly. Many other commands associated with other relative juxtapositions of two or more separate gadgets are contemplated.

In at least some embodiments it is contemplated that more than one type of gadget may be provided in an enterprise space. Here, in some cases, each gadget may perform similar functions in similar ways. In other cases, each gadget may perform intuitive gadget specific functions for each controllable affordance in a space. For instance, one gadget type may be used for target object selection while another gadget type is used to change operating parameters after a specific affordance selected for control. For example, in some cases cone gadget 40 may be used to select content and a planar gadget like 80 described above may be used to present a control interface and receive control commands for an affordance that has most recently been selected via the cone gadget.

In still other cases, separate and differently shaped gadgets may be provided for performing different tasks in an enterprise space. For instance, referring to FIG. 41, separate instances of each of gadgets 40, 84 and 86 and the pair of gadgets 91/93 may be provided in an enterprise space where gadget pair 91/93 is used to control content currently presented on a display screen 20a, gadget 84 is used for light control, gadget 86 is used for temperature control and gadget 40 is used to manage access to a personal content queue, a session content queue and a project content queue so that content can be added to and taken from the space display screens 20a through 20d. Here, even if the gadget shapes are not initially intuitive to the functions performed or affordances controlled thereby, over time employees would ascribe meanings to the gadgets and, upon entering any enterprise space, presence of those gadgets would clearly indicate affordance capabilities in an associated space.

In at least some embodiments it is contemplated that at least one and perhaps each employee that enters an enterprise space may obtain access to a complete kit of gadgets for controlling space affordances. To this end, see the exemplary kit 34a in FIG. 41 that includes a planar gadget 75, a rectangular frame gadget 82, a cone gadget 40, a puck gadget 86, a funnel gadget 84 and a pair of angle gadgets 91/93. The gadget kit 34a may be designed so the separate components fit together in an organized fashion as shown in FIG. 42. Here, it is believed that if a gadget kit fits together in an organized fashion, the likelihood of the gadgets remaining together and associated with specific enterprise spaces will be increased appreciably as employees will be able to quickly recognize when a gadget is missing from a kit.

Figure 41:
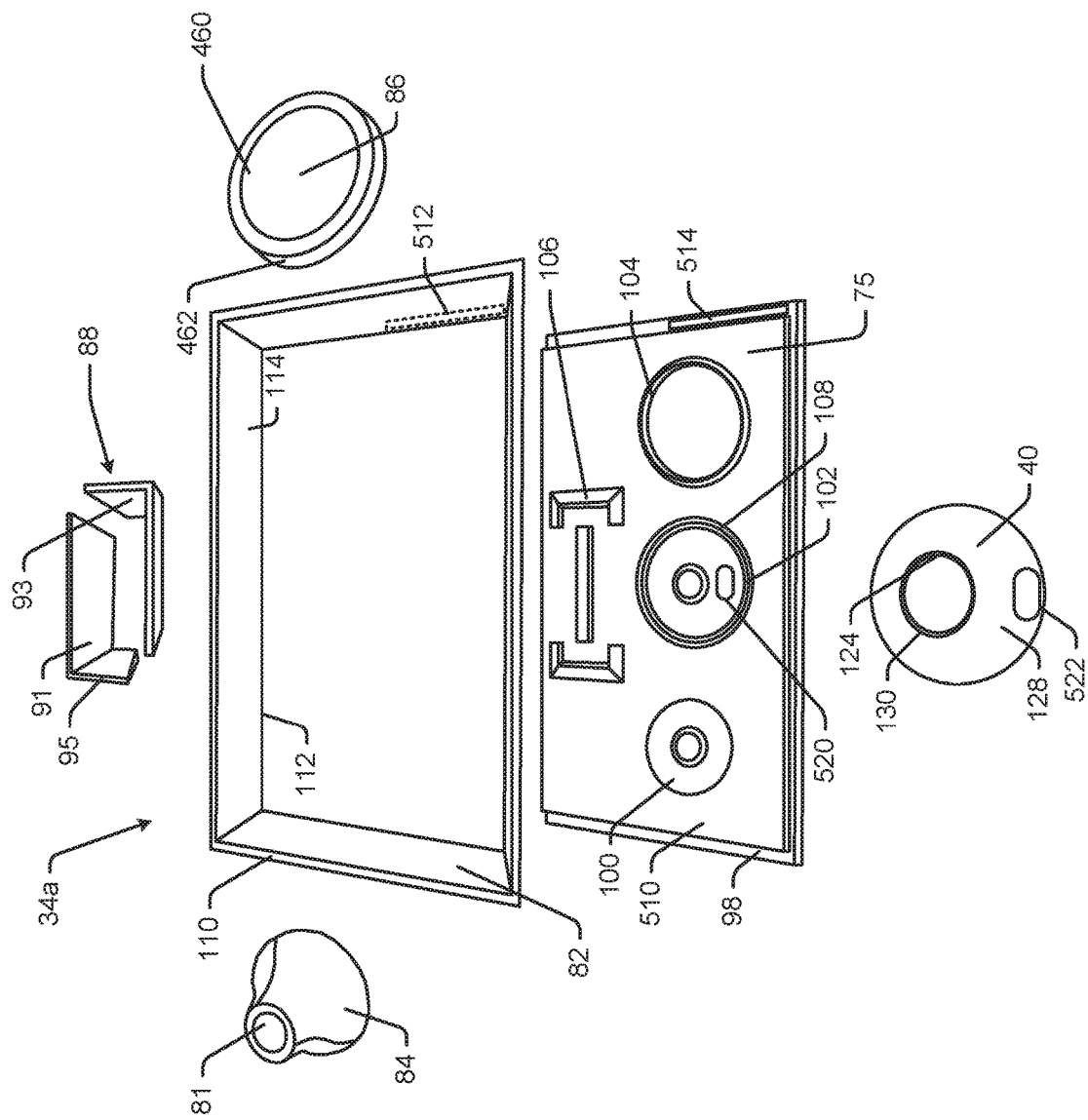
FIG. 41 shows a kit of gadgets in an exploded view.
Figure 42:
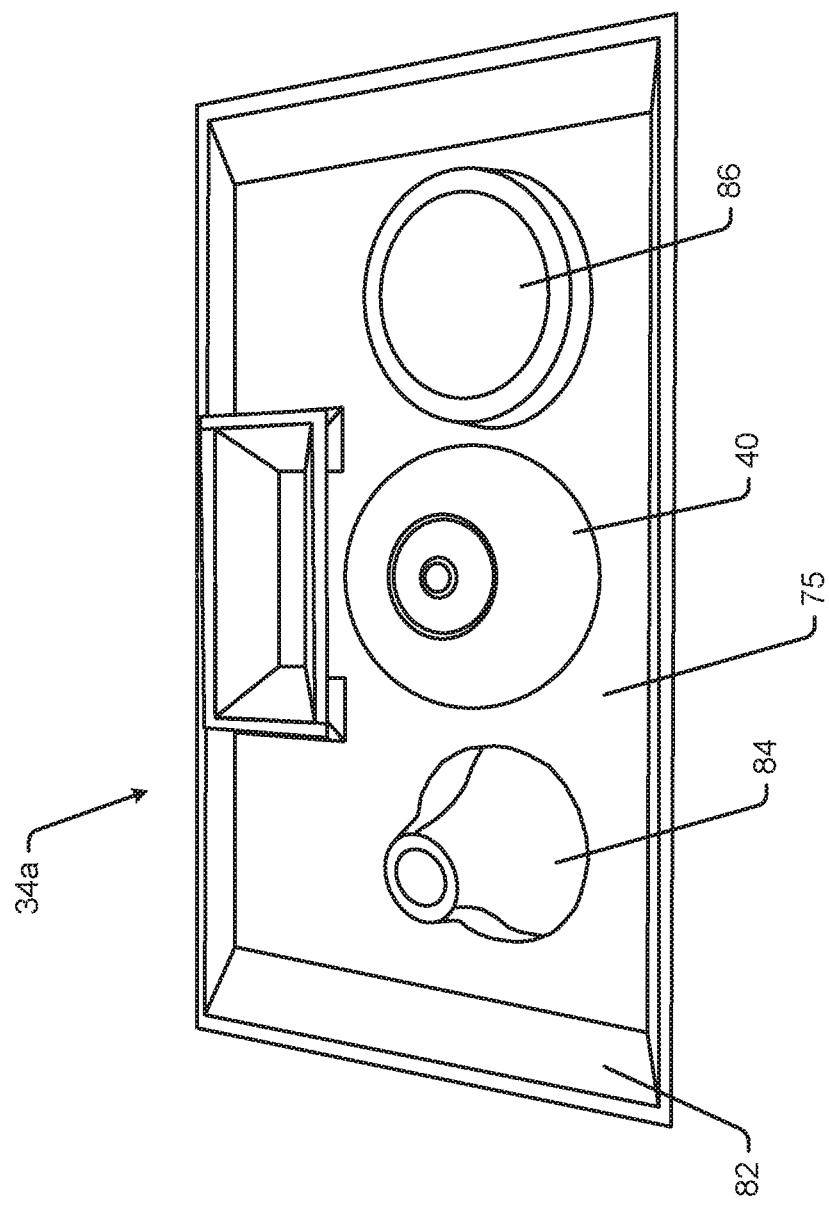
FIG. 42 shows the kit of FIG. 39 in an assembled view.

As shown in FIG. 41, planar gadget 75 includes an upper surface 510 and an opposite lower surface (not illustrated or labelled) and is generally rectangularly shaped including a recessed edge or circumferentially extending flange 98 adjacent upper surface 510 for receiving a lower edge of the frame gadget 92 so that, together, gadget 82 and gadget 75 can form a recessed tray for receiving and supporting the other kit gadgets. In at least some embodiments magnets or other yieldable fasteners 514 (and 512 shown in phantom) may be provided on adjacent surfaces of gadget 75 and gadget 82 so that once the lower edge of gadget 82 is received on the flange 98, the magnets cooperate to hold the gadgets together in the tray shape unless a force greater than a threshold force that overcomes the magnetic attraction is applied thereto.

Referring still to FIG. 41, indicia may be provided on the top surface of gadget 75 to guide placement of other gadgets in the kit into storage locations on surface 510. To this end, for instance, indicia to guide gadget 40 to a stored position includes a ring shaped indicia 102 that is dimensioned to be similar to a circle defined by the inner edge of the wide end of gadget 40. In at least some cases the gadget 75 may include magnets or a magnetic ring 108 about indicia 102 and the wide end 123 of gadget 40 may include magnets 131 (see again FIG. 3) that cooperate with the ring magnet 108 to help align gadget 40 with indicia 102 and to maintain gadget 40 on surface 510 unless a force greater than a threshold force that overcomes the magnetic attraction is applied thereto. In some cases indicia 102 may simply include a label or a painted or inlayed pattern so that the indicia is substantially flush with surface 510. In other cases, indicia 102 may include a protruding member so that the indicia stands proud of surface 510 (e.g, less than a centimeter) to mechanically guide gadget 40 when being placed on surface 510.

Other exemplary indicia shown on surface 510 include indicia 100 for funnel gadget 84, indicia 104 for puck gadget 86 and indicia 106 for the two angle gadgets 91 and 93. While not described in detail here, all of these other indicia may have characteristics similar to the characteristics described above with respect to indicia 102.

Referring still to FIG. 41, it should be appreciated that a quick glance at a kit 34a will allow an employee to ascertain if all kit gadgets are present. In this regard, where one or more gadgets are missing from a kit, an employee can easily see that one of the indicia does not have a gadget pairing. It is contemplated that when employees are leaving a space, presence of gadget 75 will quietly encourage replacement of gadgets on surface 510 to complete a kit. Where an employee attempts to assemble a kit at the end of a session, if a gadget is missing, in many cases the employee will at least attempt to locate the gadget to complete the kit. This type of behavior should reduce the amount of inadvertent removal of gadgets from enterprise spaces and therefore result in higher overall satisfaction with a gadget based system.

Referring yet again to FIG. 41, in at least some embodiments planar gadget 75 will simply function as a storage device and will not be useable for controlling space artifacts. In other cases, however, gadget 75 may have any functional subset of the gadget components described above with respect to FIG. 5 and may be used in various ways akin to those described above with respect to gadget 40 to control space affordances. Where gadget 75 includes a display screen, in at least some embodiments the undersurface opposite top surface 510 may include a flat panel touch sensitive display. Here, gadget 75 may be useable in a fashion similar to planar gadget 80 described above and shown in FIGS. 37 through 39.

Referring again to FIG. 41, in at least some embodiments gadget 75 may include inductive or some other type of charging coupler (e.g., an inductive antennae) 520 adjacent each of the indicia 100 through 106 and each of the gadgets that rest on surface 510 may similarly include an inductive or other type of coupler 522. Here, in some cases the couplers 520 and 522 may align automatically when a gadget is placed on surface 510 and battery charging may commence each time a gadget is properly placed on surface 510. Referring again to FIG. 2, in some cases a kit charging device or shelf 540 may be provided adjacent egress 58 or elsewhere in each enterprise space for receiving kits 34d, 34e, etc., when not in use. Here, shelf 540 may include an inductive charging antennae for charging a battery in gadget 75 which can in turn charge other kit gadgets or, the shelf inductive antennae may charge each of the gadget batteries directly (e.g., through an inductive coil in each separate gadget).

In at least some cases, when a kit is replaced on shelf 540 for charging, server 14 may determine if the kit is complete and may generate some type of notice when one or more kit gadgets is missing from the kit. Here, missing gadgets may be identified by simply using the known locations of gadgets in the large ambient space and determining if a full kit of gadgets has been moved to the shelf 540. In other cases a proximity sensor 542 mounted proximate shelf 540 may sense completeness of a recently placed kit. Missing gadgets may be indicated via an audible sound or message by speakers (e.g., 26*a*), via a light signalling device or via one of the space display screens (e.g., 20*a*).

In some cases gadget 75 may include sensors for sensing when all other kit gadgets have been replaced to storage positions. Here, if gadgets are missing near or at the end of a conference in an associated space, gadget 754 may transmit a signal to the system server causing the server to present a warning notice via one of the space display screens that one or more kits have not been reassembled for storage or the like. For instance, if the system server recognizes that four of six employees that were participating in a session have left an enterprise facility but that 2 other employee remain, the server may indicate "Kits not reassembled" to encourage the two remaining employees to account for all system gadgets and reassemble the kits prior to leaving the session space.

Referring again to FIGS. 1 and 2, in at least some cases more than one gadget kit (e.g., 34*a*, 34*b*, 34*c*, etc.) will be used in a space by different employees at a time. In this case, each gadget kit may work in a similar fashion so that any of the employees in the space can use any of the gadgets to control affordances that can be controlled by the specific type of gadget used. Thus, for instance, a first cone gadget 40 may be used by either of first or second employees in a space to perform any supported function. Where gadget functions are employee specific such as, for instance, where a gadget 40 can be used to access a personal queue, in at least some embodiments it is contemplated that ambient cameras or other sensing devices in the space may be used to track which employee is holding which gadget so that the employee specific queue or other functions can be performed by an employee regardless of which gadget the employee picks up. For example, in the case of a personal content queue, a first employee may be able to pick up either a first or a second cone gadget 40 and automatically access her personal queue via a queue accessing activity. Here, if a second employee were to pick up the first gadget 40 instead of the first employee, camera images or other sensed information may be used to automatically determine that the second employee activated the first gadget 40 and when the personal queue access activity is performed, the second employee's personal queue may be accessed.

In some cases it is contemplated that a group of employees may work on a project over an extended period of time (e.g., several months) during which periodic sequential project sessions occur. Here, where a project is ongoing, where a first employee's use of a gadget causes some customization of that gadget's operation during one session, that customized operation may persist during a subsequent session. For instance, if a first employee uses a cone gadget to create a personal queue during a first project session, if the first employee attends a second project session and uses any cone gadget during that session, the first employee's personal queue would be automatically associated with the cone gadget used during the second session. Thus, gadget attributes and features for specific employees may persist over time where consecutive sessions are related to the same project.

Where more than one gadget kit is located in a space, in at least some cases separate gadgets that were initially from different kits may be combined to assemble a complete kit. For instance, where first and second kits initially include first and second cone gadgets 40, respectively, when the kits are assembled thereafter, the first cone gadget may be included in the second kit and the second cone gadget in the first kit, without any affect on how the overall system operates moving forward.

Figure 43:
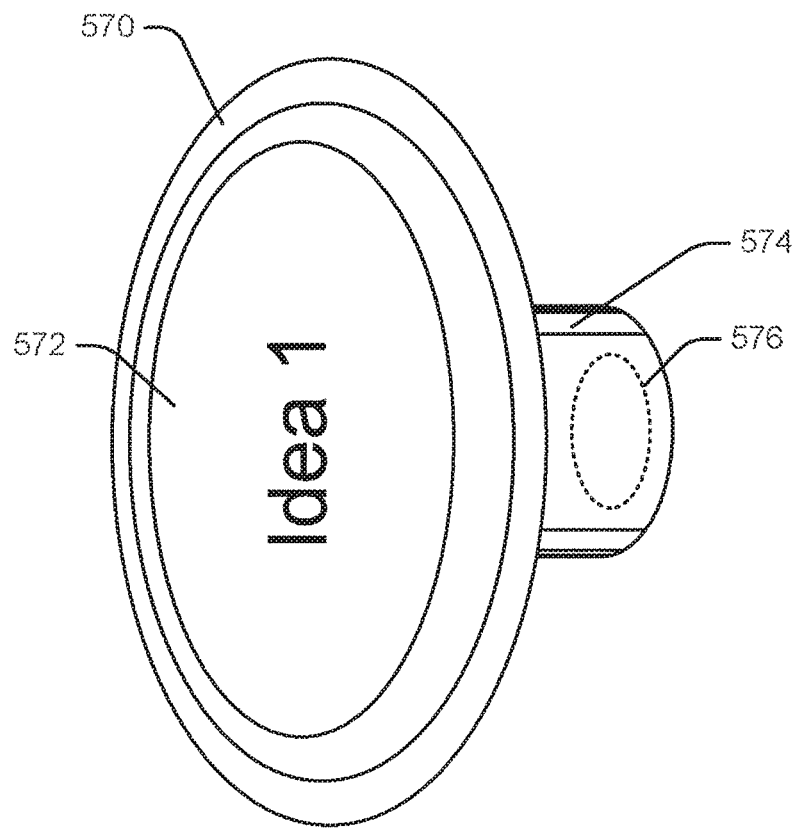
FIG. 43 shows a knob shaped gadget.

Still other gadget types having other features, characteristics and operating capabilities are contemplated. For instance, see exemplary knob gadget 570 shown in FIG. 43 that includes a reduced diameter post end 574 and a handle end 572. Knob gadget 570, like the other gadgets described above, may include any functional subset of the components described above with respect to FIG. 5 and may be used in a fashion similar to that described above with respect to gadget 40. In addition, gadget 570 may include some type of coupler 576 at its post end 574 that operates to couple the post end of gadget 570 to a display 20*a* (see again FIGS. 1 and 2) or other affordance (e.g., a whiteboard) when the post end contacts the display 20*a* or a surface of the other affordance. For instance, coupler 576 may include a magnet and displays 20*a*, 20*b*, etc., may include a layer of material to which a magnet is attracted (see also FIG. 44). Gadget 570 may be programmed to identify when coupled to a display and server 14 may be able to determine where the coupling occurs as well as which, in any, content is presented on the display when the coupling occurs. Other control movements or actions using gadget 570 may be detected and various other useful control processes may be performed.

For instance, in at least some cases it is contemplated that several knob gadgets 570 may be present in an enterprise space and each may be reserved for collecting data related to a specific concept or idea. Here, while each gadget 570 may have a similar shape and size, in at least some embodiments where different gadgets are reserved for different ideas, each gadget may be a different color or may otherwise be distinctly visually different so that employees using gadgets 570 can keep track of which gadget is associated with which idea.

Figure 44:
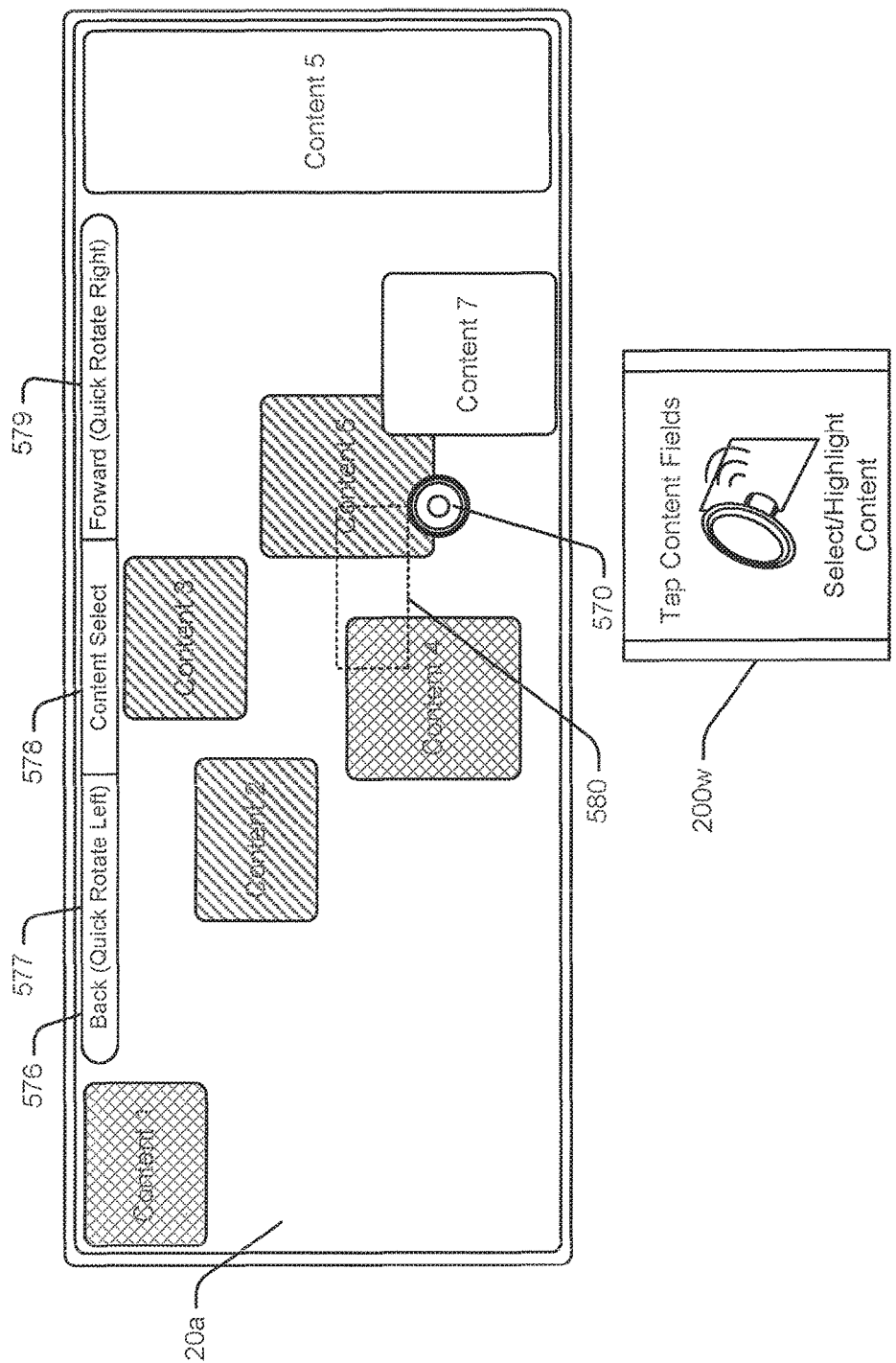
FIG. 44 shows one of the know gadgets of FIG. 43 in operation.

Referring still to FIG. 44, in at least some cases, an employee may be able to use gadget 570 to collect content related to a specific idea and to move that content about or store that content for subsequent access. In this regard, in some cases gadget 570 may be tappable on a display surface to select content on the display 20*a*. For instance, when gadget 570 is tapped at a specific location on display 20*a*, server 14 may attempt to identify a subset of the content on the display 20*a* as a likely subset that the employee is seeking to select and that content may be highlighted as indicated in field 200*w*. In other cases, an employee may place the post end 574 of gadget 570 at one location on the display and drag the post end to a different location to define and highlight a selection box or may use the post end to draw a border about a content subset to be selected.

In at least some cases it is contemplated that an employee may be able to select multiple content subsets using gadget 570 and then perform some function related thereto with a single action. For instance, in FIG. 44, Content 2, Content 3 and Content 6 are shown as left up to right cross hatched to indicate that each has been independently selected via gadget 570. In some cases, when one or more content objects have been selected on a display 20*a*, server 14 may be programmed to identify a main topic or several topics that two or more of the selected content objects have in common and may then search other non-selected content for other content objects that may be of interest to an employee given the common topics and may then highlight the other content objects identified differently to suggest those objects to the employee. In this regard see that Content 1 and Content 4 objects in FIG. 44 are visually distinguished with double diagonal cross hatching to indicate that those objects are being suggested for selection to an employee.

Figure 45:
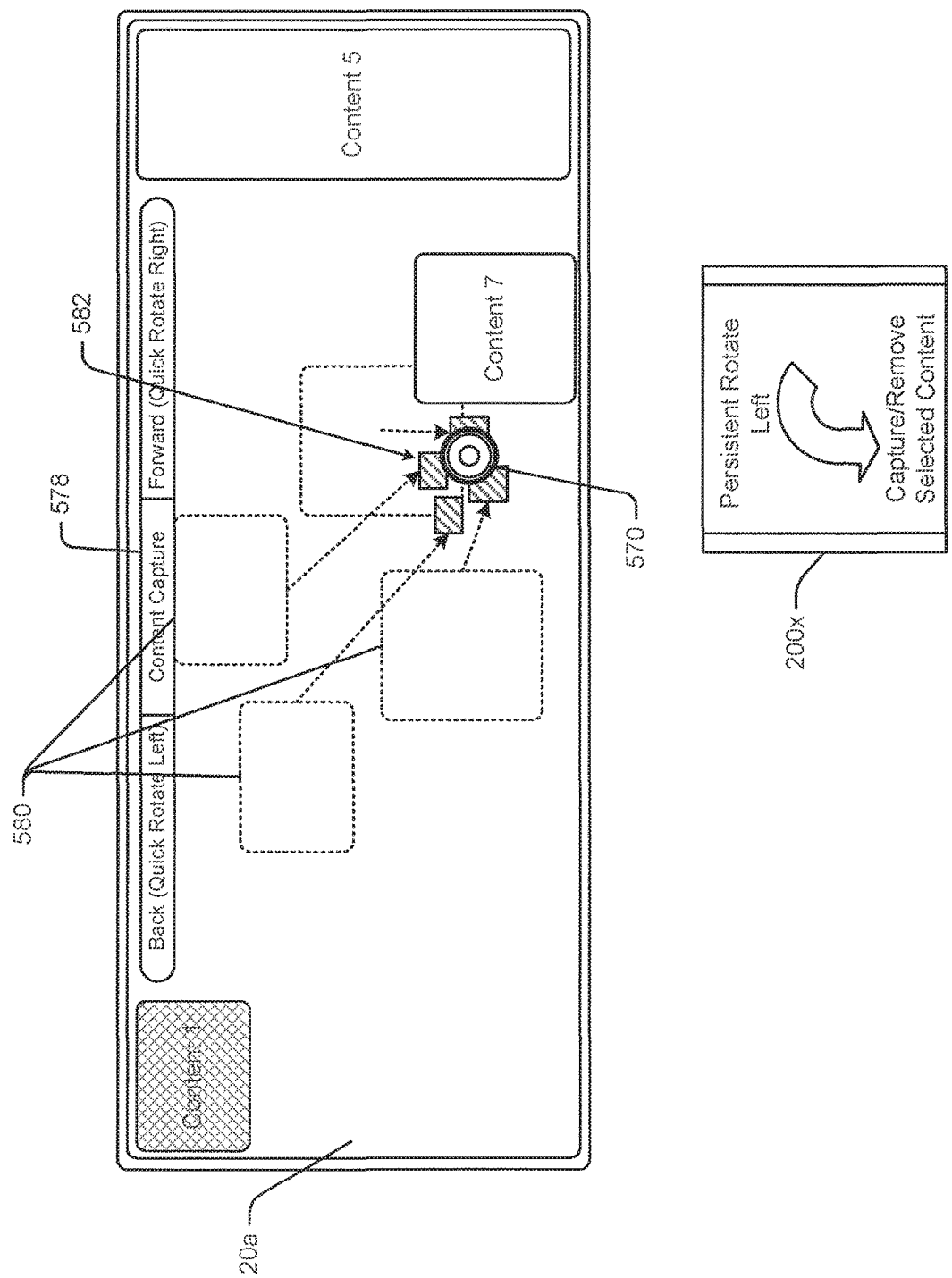
FIG. 45 is similar to FIG. 44, albeit showing a different set of actions and related effects.
Figure 46:
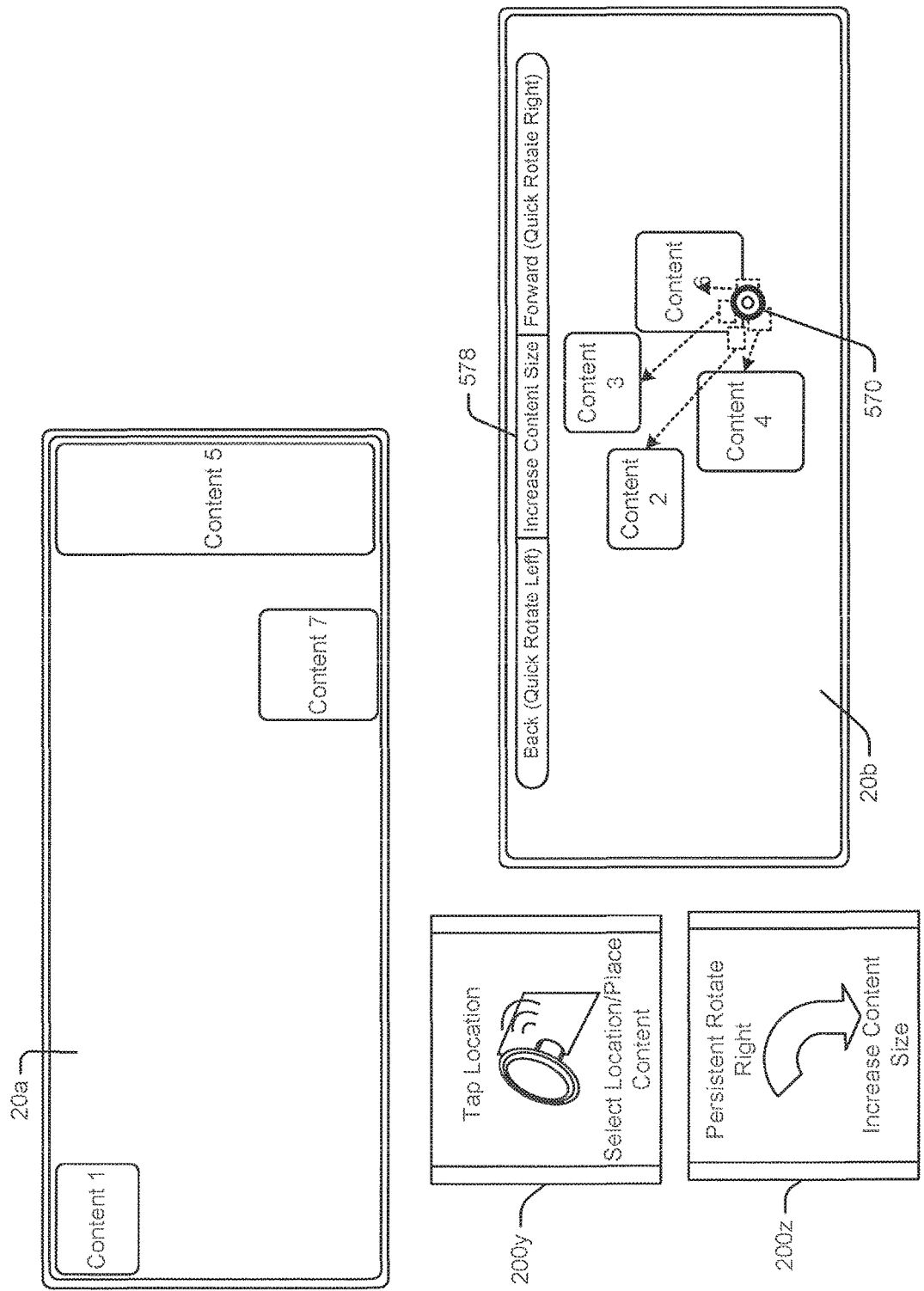
FIG. 46 is similar to FIG. 44, albeit showing a different set of actions and related effects.

Referring now to FIG. 45, with several of the content objects presented on the screen in FIG. 44 selected and highlighted to indicate their selected state, in some cases, gadget 570 may be rotated slowly (e.g., as opposed to a quick left rotate action) to the left to cause the selected content objects to be captured as indicated at field 200x and associated with gadget 570 and to remove those content objects from the display 20a (see display 20a in FIG. 46 where Content 2, Content 3, Content 4 and Content 6 have been removed). In at least some cases, as shown in FIG. 45, the content being captured from locations 580 may be shrunk down in an animated fashion to a smaller set of objects as shown at 582 that is centered on the location of gadget 570 on the display 20a during the rotate left action. By showing the content set shrinking toward gadget 200x, an intuitive association of the captured content to gadget 570 is created.

The employee using gadget 570 may continue the process of selecting content via gadget taps and capturing content via rotation left actions until all content related to a specific idea has been captured. Thereafter, gadget 570 may be placed anywhere in an enterprise space for short or long term storage. For instance, an employee may simple set gadget 570 on the top surface of a conference table for 10 minutes.

At some point, when an employee wants to access the content associated with the idea that is associated with gadget 570, the employee can pick up gadget 570 and use that gadget to access the content. For instance as shown by fields 200y and 200z in FIG. 46, gadget 570 can be tapped on a location on second display 20b to dump a small representation of the content associated with gadget 570 at the specific location and then gadget 570 can be rotated persistently right to dial up the size of the posted content.

In at least some cases it is contemplated that simple guidance or gadget control options may be presented to an employee via an ambient display 20a, 20b, etc., as the employee uses gadget 570 adjacent one of the displays. For instance, see again FIG. 44 where three exemplary guidance fields 577, 578 and 579 comprise a simple guidance toolbar 576. Exemplary toolbar 576 includes back and forward instructions 577 and 579, respectively, to guide a user on which gadget action will accomplish each of undoing and redoing most recent actions and undo commands, respectively. In addition, exemplary toolbar 576 includes a most recent command generated via gadget 570. For instance, in FIG. 44, the most recent command was a "Content Select" command which is indicated in field 578 while in FIG. 45 the most recent command in field 578 is a Content Capture command.

As shown, toolbar 576 may be persistently provided along the top edge of display 20a. In other cases, the toolbar may be presented generally in the vicinity of a gadget 570 when that gadget is used adjacent (e.g., to touch or proximate) a display screen. For instance, see the exemplary field 580 shown in phantom in FIG. 44 that is presented just above the location of gadget 570 which could be used to present the three fields 577, 578 and 579, albeit in a different format, to instruct a gadget user. Other instructions or information may be included in the toolbar 576 or field 580.

In at least some cases, even if toolbar is only presented at one location (e.g., the top edge as in FIG. 44) on a screen, the toolbar may not be persistent and instead may only be presented for a short time immediately after an employee uses a gadget 570 to generate an affordance control command. In other cases, the toolbar 576 may be presented whenever a gadget 570 is active and located at least some threshold distance away from a screen and a proximate toolbar (e.g,. see again phantom 580 in FIG. 44) may be presented instead whenever gadget 570 is proximate or contacts the front surface of the display or when the gadget 570 is used to contact and generate a command via some movement or action.

In some cases the gadget instructions may only be presented the first time a gadget is picked up during a specific session by any employee or the first time each employee picks up the gadget during a session but not other times. In some cases a system server may track historical use of gadgets by specific employees and may only present gadget instructions the first time an employee uses a gadget or each time an employee picks up the gadget until the employee performs some function to stop the automatic instruction presentation.

Figure 47:
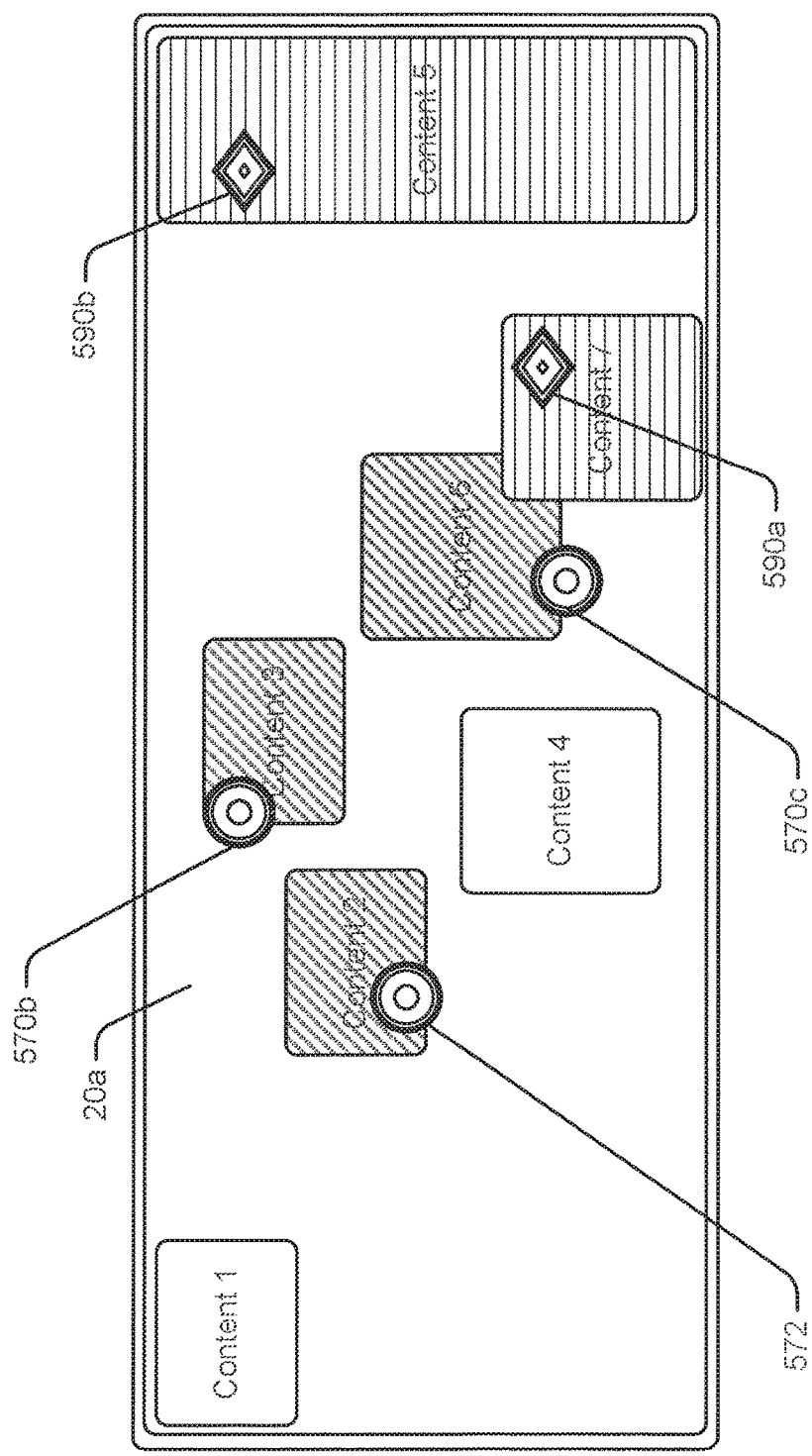
FIG. 47 is similar to FIG. 44, albeit showing a different set of actions and related effects.

In still other cases, gadget 570 and similar gadgets may be used together to perform some function or action. For instance, see FIG. 47 where three separate gadgets 570a, 570b and 570c are shown coupled (e.g., magnetically) to the front surface of display 20a. Here, it is contemplated that gadgets 570a through 570c may be used together to earmark content on display 20a and other area displays (e.g., 20b through 20d in FIG. 2) to associate the content together. As shown in FIG. 47, content tagged or earmarked via gadgets 570a through 570c is highlighted to indicate a current selection. Thus, multiple gadgets 570a through 570c can be used to associate different content objects. FIG. 47 shows two other gadgets 590a and 590b coupled to display 20a at other locations associated with Content 7 and Content 8 which are differently highlighted (e.g., horizontal cross hatching) to indicate association. As shown, gadgets 590a and 590b are visually distinguishable from gadgets 570a through 570c so that employee's can intuitively understand that different appearing gadgets operate to associate content with different content subsets. More specifically, gadgets 590a and 590b have diamond shaped handles while gadgets 570a through 570c include circular handles to indicate different associations.

Figure 48:
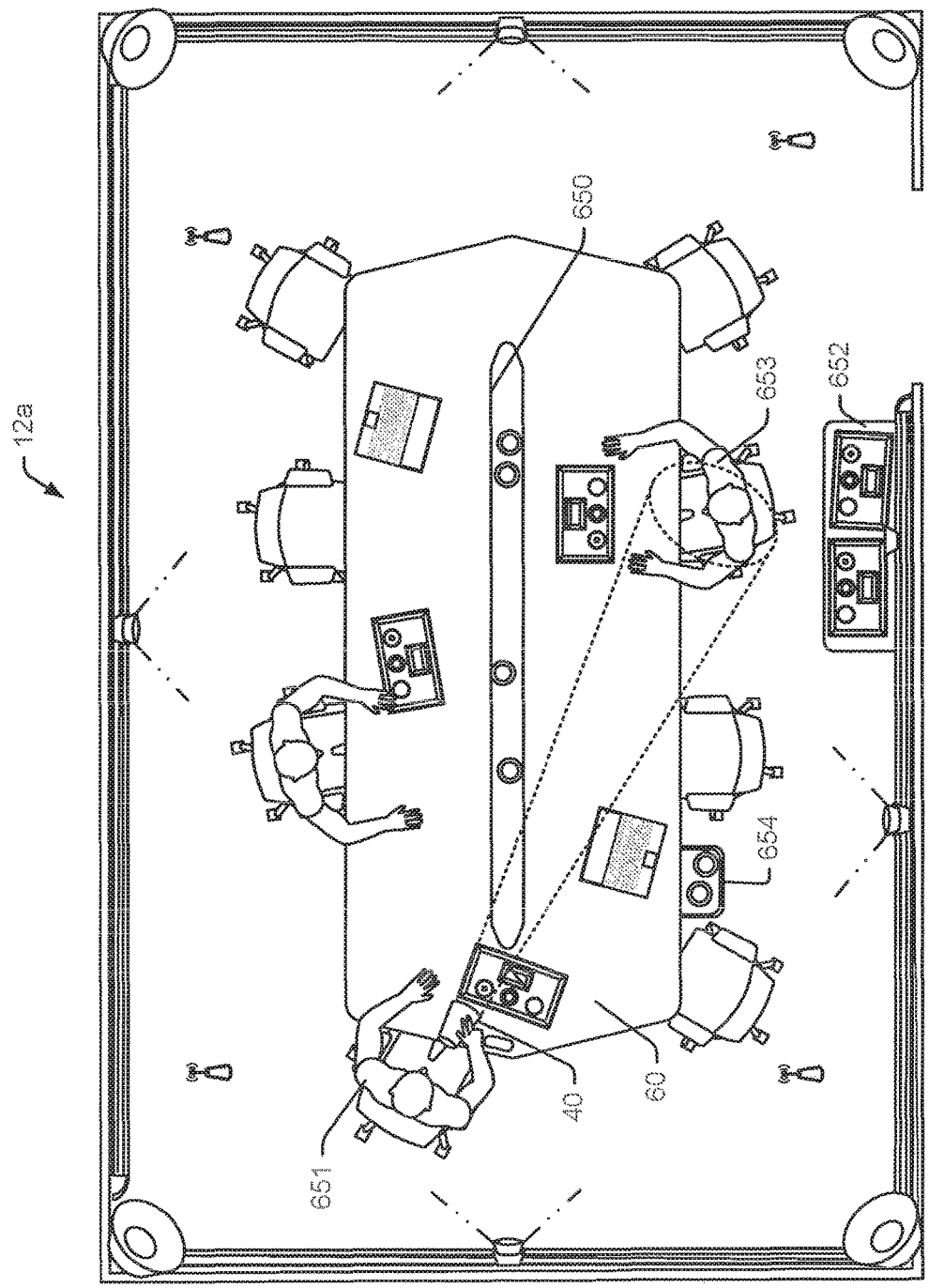
FIG. 48 is a top plan view similar to FIG. 2, albeit showing a different set of affordances and an employee targeting action.

In some cases each enterprise conference space may include one or a small set of storage locations for gadgets that employees would come to know well after using the disclosed system a small number of times. Here, each employee entering a space would know to look to the storage location to assess space capabilities. For instance, see FIG. 48 where a storage slot or recess 650 is provided along a central portion of a table top. Here, exemplary gadgets are shown in the storage recess which is easy for employees in the associated conference space to see. If one of the gadgets is a light control type and the other is a content control type, where the gadgets have a different appearance, a quick look into the storage recess enables any employee to assess space capabilities assuming the gadgets are in the recess. Similarly, shelf 652 may operate as a gadget storage location making it easy for employees to locate gadgets as well as to assess space capabilities. As yet one other example, one or more gadget storage drawers 654 may be mounted to the underside of the space table top. In any of these gadget storage cases, the storage affordance may including charging capabilities, kit component sensing capabilities, gadget organizing and accounting features (e.g., indicia indicating which gadgets are to be returned to the storage affordance) and signalling capabilities.

In some cases gadget control may be completely egalitarian in the sense that any employee can control affordances at any time regardless of who controlled the affordances most recently, assuming that two employees do not attempt to control the same affordance at the same time. Here, in at least some cases to indicate control an employee may be required to perform some function like, for instance, tapping a gadget on the top surface of a table top, selecting a button on the gadget, etc.

In addition to the ambient and content controlling gadgets described above, other gadget types are contemplated including but not limited to employee targeting gadgets, session type gadgets, persona gadgets, specific employee gadgets and facilitator gadgets, each of which will be described hereafter separately. In addition to content and ambient affordances in space, it has been recognized that employees in space are also a form of resource or affordance. In at least some embodiments an employee targeting affordance may be provided to enable one employee to obtain access to information about or associated with another employee in a manner similar to the processes described above. To this end, see again FIG. 48 where a first employee 651 is shown holding a cone gadget 40 up to target a second employee 653. Here, targeting occurs when the first employee observes the second through the gadget opening. Again, to actually select the second employee 653 as a target, the first employee may have to perform some specific gadget movement.

In this example, the location and orientation of gadget 40 may be determined in any of the ways described above. Again, once gadget location and orientation are determined, possible affordances including second employee 653 along the trajectory of the aiming end of gadget 40 may be identified by a system server. Here, it is presumed that the server already tracks identities of employees in the session space so that once an employee is targeted with a gadget, the identity of that employee is may already be known.

Figure 49:
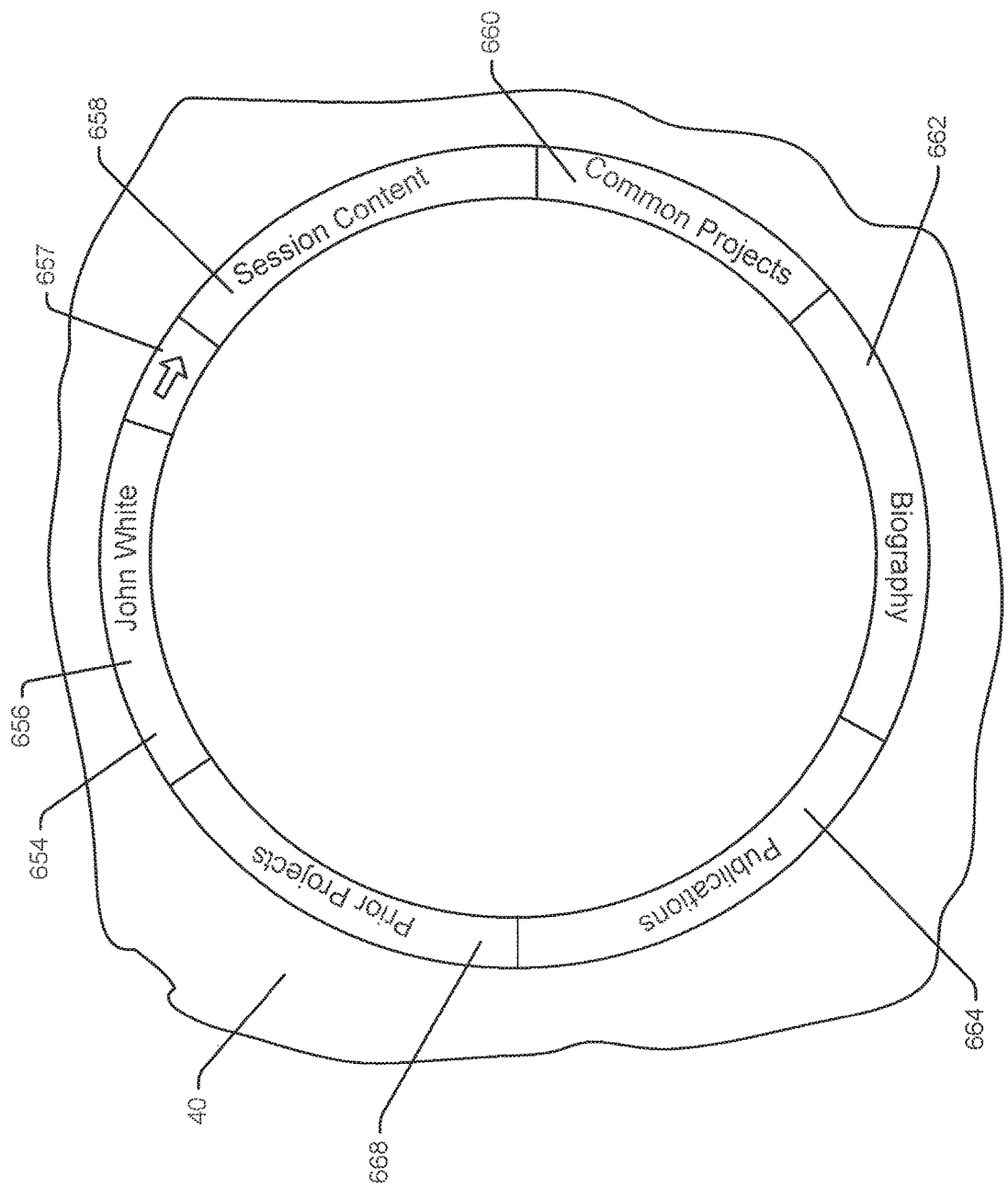
FIG. 49 is a gadget end view showing various options available to an employee after targeting another employee.

Referring also to FIG. 49, an end view of an exemplary employee target gadget 40 is shown which includes a circular emissive surface 654 that presents touch sensitive buttons or icons for selecting different types of information about a targeted employee. A first button includes the name of the targeted employee at 656. Here, where there are two or more employees in the general FOV of gadget 40, the gadget 40 may present each name as an option via screen 654 and wait for selection of one of the employee options prior to providing other information. In the alternative, a system server may identify a most likely target employee and place that name on button 656 and provide an arrow or options button as at 657 for scrolling through other possible employee options given possible target options identified.

Referring still to FIG. 49, the other touch selectable options presented include a session content button 658, a common projects button 660, a biography button 662, a publications button 664 and a prior projects button 668, each of which is selectable to access a different information type about the employee indicated via button 656. Selection of session content button 658 causes gadget 40 to render all content associated with a specific session and that was generated by the targeted employee to be accessible in some fashion. For instance, in some cases a list of session content may be presented via one of the larger inner or outer emissive surfaces of gadget. In other cases a first instance of session content generated by the employee may be presented along with some type of scrolling tool for accessing a second, a third and so on.

Referring to FIG. 49, selection of common projects button 660 causes gadget 40 to render a list of prior projects that the employee using gadget 40 and the targeted employee worked on. For instance, where the two employees worked together on dozens of prior projects over a several year period and the employee using gadget 40 has a recollection of some product from one of the prior projects that may be of interest in the current session but cannot remember the specific prior project, the list may trigger a stronger memory. In addition, in at least some cases, once a prior project list is presented, a system server may enable selection of one of the list projects to access work product associated with the selection and to be shared via the space affordances in a conference space.

Selection of biography icon 662 causes gadget 40 to render biographical information associated with a targeted employee accessible. For instance, this information may include job title, years of employment, contact information, interests, education, prior employment information, etc. Selection of publications button 664 causes gadget 40 to present a list of prior publications associated with the targeted employee. Again, where a list is presented, in at least some embodiments an employee may be able to select any list option to access the content associated with the selected option via one of the larger emissive surfaces that forms part of device 49. Selection of prior projects button 668 presents a list of the targeted employee's most recent projects where each list option may be further selected to access project content associated with the selection.

While content may, in at least some embodiments, be presented via gadget display screens or emissive surfaces as discussed above, in other cases content may be rendered accessible via an emissive surface presented by some other device that is associated an employee using the gadget. Thus, for instance, referring to FIG. 50, where an employee 663 uses a portable personal computing device 661 such as a tablet, a smart phone, etc., that can be associated with the specific employee 663, when that employee uses a gadget 40 to target another employee 665, information related to the other employee 665 may be presented to the first employee 663 via a display screen 667 of the portable device. Here, employee 663 would already be associated with device 661 and, once a system server determines that employee 663 has picked up gadget 40 and associated employee 663 with that gadget, any additional information to be presented to employee 663 because of activities with gadget 40 may be presented via display 667. The exemplary employee information on display 667 is consistent with the information presented via device 40 in FIG. 49 and includes a targeted employee's name as well as content selection buttons 669, 671, 673, 675 and 677 with the same labels shown in FIG. 49. In addition, an exit icon 679 is presented via display 667. Here, in at least some cases the targeted employee information shown would persist even after gadget 40 is no longer targeting employee 665 and until the exit button 679 is selected. In this way gadget 40 can be used to target another employee quickly and then content related thereto may be persistently viewed and accessed via device 661 without requiring continued targeting.

Figure 50:
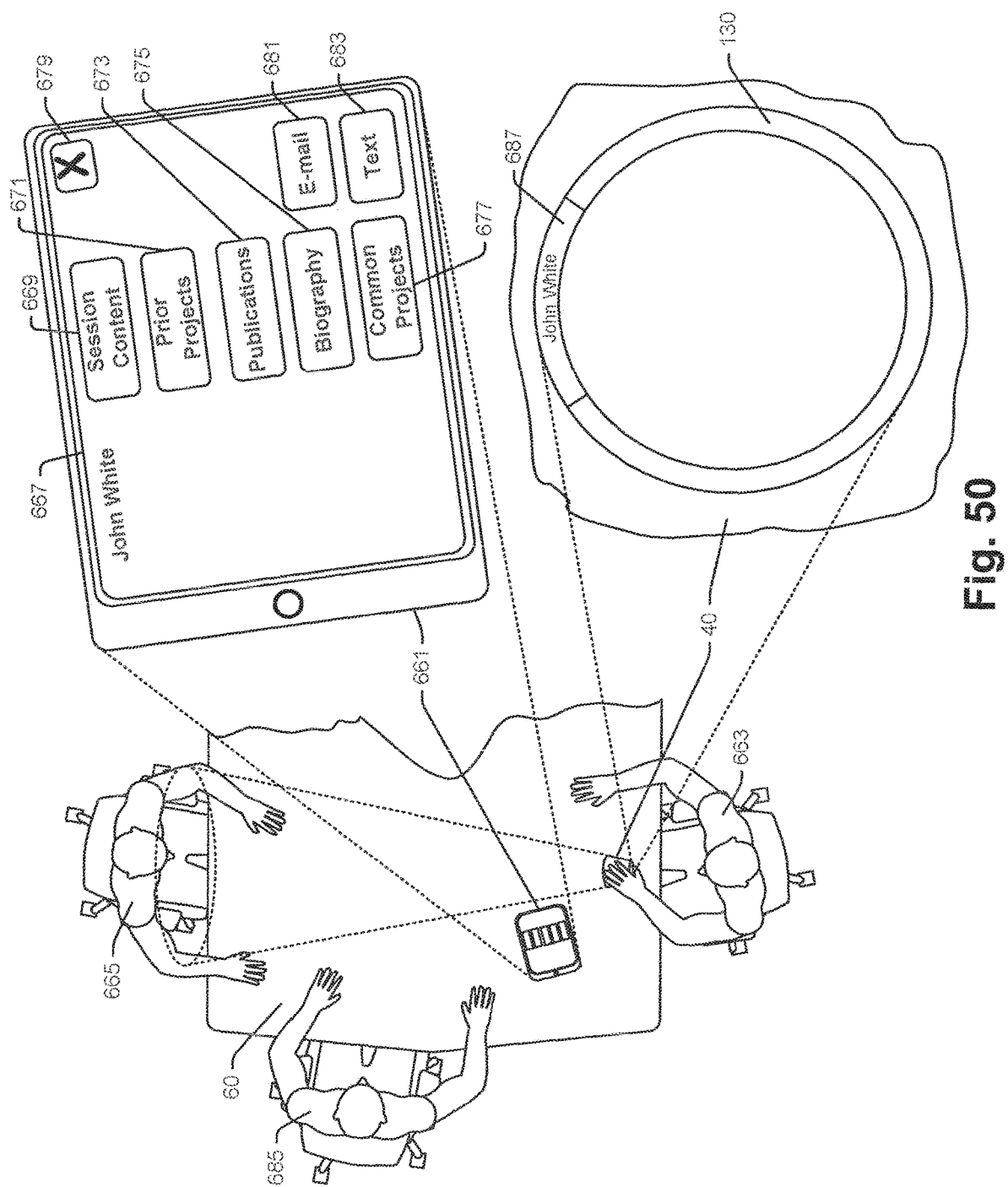
FIG. 50 is a schematic illustrating another system wherein a gadget is paired through a using employee with a personal portable tablet device so that the gadget and device operate together to provide various control features.

Referring still to FIG. 50, in addition to presenting the buttons 669 through 677 as shown, other options such as an e-mail option button 681, a text option button 683, etc., may be presented via display 667. Here, by selecting one of the communication buttons 681, 683, etc., the employee using device 661 can automatically address an e-mail, text, or other communication type to a targeted employee without actually knowing or looking up the targeted employee's contact information. The simple act of aiming gadget 40 at the target employee causes the address information to be accessed. Again, here, it is assumed that a system server is already tracking the locations of employees in facility space and in particular the locations of employees 663 and 665 so that employee 663 can be associated with device 661 and employee 665 can be recognized as the employee targeted via gadget 40.

While simply aiming gadget 40 at employee 665 may automatically cause employee information to be presented via device 661 (or even via gadget 40 as shown in FIG. 49 for that matter), some selection event or trigger may be required to select the targeted employee prior to presenting related information. For instance, while aiming at employee 665, selection to confirm intent to target may require a quick rotate left of gadget 40 after which targeted employee information is accessed and presented. In other embodiments device 661 may be persistently asociated with the most recently targeted affordance (e.g., employee) in a space until some disassociation action (e.g., targeting a different affordance, selection of an exit button (see 679 in FIG. 50)) occurs.

In FIG. 50, in at least some embodiments if employee 663 pans gadget over from the illustrated orientation targeting employee 665 to a different orientation targeting employee 685, the presented content on display 667 may be automatically changed without any other action (e.g., a selection action) to correspond with employee 685. Then, if gadget 40 is moved to a different orientation that does not target employee 685, the employee information may be removed from display 667. In contrast, if, while targeting employee 685, gadget 40 is moved (e.g., quick left rotate) to select, the content on display 667 would persist again until exit button 679 is selected. Thus, prior to selection, the content on display 667 operates as feedback to enable an employee to target a specific other employee prior to selection and may persist after a specific other employee is selected.

In still other embodiments where an employee uses a personal portable computing device like device 661 in addition to a gadget 40, gadget 40 may provide a reduced set of useful information while more detailed information is presented via device 661 when needed or preferred. For instance, see again FIG. 50 where a small edge display 687 on an end 130 of gadget 40 presents a minimal set of information (e.g., the employee's name) regarding a targeted employee that is useful for hunting for a target and where device 661 presented a larger set of information related to the target employee.

Thus, referring yet again to FIG. 50 and also to FIG. 1, initially it is assumed that system server 14 has access to a database 16 that stores employee identification information correlated with employee personal device information that associates each employee with one or more specific portable personal devices 661 used by that employee. In addition it is assumed that server 14 uses signals from various sensing devices (e.g., cameras, tag or ID readers, proximity sensors, etc., to track the locations in enterprise facility spaces of each employee 663, 665, 685 and can also detect when gadget 40 is grasped and moved as well as calculate the specific location and orientation of gadget 40 in facility space. When gadget 40 is picked up to be used, because server 14 knows the locations of employee's in space as well as the location of gadget 40, server 14 can determine which employee picked up gadget 40 and therefore can associate gadget 40 with the employee that picked the gadget up. In addition, in FIG. 50, once gadget 40 is associated with specific employee 663, because device 661 is already specifically associated with employee 663 in the database 16, server 14 can associate gadget 40 with device 661 so device 661 can operate as an output and an input device in cooperation with gadget 40.

As gadget 40 is moved about in space, because server 14 knows that location and orientation of gadget 40 in space, server 14 can calculate the trajectory along which gadget 40 is aimed. Because server 14 knows the locations of employees in space, server 14 can identify an employee currently within the field of view or otherwise targeted via gadget 40. When server 14 determines that gadget 40 is targeting a specific employee, server 14 accesses information for that employee and presents information subsets via gadget 40 and device 661. In the present example, employee hinting information like name (see again 687 in FIG. 50) is presented via gadget 40 while more detailed information is presented via portable device display 667. As gadget 40 is panned about from one employee to another, the information presented via gadget 40 and device 661 changes to reflect the instantaneously targeted employee until a selection action occurs. Once a selection action occurs the information presented via gadget 40 and device 661 persists until exit icon 679 is selected. Here, in the context of device 661 "persists" means that device 661 remains associated with the previously targeted employee so that information related to that employee can be accessed until exit button 679 is selected.

While device 661 and gadget 40 may be disassociated with a targeted employee via button 679 selection, in other cases disassociation may occur in other ways. For instance, after device 661 is associated with a targeted employee, if gadget 40 is set down, the next time gadget 40 is picked up by the employee associated with device 661, device 661 may become disassociated with the previously targeted employee. As another instance, in cases where there are several gadgets 40 that can be used in a space, when the employee 663 associated with device 661 picks up any one of the gadgets 40, device 661 may be disassociated with the previously targeted employee. As yet one more instance, some gadget action by the employee associated with device 661 may cause disassociation. For instance, employee 663 may pick up gadget 40 (or any gadget 40 where there are several in a space) and shake the gadget 2 times to cause device 661 and target employee disassociation.

Here, it is contemplated that only an employee 663 associated with device 661 may use a gadget 40 to disassociate device 661 from a previously targeted employee. For instance, assume that employee 663 used gadget 40 to associate employee 665 with device 661 to access information related to employee 665 on display 667. Here, if third employee 685 picks up gadget 40 to perform some aiming or control function, his shaking of gadget 40 would not disassociate employee 665 from device 661. Instead, employee 685 could use gadget 40 to perform any system supported function as described in this disclosure. Then, if employee 685 sets gadget 40 on table 60 and employee 663 picks up gadget 40 and performs a disassociating action (e.g., shaking twice) there with, employee 665 would be disassociated from device 661.

Referring yet again to FIG. 50, while gadget 40 and device 661 are described above in the content of a system for targeting employees in space, the gadget 40 and device 661 combination may be used in a similar fashion to target and obtain information related to any of the affordances described herein. For instance, device 40 may be used to target a ceiling light fixture. In this case, the word "Light" may appear at 687 in FIG. 50 instead of the employee's name and light condition information (e.g., current intensity, current color setting, etc.) along with a control interface may be presented via device 661. As another instance, device may be used to target a speaker in space and different subsets of information (e.g., hunting and a more detailed set) related thereto may be presented via gadget 40 and device 661.

Referring again to FIG. 37, where a kit includes a planar gadget 80 that includes a display screen 390, gadget 80 may be used in conjunction with other targeting gadgets in a fashion similar to that described above with respect to the tabelt device 661 in FIG. 50. Thus, planar gadget 80 may take the place of device 661 in any of the embodiments contemplated with respect to FIG. 50.

In at least some embodiments it is contemplated that the top surface of a table in a conference space may be completely emissive or, at least, may include emissive sections located at one or more positions about the table top that may be occupied by employees. To this end, U.S. patent application Ser. No. 14/500,155 which was filed on Sep. 29, 2014 and is titled "Emissive Surfaces And Workspaces Method And Apparatus" describes embodiments where a server uses information from various sensors to determine employee locations proximate an emissive table top and automatically presents desktops or sections of the table top for use as interface surfaces to proximate employees. U.S. patent application Ser. No. 14/159,589 which was filed on Jan. 21, 2014 which is titled "Emissive Shapes And Control Systems" includes similar teachings. Each of these applications is incorporated herein in its entirety by reference. Where an emissive table top surface is controlled to present sections for use by employees during a session, the features described with respect to FIG. 50 related to device 661 above may be implemented with a portion of the table top taking the place of the portable personal device 661.

Figure 51:
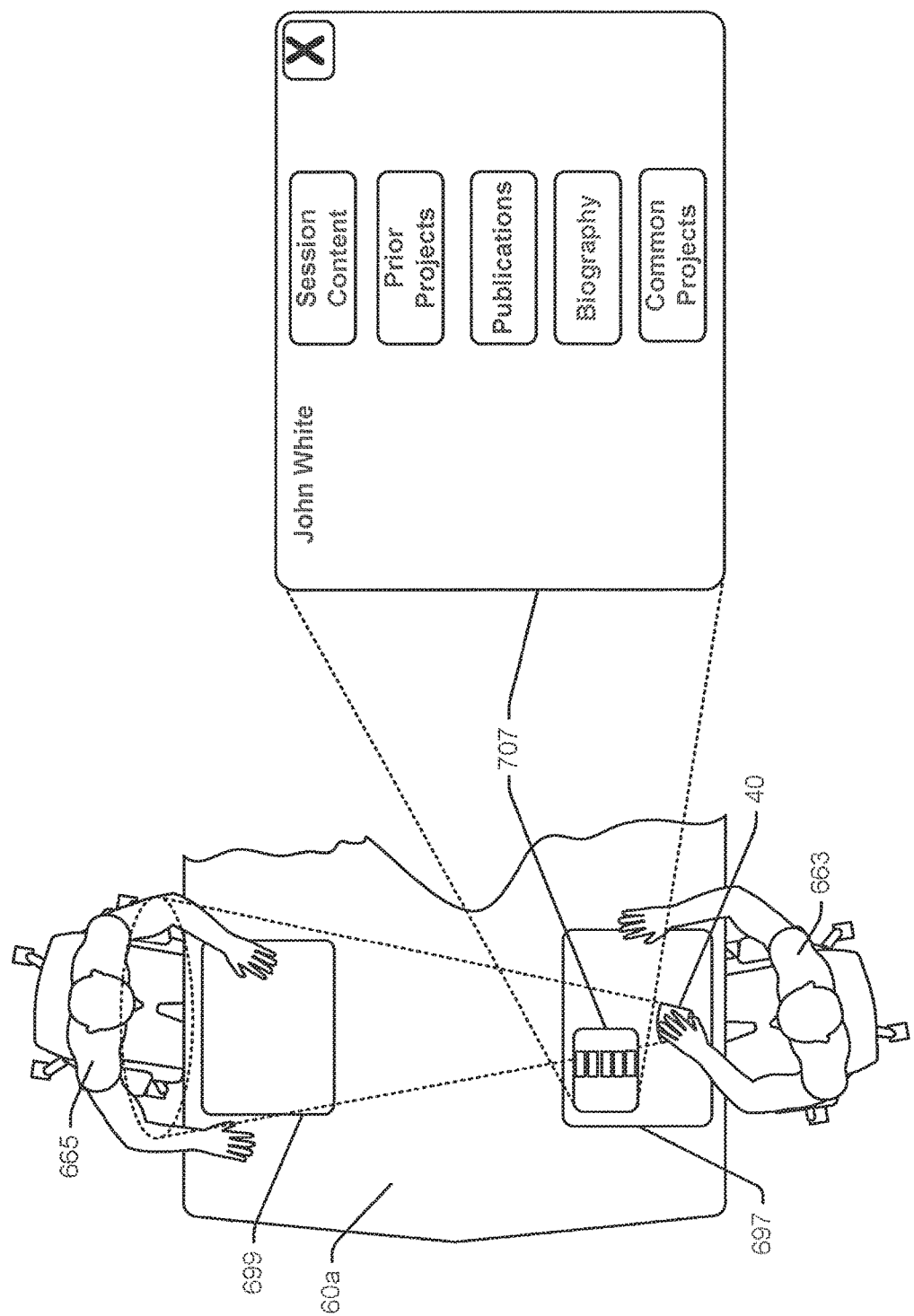
FIG. 51 is similar to FIG. 50, albeit where a gadget is paired through a use with a section of an emissive table top surface that provides an interface window for use by the employee.

Referring now to FIG. 51, an exemplary embodiment where a top surface of table top 60*a* is emissive is illustrated. Here, a system server 14 tracking employee locations in facility space, recognizes when an employee is proximate an edge of table top 60*a* and may either automatically present an interface window to each proximate employee or enable the employee to have a window opened up and associated with the employee. Exemplary interface windows for employees 663 and 665 are shown at 697 and 699, respectively, in FIG. 51.

Referring still to FIG. 51, in this case, when employee 663 grasps gadget 40 and uses that gadget to target an affordance in space, a targeting sub-window (hereinafter referred to as a window) 707 may be automatically opened within window 697 to present information related to an instantaneously targeted affordance. In FIG. 51, gadget 40 is shown targeting employee 665 and therefore content related to employee 665 is presented in window 707. The presented information in window 707 is akin to the information described above with repsect to FIG. 50. Again, once the employee 663 performs some selection action, It has been recognized that content and other information is optimally arranged differently within a conference space depending on the type of activity being performed during a session or at different times during a session. For instance, during a leader based presentation, primary content is typically presented near one end of a conference space proximate the lead employee running the meeting. In contrast, during a multi-employee content generation or brain storming session, content may be located on every emissive surface within a conference space and freely moved about, amended, annotated, replaced, etc., by any present employee in that space. As another instance, where a session has four distinct sub-sessions or periods during which different types of work occur, it may be that the same content is optimally arranged within a session space differently for each one of the sub-sessions. For instance, during a first sub-session main session topics to cover may be developed and therefore presented on a central emissive surface. During a second sub-session, the topic list may optimally be posted on a lateral or side emissive surface and a first topic on the list may be presented on the central emissive surface. U.S. patent application Ser. No. 14/499,950 which was filed on Sep. 29, 2014 and which is titled "Conference Facilitation Method And Apparatus" described several different exemplary session activity types and is incorporated herein in its entirety by reference.

In addition to arranging content differently to facilitate different session activity types, other aspects of space affordances may be modified or set depending on the type of activity performed in a space. For instance, during a leader based presentation content control gadgets as described above may only be enabled for a single presentation leader and may not function for content control for other employees in a space. In contrast, during an egalitarian content generation type session, content control gadgets may be enabled for use by all employees in a space. Many other affordance aspects or settings may be changed to optimize for different types of space activities. Hereinafter, unless indicated otherwise and in the interest of simplifying this explanation, all affordance settings optimized for a specific space activity or session type will be referred to as the "feature combination" for an associated session type. Thus, different feature combinations will be specified for each different session type.

In at least some embodiments it is contemplated that session type gadgets may be useable to select different session types at any time during a session to cause a system server to set session type specific feature combinations (e.g., arrangement of emissive surface content, gadget control capabilities, etc.). To this end, see for instance FIG. 52 where an exemplary session type gadget set is shown in dashed box 710. The set 710 includes several different types of session type gadgets including a rejuvenation gadget 710*a*, a generation gadget 710*b*, a presentation gadget 710*c*, a collaboration gadget 710*d* and an evaluation gadget 710*e*. The set further includes two other instances of collaboration and presentation gadgets 710*d'* and 710*e'* to show that more than one instance of any gadget type may be available for convenience and use by more than one employee at a time.

Figure 52:
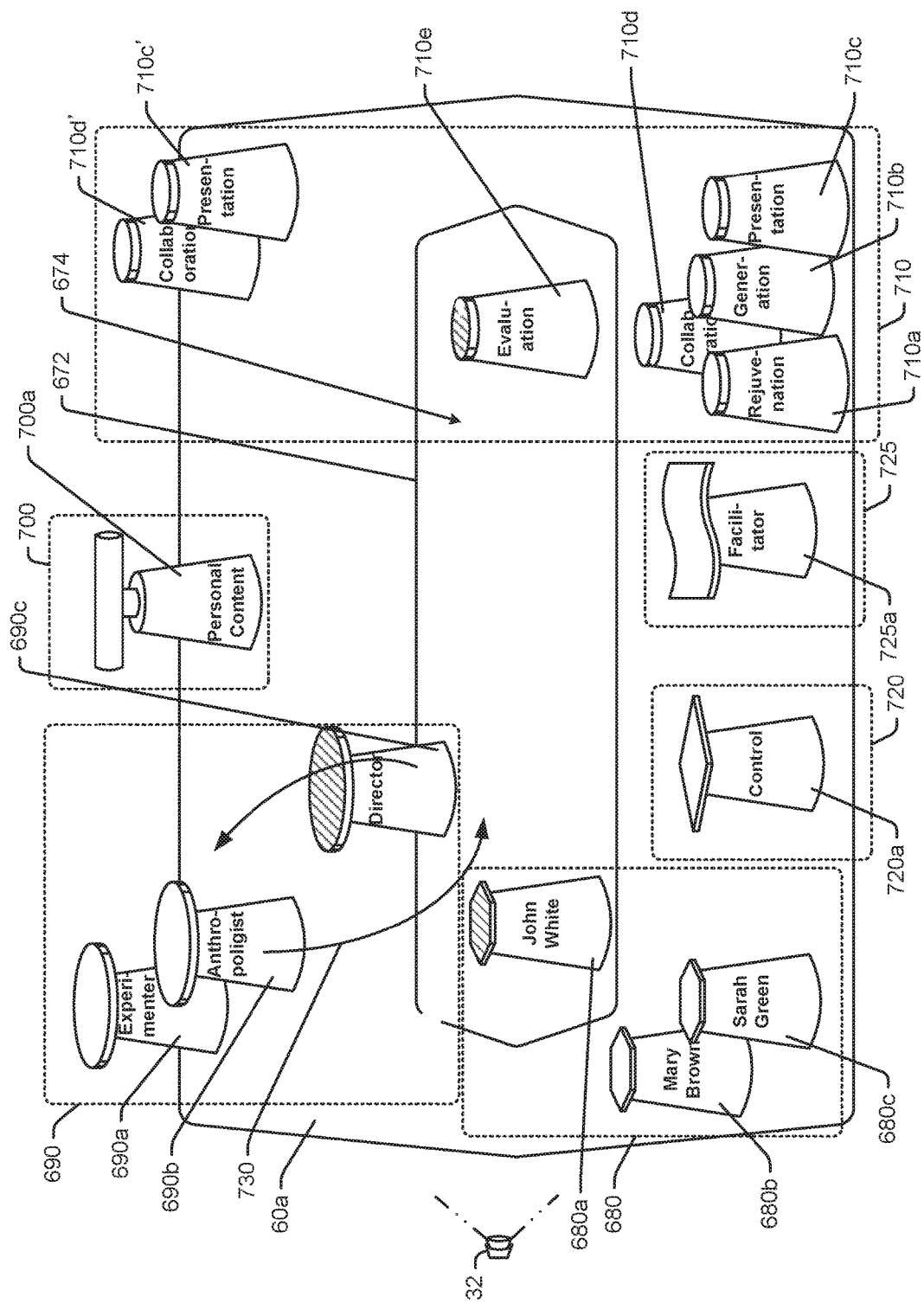
FIG. 52 is a schematic view illustrating a table top with several different sets of different types of gadgets.

Also shown in FIG. 52 is indicia 672 that is presented on a top surface of a table top 60*b* to distinguish an "in-play" area 674 located centrally on the table top surface from peripheral areas of the surface. The indicia 672 can take many different forms including paint, print, a rib or some other form of mechanical marking. Here it is contemplated that the system will have sensors which are represented by camera 32 generally for sensing the locations of all gadgets in a session space and more specifically to detect whether or not a gadget is located within the in-play area 674 of the table top. Other sensor types may include sensors within the table top itself to sense gadget proximity to area 674.

Referring still to FIG. 52, in at least some embodiments when a session type gadget is moved into area 674 as is gadget 710*e*, gadget presence in area 674 is sensed and used to generate a control command causing server 14 to change the feature combination of space affordances to optimize for the session type associated with the gadget 710e. Thus, prior to moving gadget 710e into area 674 content may be presented in one way on emissive surfaces in a space and content gadgets may operate in one way and after gadget 710e is sensed in area 674, the content may be rearranged and the gadgets differently enabled to facilitate an evaluative activity in the space. If gadget 710e were removed from area 674 and gadget 710c were moved into area 674 instead, the content layout and gadget functionality may again be changed to reflect optimized settings for a presentation activity in the space.

Where one gadget 710e is located in area 674 when a second (e.g., 710c) is moved into that area, in at least some embodiments the feature combination may not change until the initial controlling gadget 710e is removed. As an alternative, when gadget 710c is moved into area 674 while an initial gadget 710e still remains in that area, the most recently added gadget 710c may control.

In at least some embodiments each session type gadget may include a signalling device to indicate when the gadget is active and controlling the feature combination. For instance, in FIG. 52 each gadget in set 710 may include a light device in a top portion thereof that is illuminated to indicate control when an associated gadget is in area 674. In FIG. 52, a top surface of gadget 710e is shown cross hatched to indicate illumination while other gadgets in set 710 are shown not illuminated to indicate that none of those gadgets is controlling the feature combination. Thus, in a case where two or more gadgets from set 710 are simultaneously located in area 674 but only one controls, the controlling gadget would be illuminated while the others in area 674 would not.

It has further been recognized that different employees have different skill sets and perspectives and that, generally, employees can be grouped into a small number of different categories or persona types based on their skills/perspectives. U.S. patent application Ser. No. 14/499,950 which has already been incorporated by reference in its entirety above describes a system where, when a specific valuable perspective is not represented at a session, artificial intelligence can be used to present the missing perspective via content presented on display screens or in some other fashion.

It has been known for a long time that different people have different strengths and weaknesses when it comes to collaborating with others. For instance, some innovation experts classify conferees in groups into different categories based on strengths and perceived weaknesses. Ten exemplary categories include an anthropologist, an experimenter, a cross-pollinator, a hurdler, a collaborator, a director, an experience architect, a set designer, a storyteller and a caregiver. A person classified as an anthropologist is a person who ventures into the field to observe how people interact with products, services, and experiences in order to come up with new innovations. Often times these persons are extremely good at reframing problems in new ways and usually share such distinguishing characteristics as the wisdom to observe with an open mind, empathy, intuition; the ability to "see" things that have gone unnoticed; and a tendency to keep running lists of innovative concepts worth emulating and problems that need solving. An experimenter celebrates the process, not the tool, testing and retesting potential scenarios to make ideas tangible. A calculated risk-taker, an experimenter models everything in order to efficiently reach a solution. A cross-pollinator draws associations and connections between seemingly unrelated ideas or concepts to break new ground. Armed with a wide set of interests, an avid curiosity, and an aptitude for learning and teaching, a cross-pollinator brings in big ideas from the outside world to enliven their organization.

A hurdler is a tireless problem-solver who gets a charge out of tackling something that's never been done before. When confronted with a challenge, a hurdler gracefully sidesteps the obstacle while maintaining a quiet, positive determination. A collaborator is the rare person who truly values the team over the individual. In the interest of getting things done, the collaborator coaxes people out of their work silos to form multidisciplinary teams. More of a coach than a boss, a collaborator instills their team with the confidence and skills needed to complete the shared journey. A director has an acute understanding of the bigger picture, with a firm grasp on the pulse of their organization. Subsequently, a director is talented at setting the stage, targeting opportunities, bringing out the best in their players, and getting things done.

An experience architect is a person relentlessly focused on creating remarkable individual experiences. This person facilitates positive encounters with your organization through products, services, digital interactions, spaces, or events. An experience architect maps out how to turn something ordinary into something distinctive every chance they get. A set designer looks at every day as a chance to liven up their workspace. They promote energetic, inspired cultures by creating work environments that celebrate the individual and stimulate creativity. To keep up with shifting needs and foster continuous innovation, a set designer makes adjustments to a physical space to balance private and collaborative work opportunities. In doing so, this person makes space itself one of an organization's most versatile and powerful tools. A storyteller captures our imagination with compelling narratives of initiative, hard work, and innovation. This person goes beyond oral tradition to work in whatever medium best fits their skills and message: video, narrative, animation, even comic strips. A caregiver is the foundation of human-powered innovation. Through empathy, they work to understand each individual customer and create a relationship.

While some people have characteristics that are a blend of some of the above, most people have a prominent persona that can be perceived as the person works with others during a collaboration session.

In at least some embodiments of the present disclosure it is contemplated that one or a set of different persona gadgets may be provided in a facility space that can be used to control automated virtual perspectives in a session. To this end, see the exemplary persona set of gadgets in box 690 that includes an experimenter gadget 690a, an anthropologist gadget 690b and a director gadget 690c that represent three different personas. Here, as in the case of the session type gadgets in set 710, the gadgets in set 690 may be moved in and out of area 674 to add a persona perspective to presented content and to take that persona away. Again, each of the gadgets in set 690 may include a light device that is illuminated when a gadget is controlling or affecting presented content. Thus, for instance, the top surface of gadget 690c is shown cross hatched to indicate that that gaddget is controlling while the other gadgets in set 690 are shown not illuminated.

In the case of persona gadgets, it is possible to represent two or more different virtual personas in a space and therefore two or more gadgets from set 690 may be located in area 674 and simultaneously controlling. For instance, if both gadgets 690a and 690c were located in area 674, both an experimenters perspective and a directors perspective would be reflected or represented in the content presented in an associated space.

In addition to representing different personas virtually as described above, in some embodiments perspectives of specific people may be represented by specific gadgets so that, if specific employees are missing from a session, their perspective can be presented to at least some degree. To this end, see again FIG. 52 where an employee specific gadget set is shown in box 680 including separate gadgets 680*a*, 680*b* and 680*c* corresponding to specific employees John White, Mary Brown and Sarah Green, respectively. Here it is contemplated that personas or perspectives for each John White, Mary Brown and Sarah Green may be developed by server 14 or some other server using electronic content associated with each (e.g., prior projects, prior documents or publications, job titles, etc.). Again, when one of gadgets from set 680 is moved into area 674, the perspective of the associated employee may be presented via emissive surfaces in an associated space.

In some embodiments yet another gadget type may include one or more personal content gadgets as show in set 700 which includes gadget 700*a*. Here, where an employee has specific content to share with others, the employee may move her gadget 700*a* into area 674 to add that content to content already presented on emissive surfaces in space or to replace that content or supplement that content with her personal content. Here the supplementing personal content may, in some cases, include all personal content and therefore operate as a sort of employee specific gadget (like the gadgets in set 680) for the employee using gadget 700*a*. In other cases, a personal content gadget 700*a* may be associated with specific content like a desktop image or the like instantaneously presented via a personal portable device (see again 661 in FIG. 50) or via a virtual interface (see 697 in FIG. 51) presented on an emissive surface table top. Thus, for instance, assume that the employee 663 in FIG. 51 has a first document opened up in interface window 697 and moves her personal content gadget 700*a* into area 674, here, it may be that only the first document is replicated on the common emissive surfaces in a space.

Here, in at least some cases moving gadget 700*a* from area 674 may cause the personally posted content to be removed from the common surfaces. In other cases posted personal content may persist in on the common surfaces even if gadget 700*a* is removed from area 674. Like the other gadgets described with respect to FIG. 52, gadgets in set 700 may include light devices to indicate when a spevific gadget is controlling or active.

One other gadget type contemplated is a control gadget type as indicated y set 720 including gadget 720*a* in FIG. 52. Here, a control gadget is a gadget that enables an employee to take control of at least some aspect of a session in an associated space. For instance, where only one employee can control content gadgets at a time, control gadgets 720*a* may be used to take control from a currently controlling employee. For instance, where a first employee is currently presenting content to other employees in a space, a second employee may be able to move a control gadget 720*a* into area 674 to assume control from the first employee. Here, a first control gadget in area 674 associated with the first employee may initially be illuminated indicating that the first employee is presenting and then, when the second employee moves a second control gadget into area 674, the second gadget may be illuminated to indicate that the second employee took control and the first control gadget light may be turned off.

One other type of gadget shown in FIG. 52 is a facilitator type gadget represented by set 725 including gadget 725*a*. In some cases a group of employees may be unclear on how to proceed with some session activity and may need help from some type of facilitation resource. Here, the facilitation resource may include a collaboration or innovation expert that can patch in to a session to provide advice or the resource may be automated and based on artificial intelligence. U.S. patent application Ser. No. 14/499,950 which is incorporated above by reference teaches several different types of facilitation resources, any of which may be used with the present concept.

Referring again to FIG. 52, an employee may move facilitator gadget 725*a* in and out of area 674 to seek help from a facilitation resource or to eliminate the resource when desired. Again, gadget 725*a* would light up when controlling and the light would turn off when not controlling.

Referring yet again to FIG. 52, while the shapes of the bottom sections of each gadget illustrated in FIG. 52 are similar, the top portions are different between gadget sets so that gadgets of one type can clearly be distinguished from gadgets of a different type. In addition, while not shown, the color of illumination of each gadget set may be unique so that even distant employees in a space can see which aspects of a session are controlled by which employees and associated gadgets.

In at least some embodiments a system server 14 may enable employees to use gadgets from at least some sets to control different subsets of space surfaces instead of controlling all space surfaces. Thus, for instance, see FIG. 53 that includes large common surfaces 20*a* through 20*d*, a table 60*b* with in play area 674 and other in play areas that comprise the top surfaces of shelves 740 and 742. Here, referring also to FIG. 54, it is contemplated that in play areas 740 and 742 may correspond to sections of surfaces 20*a* and 20*b* adjacent the shelved 740 and 742 respectively as shown at 760, 762 and 764 while in play area 674 corresponds to all other emissive surface area outside sections 760, 762 and 764.

Figure 53:
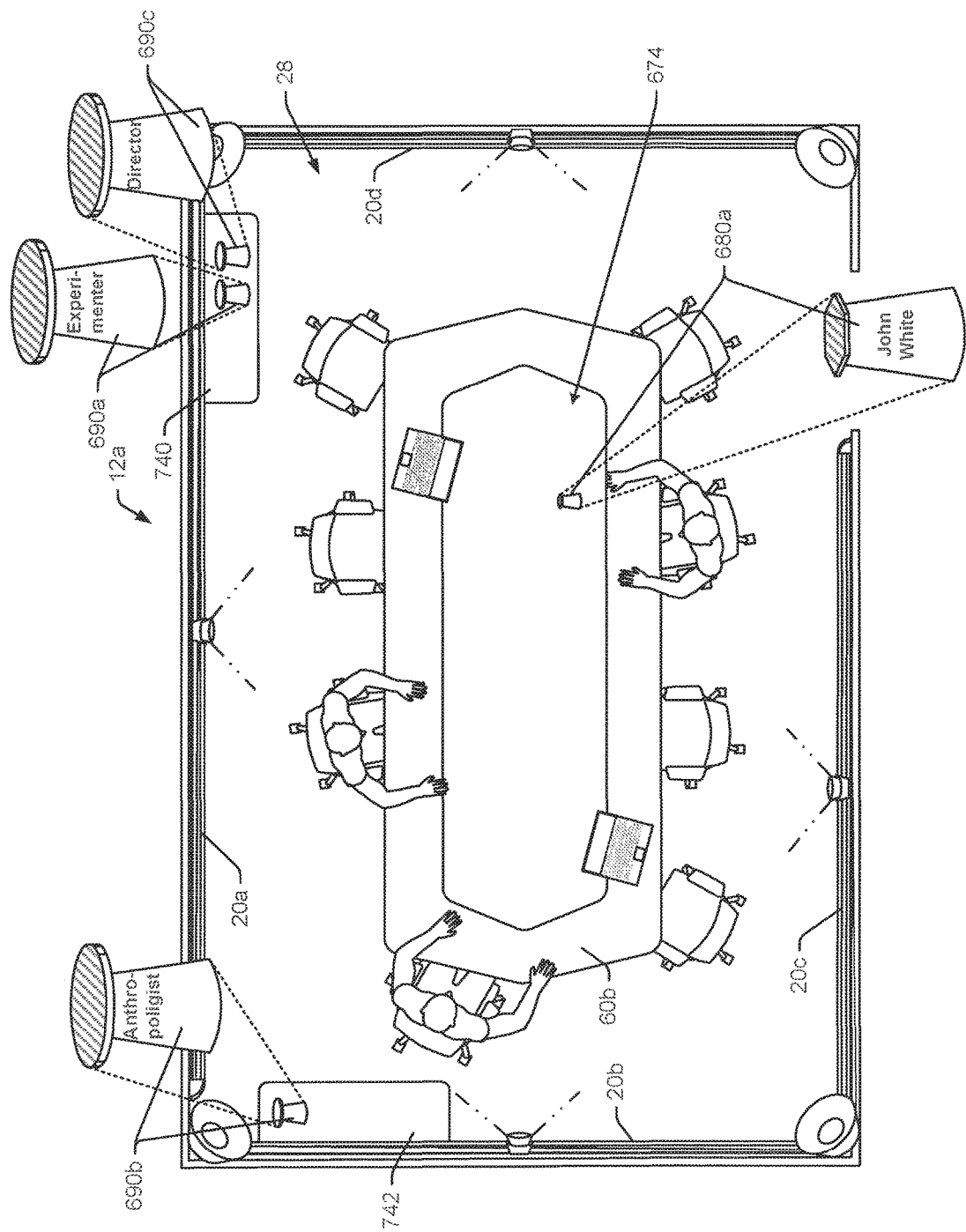
FIG. 53 is a top plan view like FIG. 49, albeit showing a different affordance set.
Figure 54:
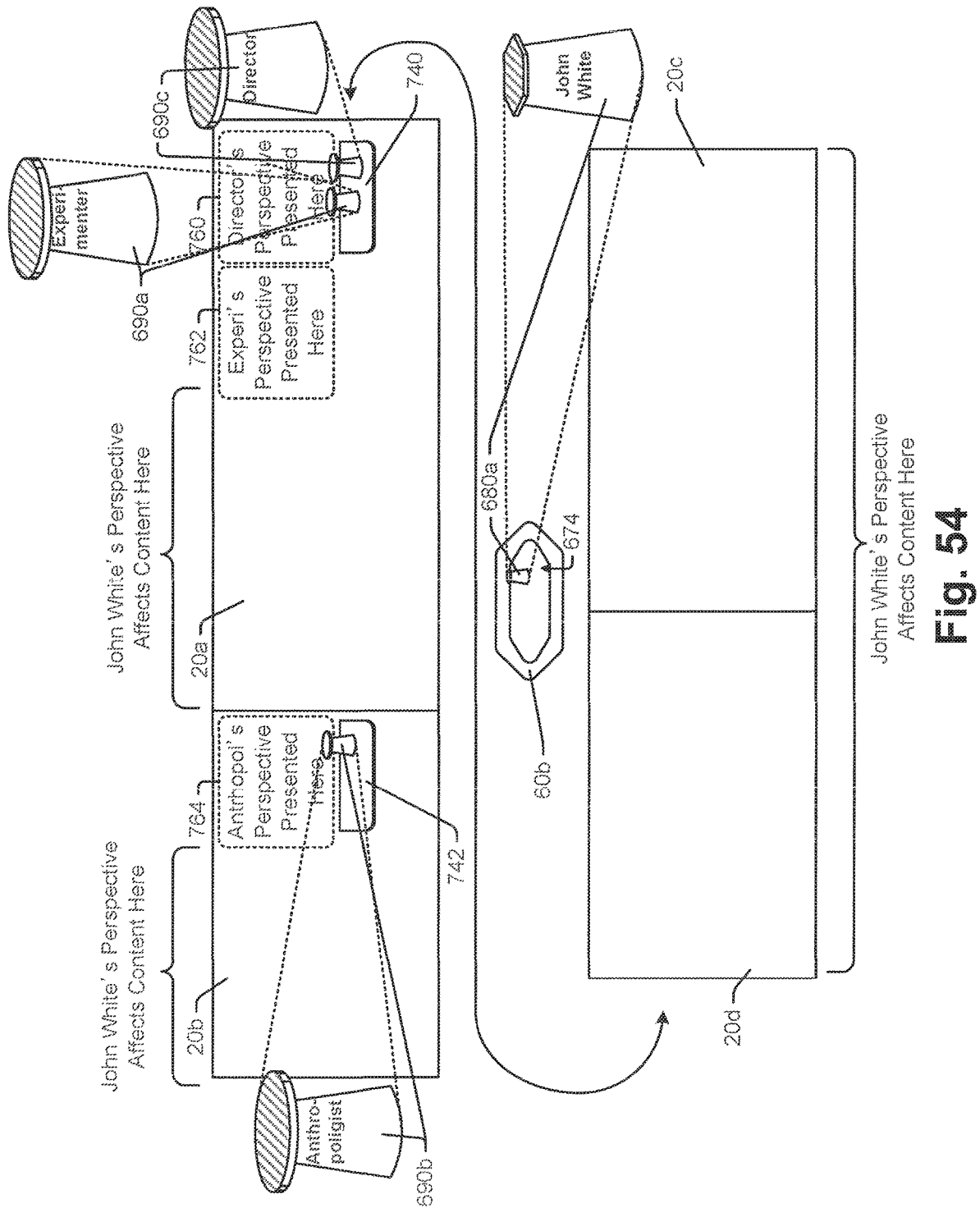
FIG. 54 is a schematic illustrating the emissive wall surfaces of FIG. 54 with different perspectives presented or coloring content on different sectiosn fo the emissive surfaces.

Referring still to FIGS. 53 and 54, when a gadget 680*a* (e.g., corresponding to specific employee John White) is moved into area 674, that employee's perspective is used to at least somewhat color the content on surfaces 20*a* through 20*d* outside sections 760, 762 and 764. When the anthropologist gadget 690*b* is set in area 742, the anthropologist perspective is presented in section 764 and when gadgets 690*a* and 690*c* are set in area 740, the experimenter and director perspectives are presented in sections 762 and 760, respectively.

While different gadget types are shown in FIG. 52, in some embodiments one or a small number of gadgets that may assume different types may be provided to replace all of the different types. To this end, for instance, see FIG. 55 where an small diameter edge end of a cone shaped gadget 40 having an annular end emissive surface 780 is shown. Here, various gadget types are indicated by selectable emissive surface buttons that, when selected, cause the gadget 40 to assume an associated type. The exemplary buttons include an anthropologist button 782 that is currently highlighted, a specific employee (e.g., John White) button 784 corresponding to a specific employee's perspective, a second specific employee button 786 corresponding to a specific second employee's perspective, a director button 790 corresponding to a director's perspective and an experimenter button 792 corresponding to an experimenter's perspective. In some cases the options presented by the buttons on surface 780 may be the options most often selected by the specific employee using gadget 40 or the most often selected options associated with a specific session or with a specific set of employees in a session, etc. In addition to the buttons described above, surface 7880 also presents a search button option at 788 which may be selected to search for other gadget types if a desired option is missing.

Figure 55:
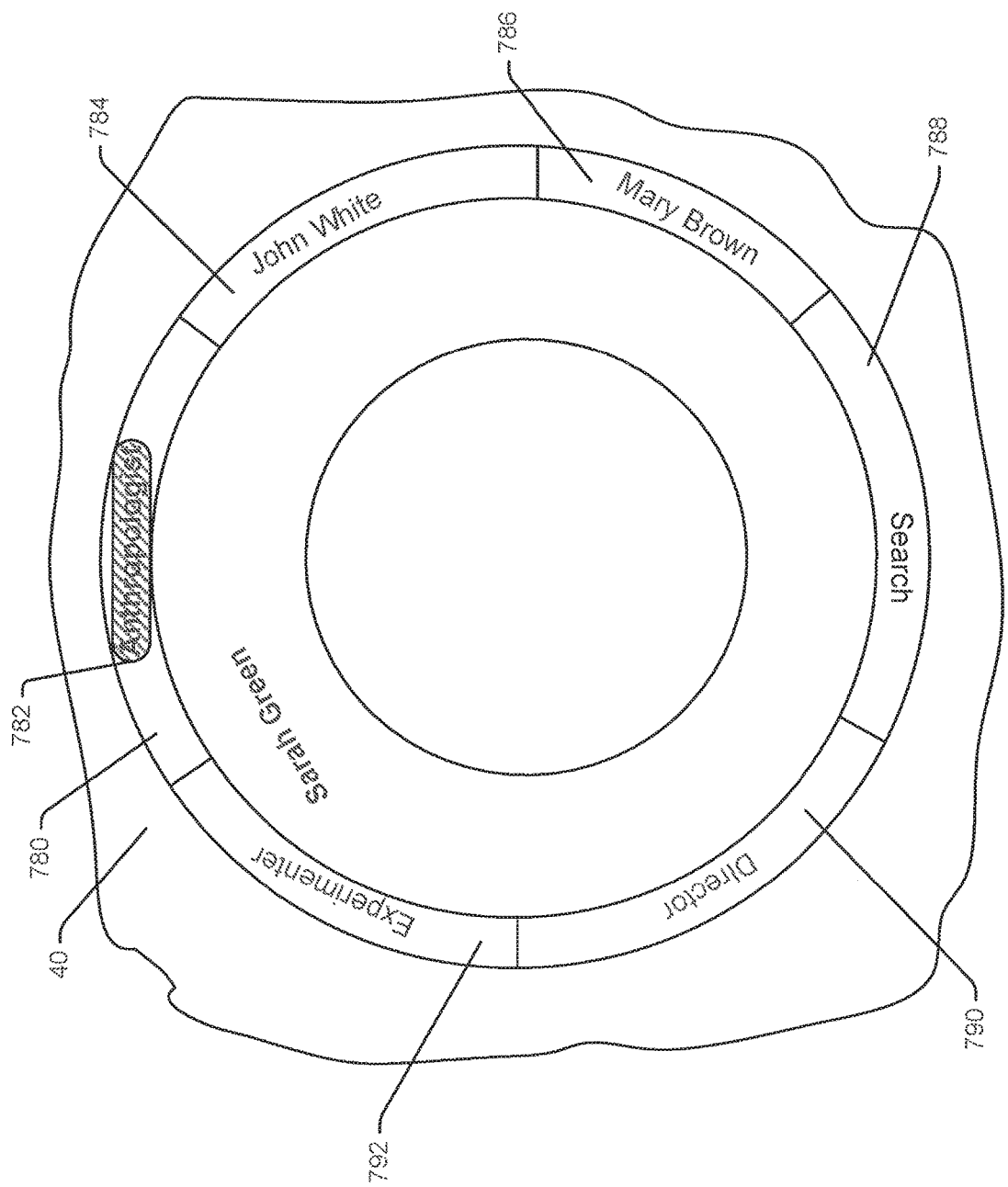
FIG. 55 is an end gadget view showing different session defining options.

Referring still to FIG. 55, after a gadget type is selected, the gadget 40 would thereafter operate like the selected type until the gadget type is again changed by an employee at least for that employee. Thus, if an employee selects the Mary Brown button 786, Mary Browns perspective may be added or removed from session content by controlling placement of gadget 40.

In other embodiments gadgets akin to the gadgets described above with respect to FIG. 52 may be stored in a central area of a table top and may become active or enabled to control session aspects only when removed from the storage area. For instance, see FIG. 56 where a storage area 999 on top of a table top 60c is visually distinguished via pant or other indicia (e.g., mechanical or otherwise) from a peripheral in play area 1001. Here, any employee may be able to select a gadget of any type from area 999 and place that gadget on area 1001 to cause control action as described above.

In some cases it is contemplated that sensors in table top 60b or generally within a session space may be able to further distinguish locations of gadgets in the in play area 1001 and server 14 may be programmed to use different gadget locations in the in play area to identify different control activities. For instance, referring still to FIG. 56, with employee 997 at an edge of top 60c as illustrated, placement of a gadget 690b to the right of the employee as shown may operate as a signal to server 14 that the anthropologists perspective should be presented on the common emissive surface 20c to the right of employee 997 while placement of director gadget 690c to the left of the employee 997 operates as a signal that the director's perspective should be presented on surface 20b to the left of employee 997.

Figure 56:
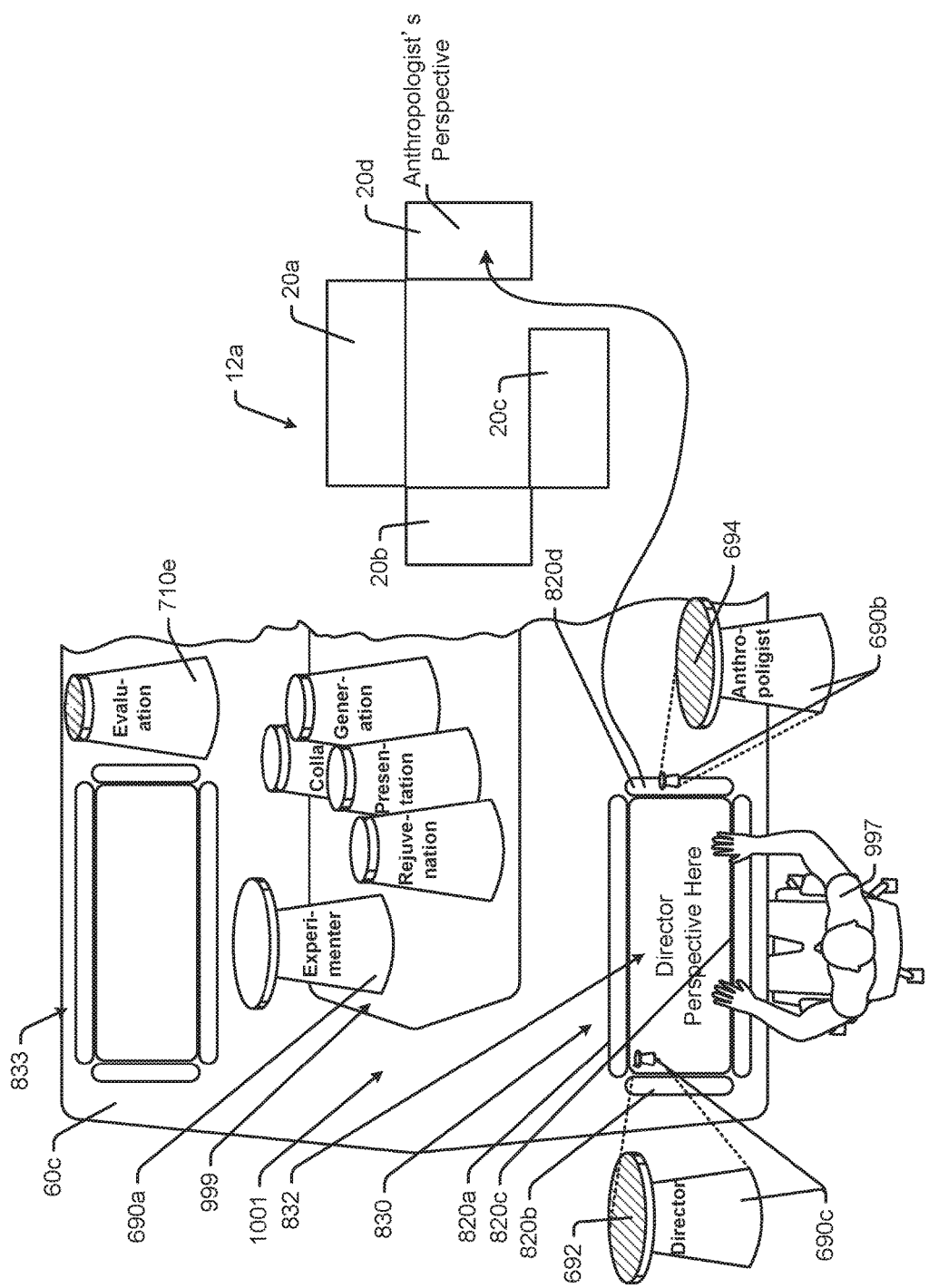
FIG. 56 is a schematic illustrating gadgets and a table top that includes indicia that define different table top areas or fields that can be used in conjunction with the gadgbets to perform various session defining tasks.

To help employees understand how to position gadgets on a surface to cause different effects, paint, ink or mechanical indicia (e.g., channels and/or ribs) (hereinafter "indicia" generally) may be presented at different positions about a table top surface to be occupied by employees where the different sections of the indicia are related to different effects. In particularly advantageous embodiments indicia may have a design or pattern that mirrors the shape or locations of affordances in an associated space. For instance, in FIG. 56 exemplary indicia shown at 830 includes four separate indicia fields 820a, 820b, 820c and 820d that form a rectangle that has a shape similar to the shape of a space including the table 60c as represented at 12a where fields 820a, 820b, 820c and 820d correspond to emissive wall surfaces 20a, 20b, 20c and 20d, respectively (see also the emissive surfaces 20a through 20d that have the same general layout in FIG. 48). In addition to the fields 820a through 820d, the indicia 830 also includes a central field area 832 inside the rectangle formed by field 820a through 820d. Here, employee 997 may move gadget 690b to field 820d as illustrated in FIG. 56 to cause server 14 to present an anthropologist's perspective on associated emissive wall surface 20d and may move gadget 690c into field or area 832 to present a director's perspective throughout all of the emissive surfaces in the space associated with the table 60c. Similarly, any gadget may be moved to any one of the fields 820a through 820d or field 832 to affect content and session activity accordingly. A second indicia set is shown at 833 that may be used by another employee in a fashion similar to set 832.

Figure 57:
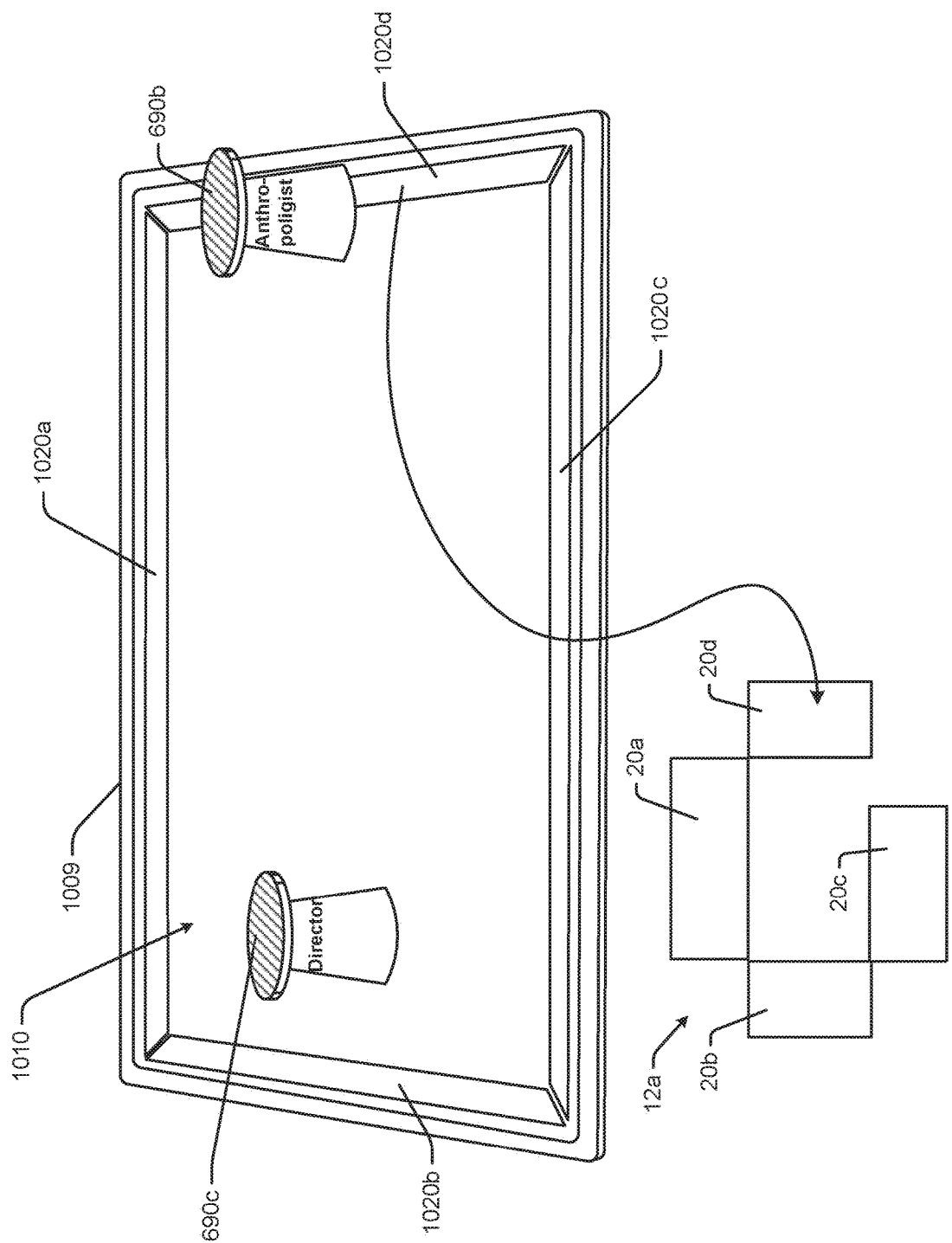
FIG. 57 shows a planar gadget as in FIG. 37 including indicia akin to the FIG. 56 indicia for use with gadgets to define session features.

In yet another embodiment where a gadget kit includes a planar gadget as in FIG. 37, the planar gadget may be used in a fashion similar to the indicia described in FIG. 56. For instance, a planar gadget with indicia is shown at 1009 in in FIG. 57 where the indicia includes four fields 1020a, 1020b, 1020c and 1020d that form a rectangle about a central area 1010 in the same way that the indicia 830 in FIG. 56 form a rectangle. Here, again, the indicia generally mirror the relative layout of emissive surfaces 20a thorugh 20d in space 12a. In this case, as in FIG. 56, when a gadget is placed on a field (see gadget 690b on field 1020d) the gadget effect is applied to an emissive surface (see 20d) that corresponds to the receiving field (e.g., 1020d) and when a gadget is placed in the central area 1010 (see gadget 690c) the gadget effect is applied to all of the emissive surfaces associated in a session space.

Figure 58:
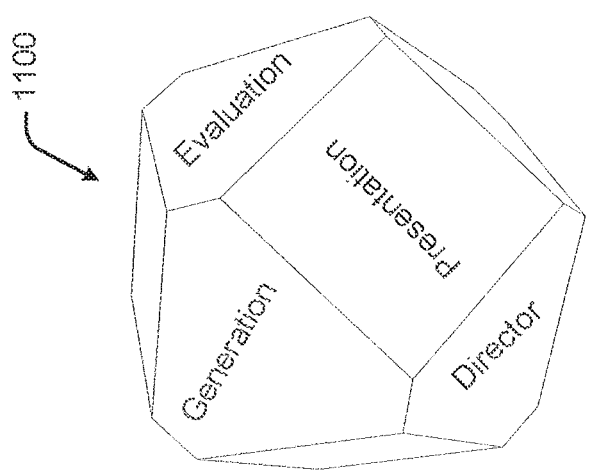
FIG. 58 is a plan view of a 14 sided gadget that is consistent with at least some aspects of the present disclosure.

In still other embodiments other gadgets are contemplated for controlling session characteristics. For instance, a 14 sided gadget 1100 is shown in FIG. 58 where each side is labeled with indicia indicating a different session type or other session characteristic (e.g., Anthropologist, Personal Content, etc). In this case it is contemplated that an employee may place gadget 1100 in an in play area or field as described in any of the embodiments above and the characteristic on the top surface may be used to change the session feature combination accordingly. Here, a set feature or characteristic may persist until gadget 1100 is used to select an alternate characteristic of the set type. For instance, once gadget 100 is used to set a session activity to the presentation type, until gadget 1100 is used to change the session type to another option, the feature combination would be optimized for a presentation. This means that after gadget 1100 is used to set session type, the same gadget 1100 may be used to set some other session characteristic such as selecting a virtual perspective by removing gadget 1100 from an in play area, rotating that gadget 1100 so that a perspective like "Director" is facing upward and replacing the gadget 1100 in the in play area again.

Figure 59:
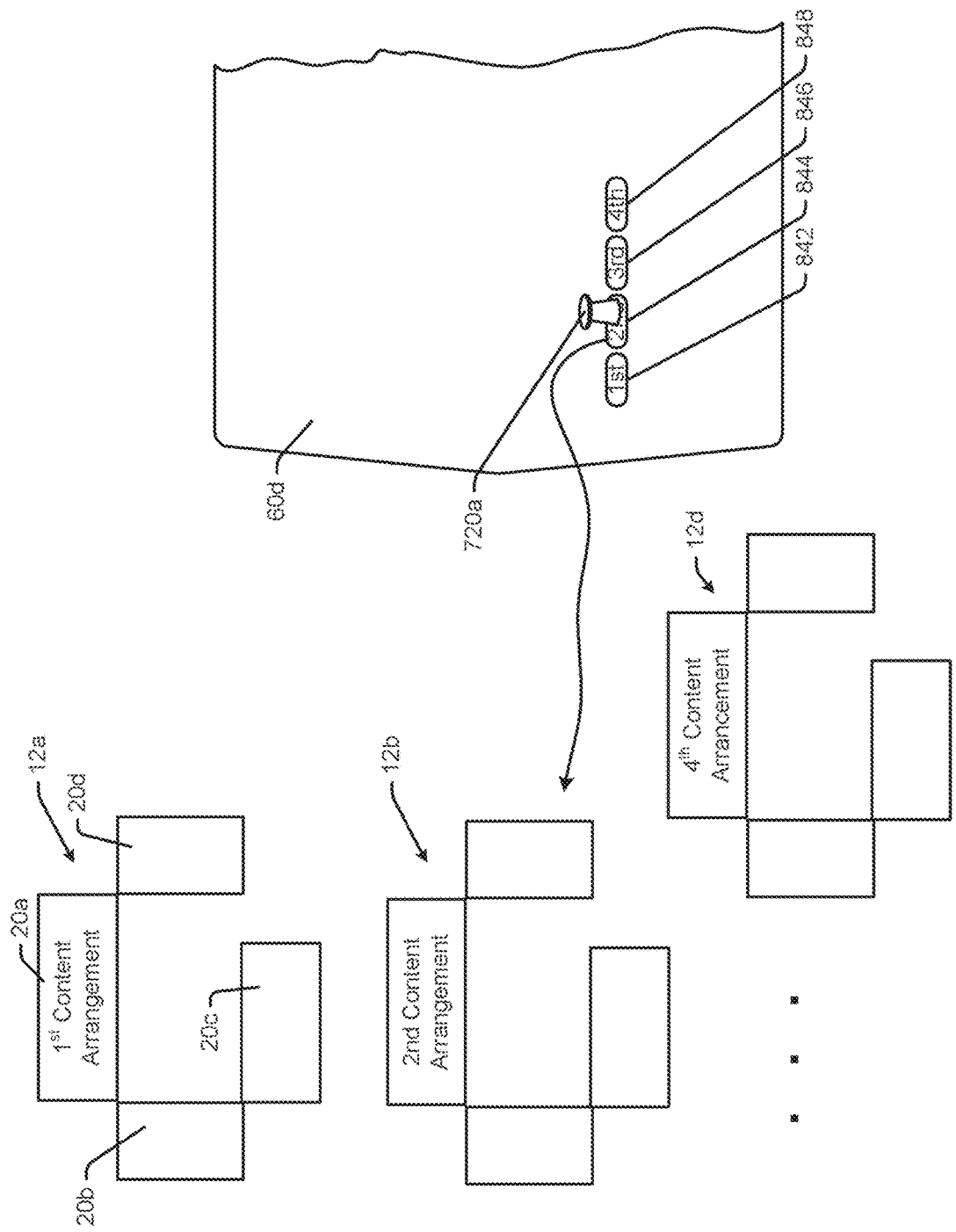
FIG. 59 is a schematic showing another table and system assembly wherein gadgets can be used to change content presented on common display screens in a conferencing space.

In some cases a single gadget like the control gadget 720a shown in FIG. 52 may be used with other indicia on a table top or other surface to select specific feature combinations. For instance, in a case where a long project has different sub-periods and content should be arranged differently during each of four sub-periods that make up the session, a control gadget 720a may be used along with indicia on a table top to control transition among the sub-periods. To this end see FIG. 59 where sub-period indicia 842, 844, 846 and 848 is presented on a table top surface 60d at a position to be occupied by an employee. The indicia 842 through 848 correspond to first, second third and fourth content arrangements required during the first, second third and fourth sub-periods of a session. Three different content arrangements that occur during the first, second and fourth sub-periods are shown at 12a, 12b and 12d for a rectangular space including four large emissive surfaces 20a through 20d. Here, by moving control gadget 720a about from one indicia 842, 844, 846 or 848 to another causes server 14 to rearrange content accordingly.

Figure 60:
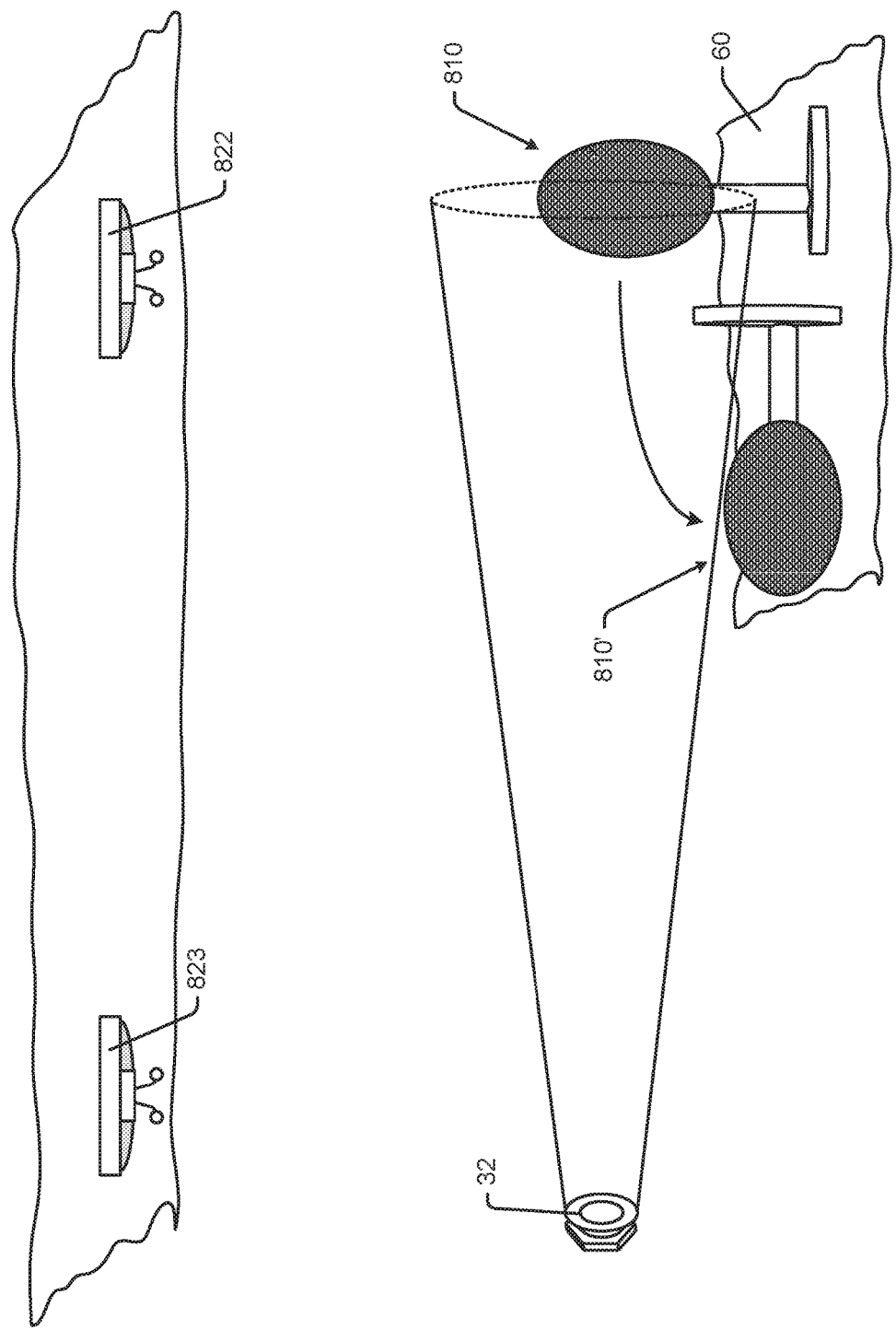
FIG. 60 is a schematic showing a microphone gadget useable to control a space microphone and, in some case, a space camera.

One other exemplary gadget for controlling at least one microphone in a conference space is shown at 810 in FIG. 60. As illustrated, actual microphones or a microphone unit 822 may be located within a space such as, for instance, mounted above a position to be occupied by an employee and an employee may set a microphone gadget at a location proximate the employee's position and generally under the microphone 822 to be controlled thereby. Here, when microphone gadget 810 is in an upright position, the microphone 822 there above may be turned on to capture any voice utterance at the position there below. When the microphone gadget is laid down as at 810', the microphone 822 there above may be turned off so that voice signal by an employee at the position below microphone 822 is not captured. Actions other than changing microphone gadget orientation may signal or trigger turning the microphone on or off. For instance, a microphone gadget 810 may be moved in and out of an in play area on a table top to activate and deactivate the associated microphone 822.

In the microphone example of FIG. 60, in at least some embodiments where there are different microphones 822 at different employee positions about a conference table, a single microphone gadget 810 may be used to control any one of the microphones in the space. Here, for instance, a single microphone gadget 810 located below one microphone 822 may be moved to a location below another microphone 823 in which case the gadget's new position would be determined and used to associate the gadget 810 with the microphone 823.

In many cases described above, one advantage among others to using gadgets to control affordances is that the simple act of gadget movement or motion can result in an activity occurring in an intuitive fashion. A related advantage is that when other employees in a space see a first employee do something with a gadget, the simple act of observing the gadget action allows the other employees to understand intuitively what the first employee did. This should be contrasted with a case where a first employee uses a button on a tablet type control device to generate an affordance control signal which is difficult for other employees to perceive and which, when perceivable, cannot be easily distinguished from other button selection activities on the same tablet device.

In addition to controlling a microphone 822 as described above, in some embodiments a microphone gadget 810 may also control a camera device 32 (see again FIG. 60) that is aimed at a position to be occupied along the edge of a table top by an employee. Thus, here, when gadget 810 is in the upright position a camera aimed at an employee location proximate the gadget 810 may be on and when the gadget is laid down as at 810', camera 32 may be turned off. Again, a single gadget 810 may be moved to other employee positions and used to control other cameras automatically based on gadget orientation or location (e.g., inside or outside an in play area).

Figure 61:
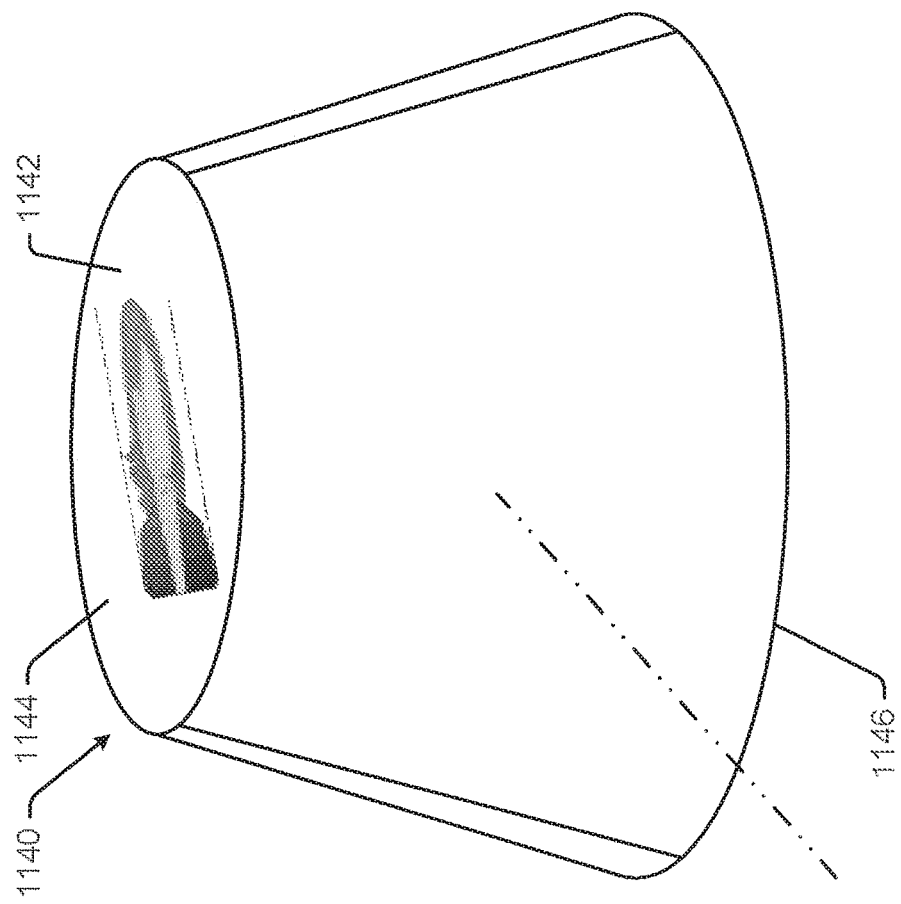
FIG. 61 is a perspective view of a solid cone shaped gadget that is consistent with other aspects of the present disclosure.

FIG. 61 shows yet one other useful gadget assembly 1140 that has a shape similar to the cone shape described above with respect to FIGS. 3 and 4, except that gadget 1140 is solid where the flat ends 1142 and 1146 are completely covered by gadget surface. In some embodiments one or both of the flat end surfaces may present a display or emissive surface as shown at 1144 on end 1142. Here, content may be presented via an end emissive surface 1144 such as, for instance, targeting guidance. As shown, in some embodiments the targeting guidance may include an image of an affordance being targeted (e.g., a light, a specific set of content on a common surface, an image of an employee being targeted, etc.).

In some embodiments gadgets may operate differently based on some temporal aspect of a session. For instance, during the first and last five minutes of a two hour session all gadgets other than one control gadget used by a lead employee may be disabled. In the intervening 1 hour and fifty minutes, all gadgets may be fully enabled for use by any employee. As another instance, at least one gadget may be disabled for control purposes and may operate as a countdown clock during the last five minutes of a session. Other temporal gadget function changes are contemplated.

While relative juxtapositions of gadgets in a space have been described above as important in at least some embodiments, other juxtapositions or arrangements are also contemplated to have meaning. For instance, in some cases a single kit including a planar gadget as in FIG. 37 and other gadgets as shown in FIG. 52 may be provided and used by a single employee to specify session characteristics. Here, the employee using the kit may place several different gadgets like those described in relation to FIG. 52 on a receiving surface of the planar gadget as a recipe for a specific type of session (e.g., director view, John White's perspective, a content generation session, etc.). In this way the planar gadget operates like a plate where many different session ingredients can be added to create unique session activities and affordance sets. The ingredients here can be changed at any time to alter the session activity.

Figure 62:
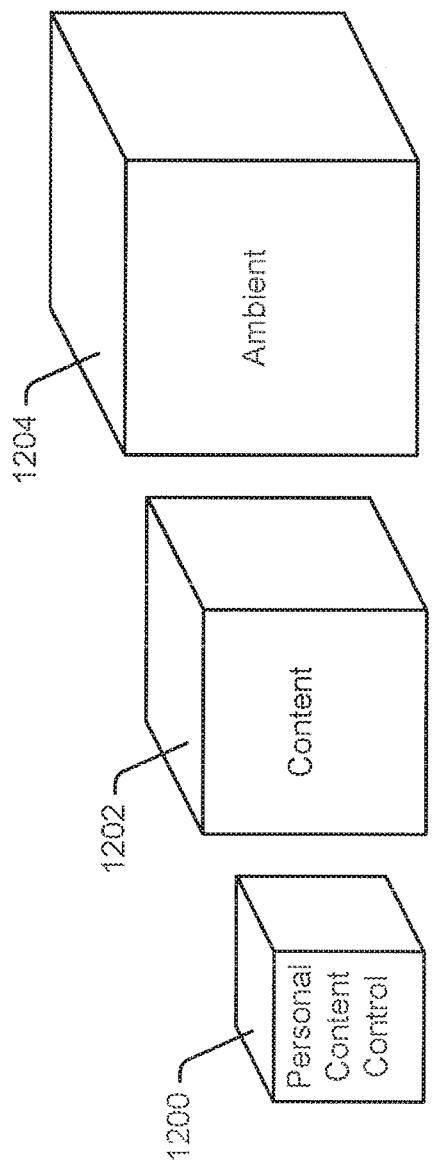
FIG. 62 is a perspective view of three differently sized gadgets that may be associated with different control capabilities.

Gadgets may have a similar shape but different functions where the gadgets can be distinguished by relative size. For instance, see FIG. 62 where exemplary gadgets 1200, 1202 and 1204 are shown that have different and easily distinguishable relative sizes. As labeled, Gadget 1200 is for controlling personal content on emissive surfaces in an associated conference space, gadget 1202 is for controlling content on surfaces other than the personal content and gadget 1204 is for controlling ambient affordances like lighting, sound, temperature, etc.

Figure 63:
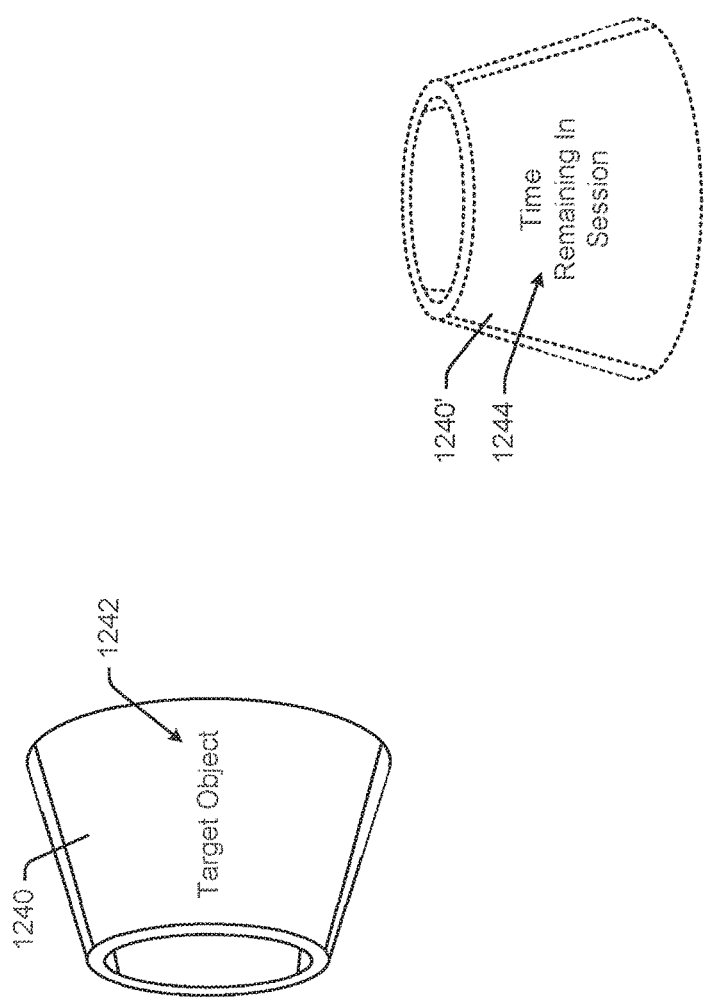
FIG. 63 is a perspective view of a single gadget in a use position and in a stored position where the gadget is shown having different functionality based on its immediate position.

In at least some embodiments when a gadget is set down, the gadget function may automatically change and when the gadget is picked up, the function may again automatically change based on sensed gadget movement via any system sensor. For instance, see FIG. 63 where an exemplary cone shaped gadget 1240 is shown in an aiming use position in solid line and in a non-use position in phantom 1240' where the gadget may be resting on a table top surface or some other supporting structure. As shown, in the use position, gadget 1240 may be used to target (see 1242) a target object to take control thereof or to control the object and when in the non-use position, the gadget 1240' changes to perform a session time out function wherein the gadget presents a session time remaining message 1244.

Figure 64:
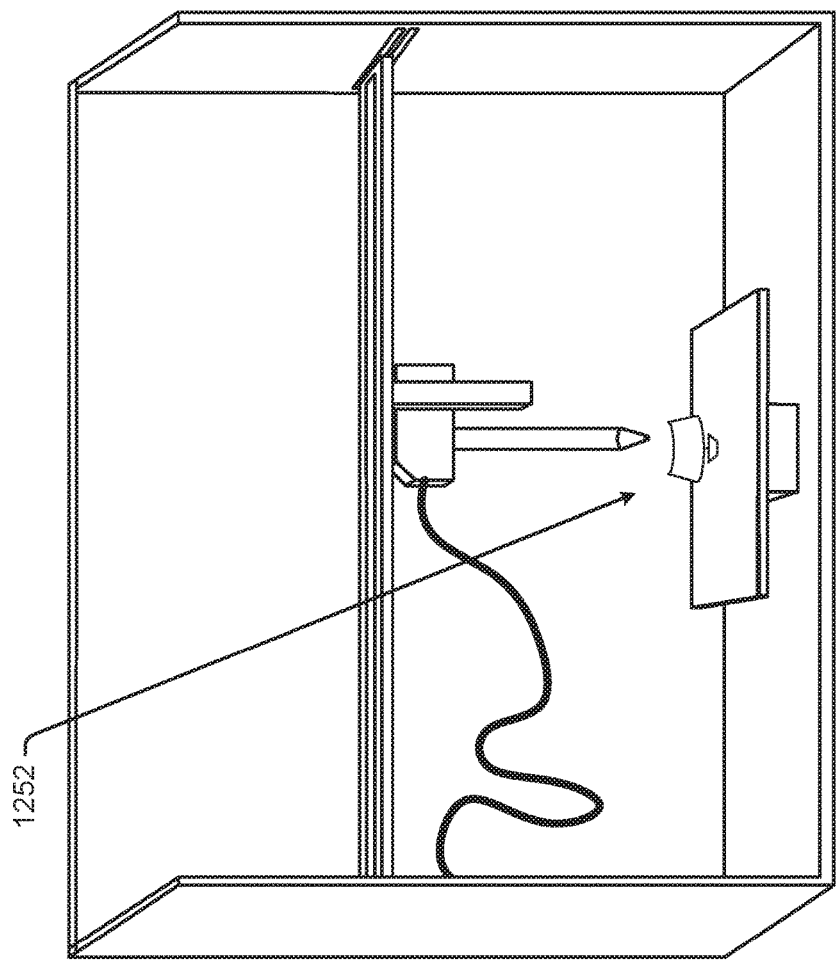
FIG. 64 is a view of a 3D printer that prints gadgets near a conference space in real time with a standard electronics package loaded into the printer device.
Figure 65:
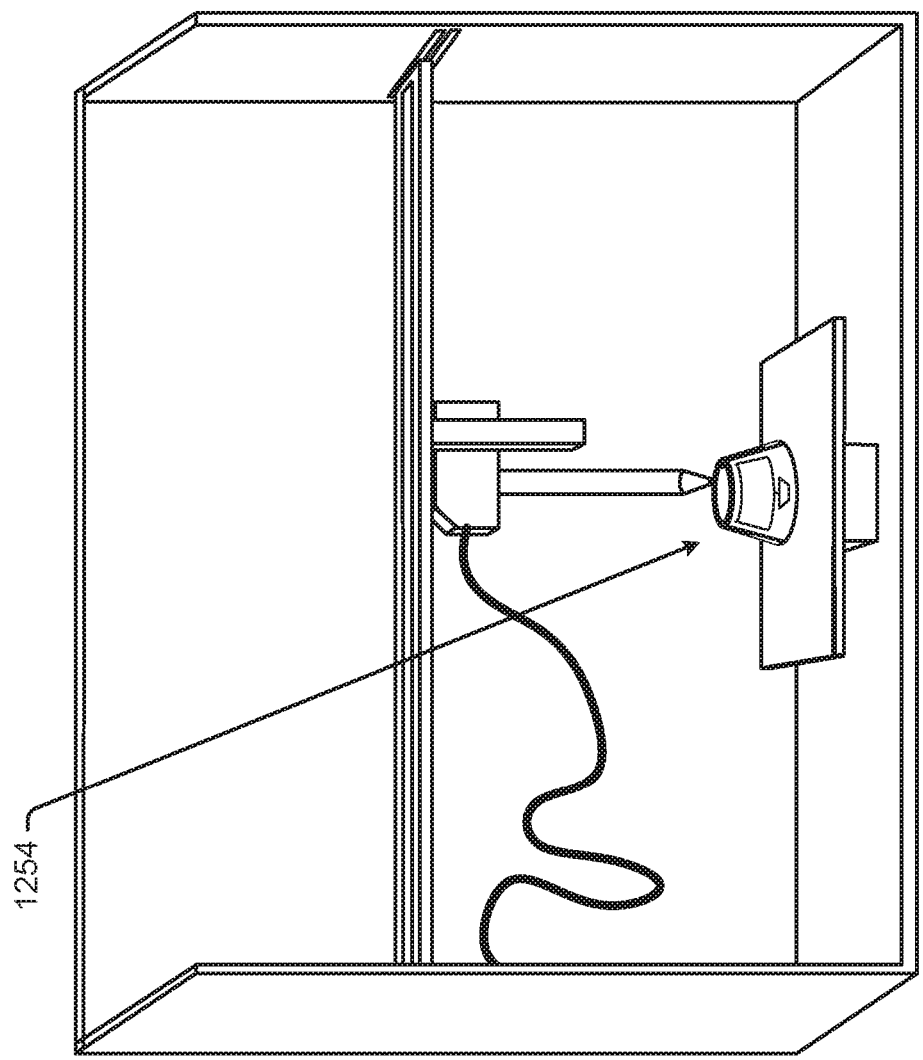
FIG. 65 is similar to FIG. 64, albeit showing a gadget printed around the electronics package of FIG. 64.

In some cases a 3D printer may be provided to, in effect, manufacture gadgets in real time whenever the gadgets are needed for a session. Here, each gadget would include a completely manual device and would not include electronics in most cases and therefore cameras or other sensors external to the gadget would have to be used to sense gadget location, orientation and movements and feedback on gadget actions would be provided via other space affordances. In some cases even where new gadgets are printed when needed, a simple gadget electronics package including a processor, a memory device and, in at least some cases, an output device like a display screen (which may also operate as an input device) could be provided initially within the printer device and could be printed around so that electronics could be included in each manufactured gadget. Here, in addition to printing the gadget, a system server could program the electronics to provide whatever gadget functionality is required for a specific gadget being manufactured and based on user preferences either memorialized in a database or expressed at the time of gadget manufacture. To this end see the exemplary electronics package 1252 loaded into a 3D printer in FIG. 64 and the printed gadget 1254 printed about the electronics package and shown in FIG. 65 which may be programmed as suggested above to facilitate any type of control contemplated above.

While the invention may be susceptible to various modifications and alternative forms, specific embodiments have been shown by way of example in the drawings and have been described in detail herein. However, it should be understood that the invention is not intended to be limited to the particular forms disclosed. Thus, the invention is to cover all modifications, equivalents, and alternatives falling within the spirit and scope of the invention as defined by the following appended claims. To Follow copy apprise the public of the scope of this invention, the following claims are made:

What is claimed is:

1. A system for controlling at least one operating characteristic corresponding to an affordance in an enterprise space the system comprising:
    a handheld affordance interface gadget having a defined aiming end and including an integrated output device, the affordance interface gadget being movable within the enterprise space;
    at least a first sensor for sensing the gadget in the enterprise space and generating sensed information;
    a processor programmed to perform the steps of:
    (i) receiving the sensed information from the at least a first sensor;
    (ii) using the sensed information to determine the position and orientation of the aiming end of the gadget in space relative to the at least one affordance in the enterprise space;
    (iii) using the position and orientation to identify the at least one affordance as a target object in alignment with the affordance interface gadget; and
    (iv) controlling the output device to provide an indication that the at least one target object has been associated with the affordance interface gadget.

2. The system of claim 1 wherein the output device generates a text message identifying the at least one target object.

3. The system of claim 1 wherein the output device includes an emissive surface and wherein the processor identifies the target object associated with the gadget on the emissive surface.

4. The system of claim 3 wherein the gadget includes at least a first actuator.

5. The system of claim 4 wherein the at least a first actuator is configured to issue control commands to the affordance associated with the gadget as the target.

6. The system of claim 1 wherein the affordance interface gadget includes the processor.

7. The system of claim 1 wherein the affordance interface gadget includes the at least a first sensor.

8. The system of claim 1 wherein the processor is further programmed to receive user input commands via the affordance interface gadget for controlling the targeted object.

9. The system of claim 8 wherein the user generates commands to control the targeted object by moving the affordance interface gadget in the enterprise space.

10. The system of claim 1 wherein the affordance interface gadget further includes one or more actuators for selecting and/or controlling a selected affordance, the processor further programmed for receiving an input from the one or more actuator on the affordance interface gadget to associate the target object with the affordance interface gadget for control.

11. The system of claim 10 wherein the second affordance type is at least one of an audio device and a common emissive surface used to present content within the enterprise space.

12. The system of claim 11 wherein the second affordance type is a common emissive surface and wherein, while the gadget is associated with a common emissive surface, the affordance interface gadget is configured to identify a subset of content on the emissive surface as the target object.

13. The system of claim 12 wherein the processor visually distinguishes the subset of content identified as a target object on the emissive surface from other content on the emissive surface.

14. The system of claim 13 wherein, after the subset of content is visually distinguished, the processor is further programmed to perform the steps of, receiving affordance interface gadget movement information from the at least a second sensor and modifying the visually distinguished subset of content as a function of the sensed movement.

15. The system of claim 12 further including at least a second sensor for sensing movement of the affordance interface gadget.

16. The system of claim 1 wherein the gadget is configured to control at least first and second different types of affordances upon being associated with one of the first or second types of affordances, respectively, wherein the first affordance type is a light type affordance.

17. A system for controlling operating characteristics of at least first and second different types of affordances located within an enterprise space, the system comprising:
    an affordance interface gadget including a housing having a defined aiming end;
    at least a first sensor for sensing the affordance interface gadget in space and generating sensed information;
    an output device;
    a processor programmed to perform the steps of:
    (i) receiving sensed information from the at least a first sensor;
    (ii) using the sensed information to determine the location and orientation of the aiming end of the affordance interface gadget in space and to identify a trajectory extending from the aiming end into the conference space;
    (iii) identifying a target affordance in the conference space that is in alignment with the aiming end of the affordance interface gadget; and
    (iv) controlling the output device to indicate association between the gadget and the affordance that is aligned with the aiming end of the gadget;
    (v) wherein at least one of the affordance types includes at least one a lighting device, an audio device and an air conditioning device;
    (vi) wherein, as the trajectory of the gadget is changed and is targeted at different types of affordances within the space, the gadget is configured to operate differently for affordances of different types to control different subsets of affordance operating characteristics.

18. The system of claim 17 wherein the processor is further programmed to assess gadget movement after the gadget is associated with one of the affordances and controls affordance operating characteristics as a function of detected gadget movement.

19. The system of claim 18 wherein the at least one affordance type includes a lighting device and wherein, while the gadget is associated with a lighting device, the affordance characteristic controlled is light intensity.

20. The system of claim 18 wherein the gadget is frusto-conical in internal shape and forms a viewing channel.

21. A system for controlling one of a plurality of affordances in an enterprise space, the system comprising:
- an affordance interface gadget having a defined aiming end, the affordance interface gadget being movable within the enterprise space and including an output device and at least one actuator configurable for selecting and/or controlling any one of the plurality of affordances;
- at least a first sensor for sensing a position and an orientation of the aiming end of the gadget in space relative to at least one of the affordance in the enterprise system and generating sensed information;
- a processor programmed to perform the steps of:
  (i) receiving sensed information from the at least a first sensor;
  (ii) using the sensed information to determine a trajectory of the aiming end of the affordance interface gadget with respect to the at least one affordance;
  (iii) identifying the at least one affordance in alignment with the trajectory of the aiming end as a target object; and
  (iv) controlling the at least one output device to provide an indicator that the at least one affordance is in alignment with the trajectory of the aiming end;
  (v) receiving input from the at least one actuator to associate the aligned affordance with the affordance interface gadget for controlling; and
  (vi) configuring the affordance interface gadget to control the associated affordance.

22. The system of claim 21 wherein the output device generates a text message identifying the at least one aligned target object.

23. The system of claim 21 wherein the output device includes an emissive surface and wherein the processor identifies the target object associated with the gadget on the emissive surface.

24. The system of claim 23 wherein the step of configuring the affordance interface gadget includes configuring at least one actuator on the gadget to issue control commands to the affordance associated with the gadget as the target.

25. The system of claim 21 wherein the at least one affordance includes a common emissive surface and wherein, while the gadget is associated with a common emissive surface, the affordance interface gadget is configured to identify a subset of content on the emissive surface as the target object.

26. The system of claim 25 wherein the processor visually distinguishes the subset of content identified as a target object on the emissive surface from other content on the emissive surface.

27. The system of claim 26 further including at least a second sensor for sensing movement of the affordance interface gadget.

28. The system of claim 27 wherein, after the subset of content is visually distinguished, the processor is further programmed to perform the steps of, receiving affordance interface gadget movement information from the at least a second sensor and modifying the visually distinguished subset of content as a function of the sensed movement.

29. The system of claim 21 wherein the affordance interface gadget includes the processor.

30. The system of claim 21 wherein the affordance interface gadget includes the at least a first sensor.

31. The system of claim 21 wherein the processor is further programmed to receive user input commands via the affordance interface gadget for controlling the targeted object.

32. The system of claim 31 wherein the user generates commands to control the targeted object by moving the affordance interface gadget in the enterprise space.

33. The system of claim 21 wherein the gadget is configured to control at least first and second different types of affordances upon being associated with one of the first or second types of affordances, respectively.

* * * * *